United States Patent
Jeong et al.

(10) Patent No.: US 12,477,100 B2
(45) Date of Patent: Nov. 18, 2025

(54) METHOD AND DEVICE FOR ENCODING VIDEO ON BASIS OF VIDEO SIZE, AND METHOD AND DEVICE FOR DECODING VIDEO ON BASIS OF VIDEO SIZE

(71) Applicant: SAMSUNG ELECTRONICS CO., LTD., Suwon-si (KR)

(72) Inventors: Seungsoo Jeong, Suwon-si (KR); Minsoo Park, Suwon-si (KR); Minwoo Park, Suwon-Si (KR); Woongil Choi, Suwon-si (KR); Anish Tamse, Suwon-si (KR); Kiho Choi, Suwon-si (KR); Narae Choi, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 188 days.

(21) Appl. No.: 17/526,317

(22) Filed: Nov. 15, 2021

(65) Prior Publication Data

US 2022/0078409 A1 Mar. 10, 2022

Related U.S. Application Data

(63) Continuation of application No. PCT/KR2020/006291, filed on May 13, 2020.
(Continued)

(51) Int. Cl.
*H04N 19/105* (2014.01)
*H04N 19/117* (2014.01)
(Continued)

(52) U.S. Cl.
CPC ......... *H04N 19/105* (2014.11); *H04N 19/117* (2014.11); *H04N 19/132* (2014.11); *H04N 19/176* (2014.11); *H04N 19/82* (2014.11)

(58) Field of Classification Search
CPC .. H04N 19/105; H04N 19/117; H04N 19/119; H04N 19/132; H04N 19/136; H04N 19/176; H04N 19/82
See application file for complete search history.

(56) References Cited

U.S. PATENT DOCUMENTS

| | | | |
|---|---|---|---|
| 9,317,895 B1 * | 4/2016 | Tidwell | G06T 3/08 |
| 10,045,036 B2 | 8/2018 | Lee et al. | |

(Continued)

FOREIGN PATENT DOCUMENTS

| | | |
|---|---|---|
| CN | 108476319 A | 8/2018 |
| KR | 1020150046743 A | 4/2015 |

(Continued)

OTHER PUBLICATIONS

Peisong Chen et al: "AHG19: Adaptive resolution change", 14. JVET Meeting; Mar. 19, 2019-Mar. 27, 2019; Geneva; (The Joint Video Exploration Team of ISOHEC JTC1ISC29/WG11 and ITU-T 8G.16}, No. JVET-N0279 Mar. 12, 2019 (Mar. 12, 2019).*

(Continued)

*Primary Examiner* — Shahan Ur Rahaman
(74) *Attorney, Agent, or Firm* — Sughrue Mion, PLLC

(57) ABSTRACT

An image decoding method includes: comparing a size of a current image including a current block with a size of a reference image; selecting, in the reference image, reference samples corresponding to current samples in the current block according to a motion vector of the current block; and reconstructing the current block based on the reference samples, wherein, when the size of the reference image is greater than the size of the current image, the reference samples are spaced apart from one another in the reference image by an interval corresponding to a result of the size comparison.

7 Claims, 35 Drawing Sheets

| REF SAMPLE NO. / SIZE RATIO | [0] | [1] | [2] | [3] | [4] | [5] | [6] | [7] |
|---|---|---|---|---|---|---|---|---|
| | FILTER COEFFICIENTS APPLIED TO REF SAMPLES | | | | | | | |
| EQUAL TO OR GREATER THAN 1.75 | 0 | −5 | 15 | 41 | 19 | −5 | −1 | 0 |
| EQUAL TO OR GREATER THAN 1.25 AND LESS THAN 1.75 | −4 | 0 | 19 | 29 | 21 | 5 | −4 | −2 |
| LESS THAN 1.25 | 0 | 1 | −3 | 63 | 4 | −2 | 1 | 0 |

Related U.S. Application Data

(60) Provisional application No. 62/870,994, filed on Jul. 5, 2019, provisional application No. 62/846,915, filed on May 13, 2019.

(51) Int. Cl.
*H04N 19/132* (2014.01)
*H04N 19/176* (2014.01)
*H04N 19/82* (2014.01)

(56) References Cited

U.S. PATENT DOCUMENTS

| | | | |
|---|---|---|---|
| 10,091,501 B2 | 10/2018 | Lee et al. | |
| 10,462,464 B2 | 10/2019 | Rusanovskyy | |
| 10,602,168 B2 | 3/2020 | Lee et al. | |
| 10,819,978 B2 | 10/2020 | Tamse et al. | |
| 2009/0257494 A1* | 10/2009 | Ye | H04N 19/136 375/E7.243 |
| 2014/0140399 A1* | 5/2014 | Seregin | H04N 19/30 375/240.12 |
| 2014/0286434 A1 | 9/2014 | Lee et al. | |
| 2015/0103900 A1* | 4/2015 | Liu | H04N 19/80 375/240.12 |
| 2016/0249057 A1* | 8/2016 | Lee | H04N 19/105 |
| 2018/0167638 A1 | 6/2018 | Rusanovskyy | |
| 2018/0176596 A1 | 6/2018 | Jeong et al. | |
| 2019/0141598 A1 | 5/2019 | Leung et al. | |
| 2019/0166375 A1 | 5/2019 | Jun et al. | |
| 2021/0092458 A1* | 3/2021 | Seregin | H04N 19/82 |

FOREIGN PATENT DOCUMENTS

| | | |
|---|---|---|
| KR | 1020150099496 A | 8/2015 |
| KR | 1020160085891 A | 7/2016 |
| KR | 1020180014675 A | 2/2018 |
| WO | 2021/007048 A1 | 1/2021 |
| WO | 2021/073488 A1 | 4/2021 |
| WO | 2021/123439 A1 | 6/2021 |

OTHER PUBLICATIONS

International Search Report (PCT/ISA/210) dated Aug. 24, 2020 issued by the International Searching Authority in International Application No. PCT/KR2020/006291.

P. Chen et al., "AHG 19: Adaptive Resolution Change", Joint Video Experts Team (JVET) of ITU-T SG 16 WP 3 and ISO/IEC JTC 1/SC 29/WG 11, 14th Meeting, Mar. 19-27, 2019, Doc: JVET-N0279, XP030202727, (6 pages total).

J. Samuelsson et al., "AHG 8: Adaptive Resolution Change (ARC) with downsampling", 15th Meeting, Joint Video Experts Team (JVET) of ITU-T SG 16 WP 3 and ISO/IEC JTC 1/SC 29/WG 11, Doc: JVET-O0240-v1, Jul. 3-12, 2019, (7 pages total).

J. Luo et al., "CE1-related: Reference picture resampling filters", 16th Meeting, Joint Video Experts Team (JVET) of ITU-T SG 16 WP 3 and ISO/IEC JTC 1/SC 29/WG 11, Doc: JVET-P0353-v2, Oct. 1-11, 2019, XP30217035A, (7 pages total).

A. Alshin et al., "CE1-related: Anti-aliasing motion compensation interpolation downsampling filters for reference picture resampling", 16th Meeting, Joint Video Experts Team (JVET) of ITU-T SG 16 WP 3 and ISO/IEC JTC 1/SC 29/WG 11, Oct. 1-11, 2019, Doc: JVET-P0390, XP30217161A, (4 pages total).

B. Bross et al., "On smoothing filter with RPR in VVC", 17th Meeting, Joint Video Experts Team (JVET) of ITU-T SG 16 WP 3 and ISO/IEC JTC 1/SC 29/WG 11, Doc: JVET-Q0449-v1, Jan. 7-17, 2020, XP30223545A, (6 pages total).

B. Bross et al., "Versatile Video Coding (Draft 6)", 15th Meeting, Joint Video Experts Team (JVET) of ITU-T SG 16 WP 3 and ISO/IEC JTC 1/SC 29/WG 11, Doc: JVET-O2001-vE, Jul. 3-12, 2019, (460 pages total).

Communication dated Jan. 2, 2023 issued by the European Patent Office in European Patent Application No. 20806728.0.

Communication dated Oct. 12, 2022 issued by Intellectual Property India in Indian Application No. 202147057915.

Office Action issued on Jan. 10, 2024 by the Chinese Patent Office in corresponding CN Patent Application No. 202080050277.9.

Office Action issued on Dec. 15, 2023 by the Indonesian Patent Office in corresponding ID Patent Application No. P00202111351.

Communication issued on Aug. 27, 2024 by the Korean Intellectual Property Office (KIPO) for Korean Patent Application No. 10-2021-7027778.

Communication issued on Sep. 13, 2024 by the National Office of Intellectual Property of Vietnam (NOIP) for Vietnamese Patent Application No. 1-2021-07995.

Communication dated Mar. 11, 2025, issued by the European Patent Office in counterpart European Application No. 20806728.0.

Office Action dated Jun. 25, 2025, issued by Mexican Patent Office in Mexican Patent Application No. MX/a/2021/013752.

* cited by examiner

FIG. 4
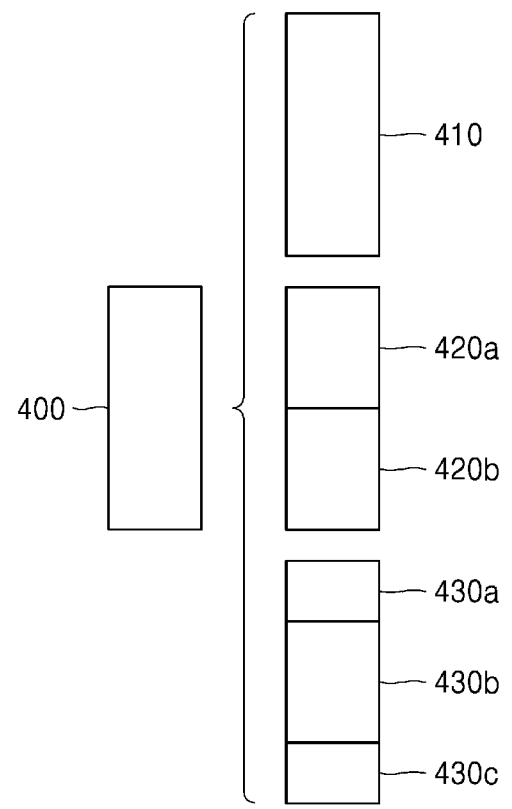
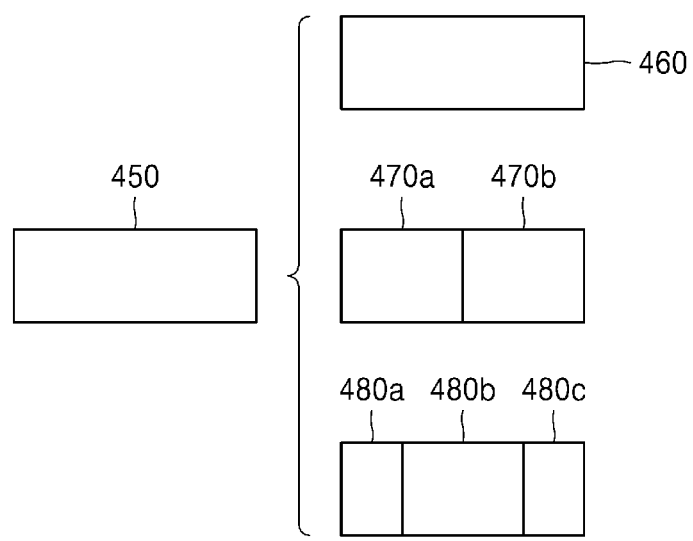

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 17

| SQUARE BLOCK | |
|---|---|
| (00)b | □ |
| (01)b | ⊞ |
| (10)b | ⊟ |
| (11)b | ⊟ |

| NON-SQUARE BLOCK | |
|---|---|
| (0)b | ▭  ▯ |
| (10)b | ⊟  ⊟ |
| (11)b | ⊟  ⊟ |

FIG. 18

| SQUARE BLOCK | |
|---|---|
| (00)b | □ |
| (10)b | ▭ |
| (11)b | ▯ |

| NON-SQUARE BLOCK | | |
|---|---|---|
| (0)b | ▭ | ▯ |
| (10)b | ▭▭ | ▯▯ |
| (11)b | ▭▭▭ | ▯▯▯ |

FIG. 23

| INDEX | CANDIDATE LIST |
|-------|----------------|
| 0     | A1             |
| 1     | B0             |
| 2     | B2             |
| 3     | Col            |

FIG. 26

| REF SAMPLE NO.<br>SIZE RATIO | [0] | [1] | [2] | [3] | [4] | [5] | [6] | [7] |
|---|---|---|---|---|---|---|---|---|
| | FILTER COEFFICIENTS APPLIED TO REF SAMPLES | | | | | | | |
| EQUAL TO OR GREATER THAN 1.75 | 0 | −5 | 15 | 41 | 19 | −5 | −1 | 0 |
| EQUAL TO OR GREATER THAN 1.25 AND LESS THAN 1.75 | −4 | 0 | 19 | 29 | 21 | 5 | −4 | −2 |
| LESS THAN 1.25 | 0 | 1 | −3 | 63 | 4 | −2 | 1 | 0 |

FIG. 29

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 0 | −4 | 2 | 20 | 28 | 20 | 2 | −4 | 0 |
| 1 | −4 | 0 | 19 | 29 | 21 | 5 | −4 | −2 |
| 2 | −4 | −1 | 18 | 29 | 22 | 6 | −4 | −2 |
| 3 | −4 | −1 | 16 | 29 | 23 | 7 | −4 | −2 |
| 4 | −4 | −1 | 16 | 28 | 24 | 7 | −4 | −2 |
| 5 | −4 | −1 | 14 | 28 | 25 | 8 | −4 | −2 |
| 6 | −3 | −3 | 14 | 27 | 26 | 9 | −3 | −3 |
| 7 | −3 | −1 | 12 | 28 | 25 | 10 | −4 | −3 |
| 8 | −3 | −3 | 11 | 27 | 27 | 11 | −3 | −3 |
| 9 | −3 | −4 | 10 | 25 | 28 | 12 | −1 | −3 |
| 10 | −3 | −3 | 9 | 26 | 27 | 14 | −3 | −3 |
| 11 | −2 | −4 | 8 | 25 | 28 | 14 | −1 | −4 |
| 12 | −2 | −4 | 7 | 24 | 28 | 16 | −1 | −4 |
| 13 | −2 | −4 | 7 | 23 | 29 | 16 | −1 | −4 |
| 14 | −2 | −4 | 6 | 22 | 29 | 18 | −1 | −4 |
| 15 | −2 | −4 | 5 | 21 | 29 | 19 | 0 | −4 |

METHOD AND DEVICE FOR ENCODING VIDEO ON BASIS OF VIDEO SIZE, AND METHOD AND DEVICE FOR DECODING VIDEO ON BASIS OF VIDEO SIZE

CROSS-REFERENCE TO RELATED APPLICATIONS

This application is a Continuation Application of International Patent Application No. PCT/KR2020/006291, filed on May 13, 2020, which claims priority from U.S. Provisional Application No. 62/846,915 filed on May 13, 2019, and U.S. Provisional Application No. 62/870,994 filed on Jul. 5, 2019, in the United States Patent and Trademark Office, the disclosures of which are incorporated by reference herein in their entireties.

BACKGROUND

1. Field

The disclosure relates to image encoding and decoding fields. More particularly, the disclosure relates to an image encoding method and apparatus and an image decoding method and apparatus based on a size of an image.

2. Description of the Related Art

In image encoding and decoding, an image is split into blocks, and each block is prediction-encoded and prediction-decoded through inter prediction or intra prediction.

Inter prediction refers to a method of compressing an image by removing temporal redundancy between images, a representative example of which is motion estimation coding. Motion estimation coding predicts blocks of a current image by using at least one reference image. A reference block that is most similar to a current block is searched for within a preset search range by using a certain evaluation function. The current block is predicted based on the reference block, and a prediction block generated as a predicted result is subtracted from the current block to generate a residual block. The residual block is then encoded. In this case, to more accurately perform prediction, interpolation may be performed on the reference image to generate pixels in a sub pel unit that is smaller than an integer pel unit, and inter prediction may be performed based on the pixels in the sub pel unit.

In a codec such as H.264 advanced video coding (AVC) and high efficiency video coding (HEVC), in order to predict a motion vector of a current block, a motion vector of previously encoded blocks adjacent to the current block or blocks included in a previously encoded image is used as a prediction motion vector of the current block. A differential motion vector, which is a difference between the motion vector of the current block and the prediction motion vector is signaled to a decoder side through a certain method.

SUMMARY

An embodiment of the disclosure provides an image encoding method and apparatus and an image decoding method and apparatus to improve the quality of a reconstructed image by encoding and decoding an image by considering a size of the image.

According to an aspect of the disclosure, an image decoding method may include: comparing a size of a current image including a current block with a size of a reference image; selecting, in the reference image, reference samples corresponding to current samples in the current block according to a motion vector of the current block; and reconstructing the current block based on the reference samples, wherein the selecting the reference samples may include: based on the size of the reference image being greater than the size of the current image, selecting the reference samples that are spaced apart from one another in the reference image by an interval corresponding to a result of a size comparison between the size of the current image with the size of the reference image.

The reconstructing of the current block may include: generating filtered samples corresponding to the reference samples by applying an n-tap filter to the reference samples; and determining prediction samples of the current samples from the filtered samples, wherein filter coefficients of the n-tap filter may be selected according to the result of the size comparison, and wherein n may be a natural number.

The reconstructing of the current block may include: based on the size of the current image being different from the size of the reference image, generating filtered samples corresponding to the reference samples by applying an n-tap filter to the reference samples, and determining prediction samples of the current samples from the filtered samples; and based on the size of the current image being equal to the size of the reference image, omitting to apply the n-tap filter to the reference samples, and determining the prediction samples from the reference samples, wherein filter coefficients of the n-tap filter may be selected according to the result of the size comparison, and wherein n may be a natural number.

The selecting of the reference samples may further include: determining a location by applying the motion vector of the current block to a location of an upper left current sample from among the current samples; changing the determined location according to the result of the size comparison; and selecting, from the reference samples, an upper left reference sample corresponding to the changed location and remaining reference samples spaced apart from the upper left reference sample by the interval corresponding to the result of the size comparison.

The image decoding method may further include: configuring a reference image list including images having sizes equal to or greater than the size of the current image from among images that are decoded before the current image is decoded; and selecting the reference image from among the images included in the reference image list.

The image decoding method may further include: determining whether an image having a same size as the size of the current image is stored in a decoded picture buffer (DPB); based on the image having the same size being stored in the DPB, configuring a candidate list including a motion vector of a temporal block in a collocated image that is decoded earlier than the current image as a candidate motion vector; and determining the motion vector of the current block based on the candidate motion vector selected from among candidate motion vectors included in the candidate list.

When the image having the same size as the size of the current image is not stored in the DPB, the motion vector of the temporal block may not be included in the candidate list.

According to another aspect of the disclosure, an image decoding apparatus may include: a prediction decoder configured to: compare a size of a current image including a current block with a size of a reference image; select, in the reference image, reference samples corresponding to current samples in the current block according to a motion vector of the current block; and reconstruct the current block based on the reference samples, wherein the prediction decoder may be further configured to, based on the size of the reference image being greater than the size of the current image, select the reference samples that are spaced apart from one another in the reference image by an interval corresponding to a result of a size comparison between the size of the current image and the size of the reference image.

According to another aspect of the disclosure, an image encoding method may include: comparing a size of a current image including a current block with a size of a reference image; selecting, in the reference image, reference samples corresponding to current samples in the current block; and encoding a motion vector indicating the reference samples, wherein, the selecting the reference samples may include, based on the size of the reference image being greater than the size of the current image, selecting the reference samples that are spaced apart from one another in the reference image by an interval corresponding to a result of a size comparison between the size of the current image and the size of the reference image.

According to another aspect of the disclosure, an image encoding apparatus may include: a prediction encoder configured to: compare a size of a current image including a current block with a size of a reference image; select, in the reference image, reference samples corresponding to current samples in the current block; and encode a motion vector indicating the reference samples, wherein the prediction encoder may be further configured to, based on the size of the reference image is greater than the size of the current image, select the reference samples that are spaced apart from one another in the reference image by an interval corresponding to a result of a size comparison between the size of the current image and the size of the reference image.

BRIEF DESCRIPTION OF THE DRAWINGS

A brief description of each drawing is provided for better understanding of the drawings cited herein.

FIG. 4 illustrates a process of determining at least one coding unit by splitting a non-square coding unit, according to an embodiment.

FIG. 13 illustrates a process of determining a depth of a coding unit as a shape and a size of the coding unit change, when the coding unit is recursively split to determine a plurality of coding units, according to an embodiment.

FIG. 17 illustrates various shapes of coding units, which may be determined based on split shape mode information that may be represented as a binary code, according to an embodiment.

FIG. 18 illustrates other shapes of coding units that may be determined based on split shape mode information that may be represented as a binary code, according to an embodiment.

FIG. 23 is a table illustrating a candidate list.

FIG. 26 is a table illustrating filter coefficients of an n-tap filter according to a size ratio between a current image and a reference image.

FIG. 29 is a table illustrating filter coefficients of an n-tap filter used to filter reference samples of FIG. 28.

DETAILED DESCRIPTION

Figure 1:
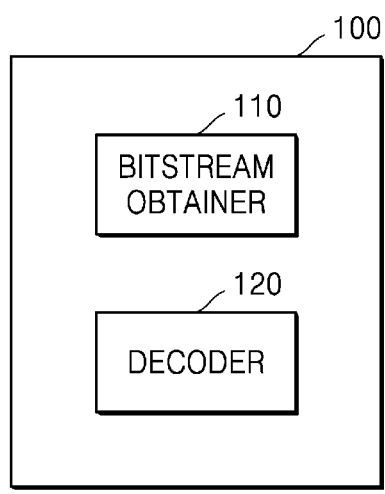
FIG. 1 is a block diagram of an image decoding apparatus, according to an embodiment.

As the disclosure allows for various changes and numerous embodiments, exemplary embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure.

In the description of embodiments, certain detailed explanations of the related art are omitted when it is deemed that they may unnecessarily obscure the essence of the disclosure. Also, numbers (e.g., first and second) used in the description of the specification are merely identifier codes for distinguishing one component from another.

Also, in the specification, it will be understood that when elements are "connected" or "coupled" to each other, the elements may be directly connected or coupled to each other, but may alternatively be connected or coupled to each other with an intervening element therebetween, unless specified otherwise.

In the specification, regarding a component represented as a "portion (unit)" or a "module", two or more components may be combined into one component or one component may be divided into two or more components according to subdivided functions. In addition, each component described hereinafter may additionally perform some or all of functions performed by another component, in addition to main functions of itself, and some of the main functions of each component may be performed entirely by another component.

Also, the term 'image' or picture' used herein may refer to a still image of a video, or a moving image, i.e., a video itself.

Also, the term 'sample' or 'signal' used herein refers to data that is assigned to a sampling location of an image and is to be processed. For example, pixel values of an image in a spatial domain or transform coefficients in a transform domain may be samples. A unit including one or more samples may be defined as a block.

Hereinafter, an image encoding method and apparatus and an image decoding method and apparatus, based on a coding unit of a tree structure and a transform unit according to an embodiment will be disclosed with reference to FIGS. 1 to 19.

FIG. 1 is a block diagram of an image decoding apparatus 100, according to an embodiment.

The image decoding apparatus 100 may include a bitstream obtainer 110 and a decoder 120. The bitstream obtainer 110 and the decoder 120 may include at least one processor. Also, the bitstream obtainer 110 and the decoder 120 may include a memory storing instructions to be executed by the at least one processor.

The bitstream obtainer 110 may receive a bitstream. The bitstream may include information resulting from image encoding by an image encoding apparatus 200 which will be described below. Also, the bitstream may be transmitted from the image encoding apparatus 200. The image decoding apparatus 100 may be connected to the image encoding apparatus 200 in a wired or wireless manner, and the bitstream obtainer 110 may receive a bitstream in a wired or wireless manner. The bitstream obtainer 110 may receive a bitstream from a storage medium, such as an optical medium or a hard disk. The decoder 120 may reconstruct an image based on information obtained from the received bitstream. The decoder 120 may obtain a syntax element for reconstructing an image from the bitstream. The decoder 120 may reconstruct the image based on the syntax element.

An operation of the image decoding apparatus 100 will be described in detail below. The bitstream obtainer 110 may receive a bitstream.

The image decoding apparatus 100 may perform an operation of obtaining a bin string corresponding to a split shape mode of a coding unit from the bitstream. Then, the image decoding apparatus 100 may perform an operation of determining a split rule of a coding unit. Also, the image decoding apparatus 100 may perform an operation of splitting a coding unit into a plurality of coding units, based on at least one of the bin string corresponding to the split shape mode and the split rule. The image decoding apparatus 100 may determine a first range which is an allowable size range of a coding unit, according to a ratio of a height to a width of the coding unit, in order to determine the split rule. The image decoding apparatus 100 may determine a second range which is an allowable size range of a coding unit, according to a split shape mode of the coding unit, in order to determine the split rule.

Hereinafter, splitting of a coding unit will be described in detail according to an embodiment of the disclosure.

First, one picture may be split into one or more slices or one or more tiles. One slice or one tile may be a sequence of one or more largest coding units (coding tree units (CTUs)). According to an embodiment, one slice may include one or more tiles, and one slice may include one or more largest coding units. A slice including one tile or a plurality of tiles may be determined in a picture.

As a concept compared to a largest coding unit (CTU), there is a largest coding block (coding tree block (CTB)). A largest coding block (CTB) denotes an N×N block including N×N samples (N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a certain size including a certain number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, an embodiment is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER).

The image decoding apparatus 100 may obtain, from the bitstream, the split shape mode information from one bin string. A form of the bitstream received by the image decoding apparatus 100 may include fixed length binary code, unary code, truncated unary code, pre-determined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad split a coding unit, whether not to split a coding unit, a split direction, and a split type, based on one bin string.

The coding unit may be smaller than or the same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape mode information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in more detail with reference to FIGS. 3 to 16.

Also, one or more prediction blocks for prediction may be determined from a coding unit. The prediction block may be the same as or smaller than the coding unit. Also, one or more transform blocks for transformation may be determined from a coding unit. The transform block may be equal to or smaller than the coding unit.

The shapes and sizes of the transform block and prediction block may not be related to each other.

In another embodiment, prediction may be performed by using a coding unit as a prediction unit. Also, transformation may be performed by using a coding unit as a transform block.

The splitting of the coding unit will be described in more detail with reference to FIGS. 3 to 16. A current block and a neighboring block of the disclosure may indicate one of the largest coding unit, the coding unit, the prediction block, and the transform block. Also, the current block or the current coding unit is a block that is currently being decoded or encoded or a block that is currently being split. The neighboring block may be a block reconstructed before the current block. The neighboring block may be adjacent to the current block spatially or temporally. The neighboring block may be located at one of the lower left, left, upper left, top, upper right, right, lower right of the current block.

Figure 3:
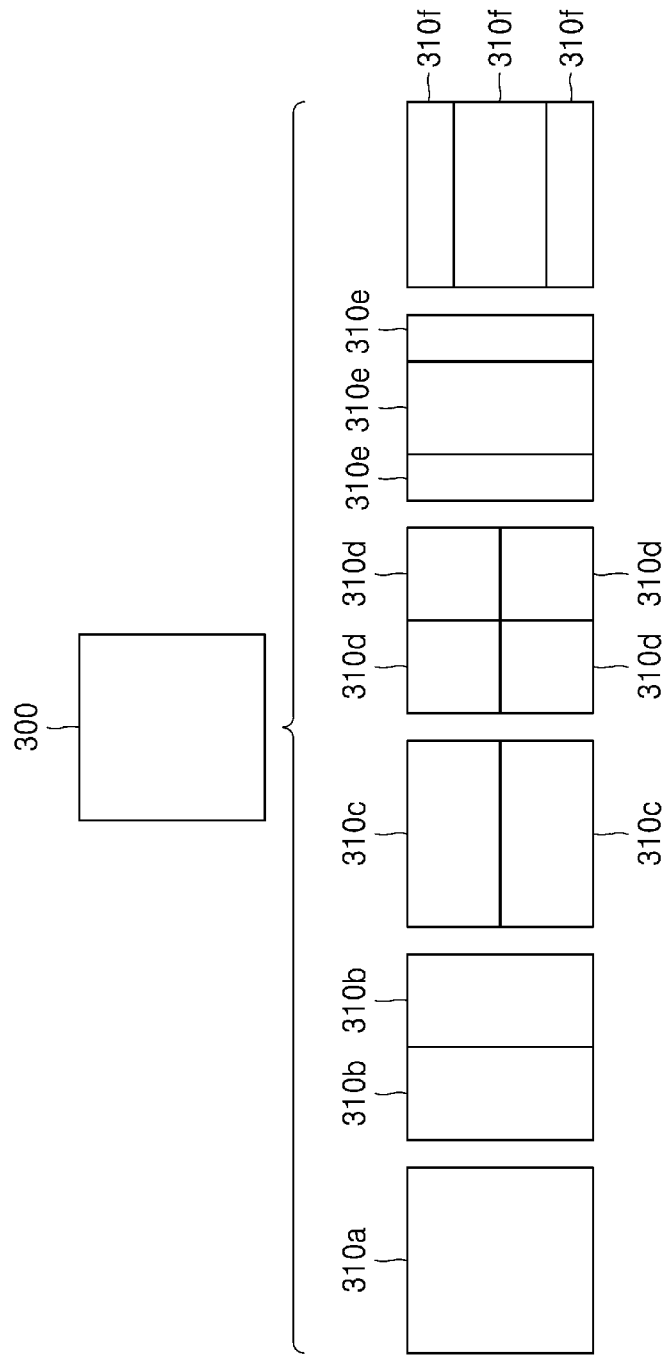
FIG. 3 illustrates a process of determining at least one coding unit by splitting a current coding unit, according to an embodiment.

FIG. 3 illustrates a process in which the image decoding apparatus 100 determines at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, a direction, a ratio of width and height, and size of a coding unit.

The shape of the coding unit may include a square and a non-square. When the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square. When the shape of the coding unit is a non-square, the image decoding apparatus 100 may determine the ratio of the width and height among the block shape information of the coding unit as at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, and the area of the coding unit.

According to an embodiment, the image decoding apparatus 100 may determine the shape of the coding unit by using the block shape information, and may determine a splitting method of the coding unit by using split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 200 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine the split shape mode information with respect to the largest coding unit to be a quad split. Also, the image decoding apparatus 100 may determine the split shape mode information with respect to the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may not split a coding unit 310a having the same size as the current coding unit 300, based on the split shape mode information indicating not to perform splitting, or may determine coding units 310b, 310c, 310d, 310e, or 310f split based on the split shape mode information indicating a certain splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary splitting in a vertical direction. The image decoding apparatus 100 may determine three coding units 310f obtained by splitting the current coding unit 300 in a horizontal direction, based on the split shape mode information indicating to perform ternary splitting in a horizontal direction. However, splitting methods of the square coding unit are not limited to the above-described methods, and the split shape mode information may indicate various methods. Certain splitting methods of splitting the square coding unit will be described in detail below through various embodiments.

FIG. 4 illustrates a process in which the image decoding apparatus 100 determines at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a certain splitting method, based on split shape mode information. Referring to FIG. 4, when the block shape information of a current coding unit 400 or 450 indicates a non-square shape, the image decoding apparatus 100 may determine a coding unit 410 or 460 having the same size as the current coding unit 400 or 450, based on the split shape mode information indicating not to perform splitting, or may determine coding units 420a and 420b, 430a to 430c, 470a and 470b, or 480a to 480c split based on the split shape mode information indicating a certain splitting method. Certain splitting methods of splitting a non-square coding unit will be described in detail below through various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting the current coding unit 400 or 450 in a direction of splitting a long side of the current coding unit 400 or 450, in consideration of the shape of the current coding unit 400 or 450.

According to an embodiment, when the split shape mode information indicates to split (ternary split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The image decoding apparatus 100 may determine to split a current coding unit into an odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a, 430b, and 430c by splitting the current coding unit 400 in the horizontal direction. Also, when the current coding unit 450 is in the horizontal direction, the image decoding apparatus 100 may determine the coding units 480a, 480b, and 480c by splitting the current coding unit 450 in the vertical direction.

According to an embodiment, the image decoding apparatus 100 may determine an odd number of coding units included in the current coding unit 400 or 450, and not all the determined coding units may have the same size. For example, a certain coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and moreover, may put a certain restriction on at least one of the odd number of coding units generated by splitting the current coding unit 400 or 450. Referring to FIG. 4, the image decoding apparatus 100 may set a decoding process regarding the coding unit 430b or 480b located at the center among the three coding units 430a, 430b, and 430c, or 480a, 480b, and 480c generated as the current coding unit 400 or 450 is split to be different from that of the other coding units 430a and 430c, or 480a and 480c. For example, the image decoding apparatus 100 may restrict the coding unit 430b or 480b at the center location to be no longer split or to be split only a certain number of times, unlike the other coding units 430a and 430c, or 480a and 480c.

Figure 5:
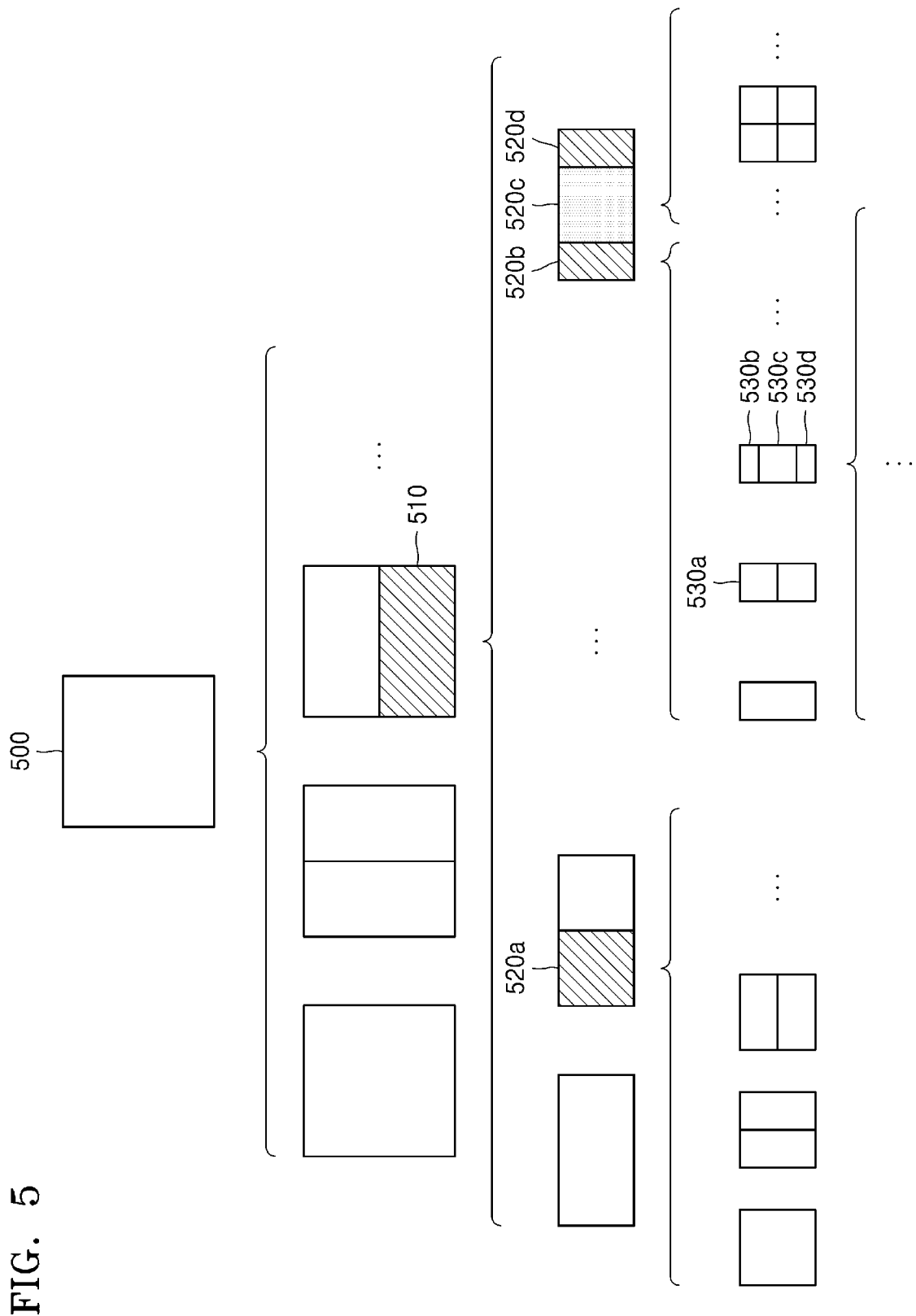
FIG. 5 illustrates a process of splitting a coding unit based on at least one of block shape information and split shape mode information, according to an embodiment.

FIG. 5 illustrates a process in which the image decoding apparatus 100 splits a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the relation of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may or may not split the non-square second coding unit 510, which is determined by splitting the first coding unit 500, into one or more third coding units 520a, 520b, 520c, and 520d based on the split shape mode information. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units (e.g., 520*a*, or 520*b*, 520*c*, and 520*d*) based on the split shape mode information of the second coding unit 510. That is, a coding unit may be recursively split based on the split shape mode information of each coding unit. Accordingly, a square coding unit may be determined by splitting a non-square coding unit, and a non-square coding unit may be determined by recursively splitting the square coding unit.

Referring to FIG. 5, a certain coding unit (e.g., a coding unit located at a center location, or a square coding unit) from among an odd number of third coding units 520*b*, 520*c*, and 520*d* determined by splitting the non-square second coding unit 510 may be recursively split. According to an embodiment, the non-square third coding unit 520*b* from among the odd number of third coding units 520*b*, 520*c*, and 520*d* may be split in a horizontal direction into a plurality of fourth coding units. A non-square fourth coding unit 530*b* or 530*d* from among the plurality of fourth coding units 530*a*, 530*b*, 530*c*, and 530*d* may be re-split into a plurality of coding units. For example, the non-square fourth coding unit 530*b* or 530*d* may be re-split into an odd number of coding units. A method that may be used to recursively split a coding unit will be described below through various embodiments.

According to an embodiment, the image decoding apparatus 100 may split each of the third coding units 520*a*, 520*b*, 520*c*, and 520*d* into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520*b*, 520*c*, and 520*d*. The image decoding apparatus 100 may put a certain restriction on a certain third coding unit from among the odd number of third coding units 520*b*, 520*c*, and 520*d*. For example, the image decoding apparatus 100 may restrict the third coding unit 520*c* at a center location from among the odd number of third coding units 520*b*, 520*c*, and 520*d* to be no longer split or to be split a settable number of times.

Referring to FIG. 5, the image decoding apparatus 100 may restrict the third coding unit 520*c*, which is at the center location from among the odd number of third coding units 520*b*, 520*c*, and 520*d* included in the non-square second coding unit 510, to be no longer split, to be split by using a certain splitting method (e.g., split into only four coding units or split by using a splitting method of the second coding unit 510), or to be split only a certain number of times (e.g., split only n times (where n>0)). However, the restrictions on the third coding unit 520*c* at the center location are not limited to the above-described examples, and may include various restrictions for decoding the third coding unit 520*c* at the center location differently from the other third coding units 520*b* and 520*d*.

According to an embodiment, the image decoding apparatus 100 may obtain the split shape mode information, which is used to split a current coding unit, from a certain location in the current coding unit.

Figure 6:
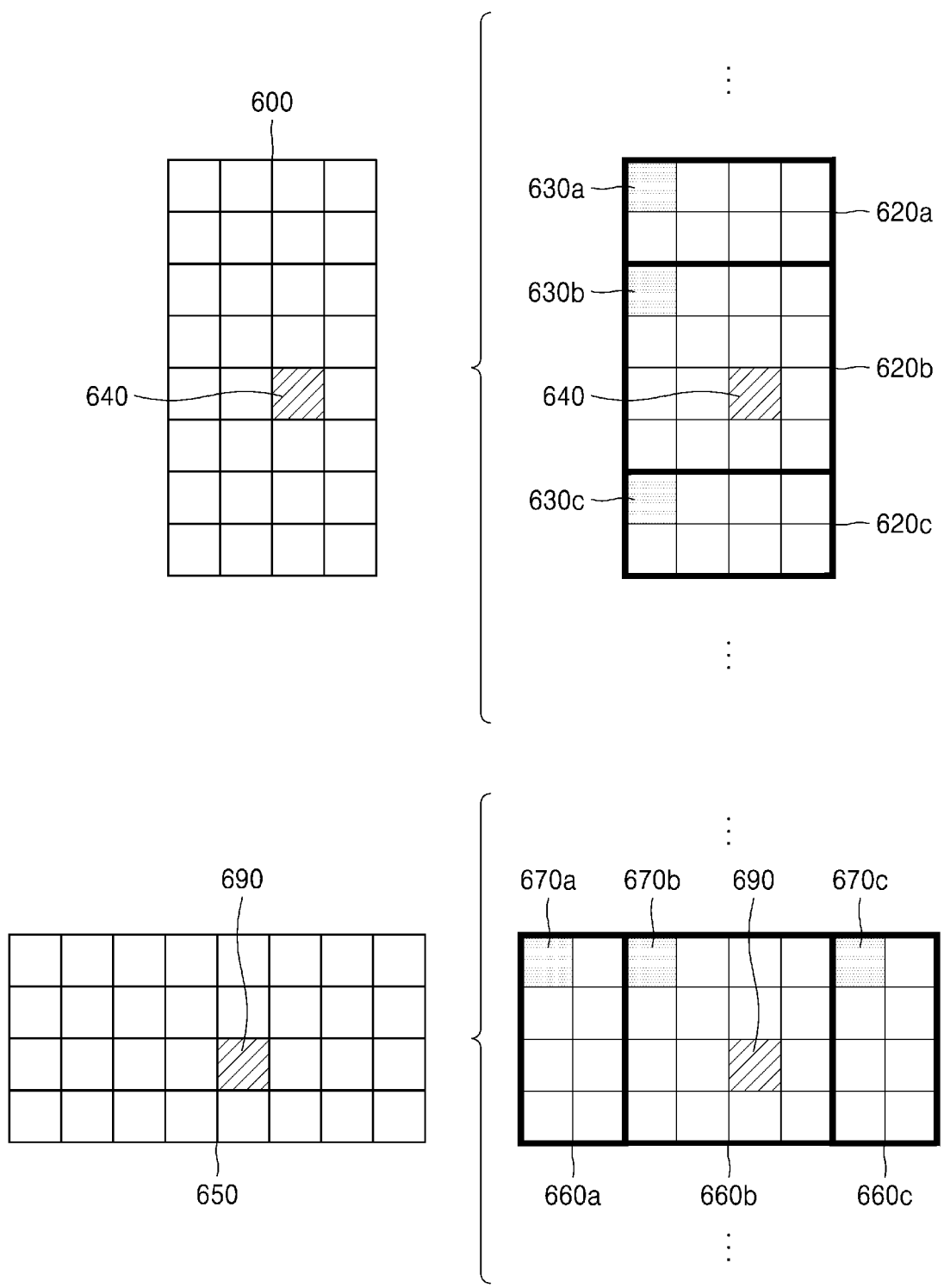
FIG. 6 illustrates a method of determining a certain coding unit from among an odd number of coding units, according to an embodiment.

FIG. 6 illustrates a method in which the image decoding apparatus 100 determines a certain coding unit from among an odd number of coding units, according to an embodiment.

Referring to FIG. 6, split shape mode information of a current coding unit 600 or 650 may be obtained from a sample of a certain location (e.g., a sample 640 or 690 of a center location) from among a plurality of samples included in the current coding unit 600 or 650. However, the certain location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, lower right locations, or the like). The image decoding apparatus 100 may obtain the split shape mode information from the certain location and may determine to split or not to split the current coding unit into various-shaped and various-sized coding units.

According to an embodiment, when the current coding unit is split into a certain number of coding units, the image decoding apparatus 100 may select one of the coding units. Various methods may be used to select one of a plurality of coding units, as will be described below through various embodiments.

According to an embodiment, the image decoding apparatus 100 may split the current coding unit into a plurality of coding units, and may determine a coding unit at a certain location.

According to an embodiment, the image decoding apparatus 100 may use information indicating locations of the odd number of coding units, to determine a coding unit at a center location from among the odd number of coding units. Referring to FIG. 6, the image decoding apparatus 100 may determine the odd number of coding units 620*a*, 620*b*, and 620*c* or the odd number of coding units 660*a*, 660*b*, and 660*c* by splitting the current coding unit 600 or the current coding unit 650. The image decoding apparatus 100 may determine the middle coding unit 620*b* or the middle coding unit 660*b* by using information about locations of the odd number of coding units 620*a*, 620*b*, and 620*c* or the odd number of coding units 660*a*, 660*b*, and 660*c*. For example, the image decoding apparatus 100 may determine the coding unit 620*b* of the center location by determining the locations of the coding units 620*a*, 620*b*, and 620*c* based on information indicating locations of certain samples included in the coding units 620*a*, 620*b*, and 620*c*. In detail, the image decoding apparatus 100 may determine the coding unit 620*b* at the center location by determining the locations of the coding units 620*a*, 620*b*, and 620*c* based on information indicating locations of upper left samples 630*a*, 630*b*, and 630*c* of the coding units 620*a*, 620*b*, and 620*c*.

According to an embodiment, the information indicating the locations of the upper left samples 630*a*, 630*b*, and 630*c*, which are respectively included in the coding units 620*a*, 620*b*, and 620*c*, may include information about locations or coordinates of the coding units 620*a*, 620*b*, and 620*c* in a picture. According to an embodiment, the information indicating the locations of the upper left samples 630*a*, 630*b*, and 630*c*, which are included in the coding units 620*a*, 620*b*, and 620*c*, respectively, may include information indicating widths or heights of the coding units 620*a*, 620*b*, and 620*c* included in the current coding unit 600, and the widths or heights may correspond to information indicating differences between the coordinates of the coding units 620*a*, 620*b*, and 620*c* in the picture. That is, the image decoding apparatus 100 may determine the coding unit 620*b* at the center location by directly using the information about the locations or coordinates of the coding units 620*a*, 620*b*, and 620*c* in the picture, or by using the information about the widths or heights of the coding units, which correspond to the difference values between the coordinates.

According to an embodiment, information indicating the location of the upper left sample 630a of the upper coding unit 620a may include coordinates (xa, ya), information indicating the location of the upper left sample 630b of the middle coding unit 620b may include coordinates (xb, yb), and information indicating the location of the upper left sample 630c of the lower coding unit 620c may include coordinates (xc, yc). The image decoding apparatus 100 may determine the middle coding unit 620b by using the coordinates of the upper left samples 630a, 630b, and 630c which are included in the coding units 620a, 620b, and 620c, respectively. For example, when the coordinates of the upper left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the upper left samples 630a, 630b, and 630c may include coordinates indicating absolute locations in the picture, or may use coordinates (dxb, dyb) indicating a relative location of the upper left sample 630b of the middle coding unit 620b and coordinates (dxc, dyc) indicating a relative location of the upper left sample 630c of the lower coding unit 620c with respect to the location of the upper left sample 630a of the upper coding unit 620a. A method of determining a coding unit at a certain location by using coordinates of a sample included in the coding unit as information indicating a location of the sample is not limited to the above-described method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a certain criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the upper left sample 630a of the upper coding unit 620a, the coordinates (xb, yb) that is the information indicating the location of the upper left sample 630b of the middle coding unit 620b, and the coordinates (xc, yc) that are the information indicating the location of the upper left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 and the widths or heights of the upper and middle coding units 620a and 620b. The image decoding apparatus 100 may determine a coding unit, which has a size different from that of the others, based on the determined widths and heights of the coding units 620a, 620b, and 620c. Referring to FIG. 6, the image decoding apparatus 100 may determine the middle coding unit 620b, which has a size different from the size of the upper and lower coding units 620a and 620c, as the coding unit of the certain location. However, the above-described process in which the image decoding apparatus 100 determines a coding unit having a size different from the size of the other coding units merely corresponds to an example of determining a coding unit at a certain location by using the sizes of coding units, which are determined based on coordinates of samples, and thus various processes of determining a coding unit at a certain location by comparing the sizes of coding units, which are determined based on coordinates of certain samples, may be used.

The image decoding apparatus 100 may determine the width or height of each of the coding units 660a, 660b, and 660c by using coordinates (xd, yd) that are information indicating a location of an upper left sample 670a of the left coding unit 660a, coordinates (xe, ye) that are information indicating a location of an upper left sample 670b of the middle coding unit 660b, and coordinates (xf, yf) that are information indicating a location of an upper left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 650. According to an embodiment, the image decoding apparatus 100 may determine the width or height of the right coding unit 660c by using the width or height of the current coding unit 650 and the widths or heights of the left and middle coding units 660a and 660b. The image decoding apparatus 100 may determine a coding unit, which has a size different from that of the others, based on the determined widths and heights of the coding units 660a, 660b, and 660c. Referring to FIG. 6, the image decoding apparatus 100 may determine the middle coding unit 660b, which has a size different from the size of the left and right coding units 660a and 660c, as the coding unit of the certain location. However, the above-described process in which the image decoding apparatus 100 determines a coding unit having a size different from the size of the other coding units merely corresponds to an example of determining a coding unit at a certain location by using the sizes of coding units, which are determined based on coordinates of samples, and thus various processes of determining a coding unit at a certain location by comparing the sizes of coding units, which are determined based on coordinates of certain samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a certain location from among an odd number of coding units determined by splitting the current coding unit, by considering the shape of the current coding unit. For example, when the current coding unit has a non-square shape, a width of which is longer than a height, the image decoding apparatus 100 may determine the coding unit at the certain location in a horizontal direction. That is, the image decoding apparatus 100 may determine one of coding units at different locations in a horizontal direction and may put a restriction on the coding unit. When the current coding unit has a non-square shape, a height of which is longer than a width, the image decoding apparatus 100 may determine the coding unit at the certain location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the certain location from among the even number of coding units. The image decoding apparatus 100 may determine an even number of coding units by splitting (binary splitting) the current coding unit, and may determine the coding unit at the certain location by using the information about the locations of the even number of coding units. An operation related thereto may correspond to the operation of determining a coding unit at a certain location (e.g., a center location) from among an odd number of coding units, which has been described in detail above with reference to FIG. 6, and thus detailed descriptions thereof will be omitted.

According to an embodiment, when a non-square current coding unit is split into a plurality of coding units, certain information about a coding unit at a certain location may be used in a splitting operation to determine the coding unit at the certain location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, certain information for identifying the coding unit at the certain location may be obtained from a certain sample included in a coding unit to be determined. Referring to FIG. 6, the image decoding apparatus 100 may use the split shape mode information, which is obtained from a sample at a certain location in the current coding unit 600 (e.g., a sample at a center location of the current coding unit 600) to determine a coding unit at a certain location from among the plurality of the coding units 620a, 620b, and 620c determined by splitting the current coding unit 600 (e.g., a coding unit at a center location from among a plurality of split coding units). That is, the image decoding apparatus 100 may determine the sample at the certain location by considering a block shape of the current coding unit 600, may determine the coding unit 620b including a sample, from which certain information (e.g., the split shape mode information) may be obtained, from among the plurality of coding units 620a, 620b, and 620c determined by splitting the current coding unit 600, and may put a certain restriction on the coding unit 620b. Referring to FIG. 6, according to an embodiment, the image decoding apparatus 100 may determine the sample 640 at the center location of the current coding unit 600 as the sample from which the certain information may be obtained, and may put a certain restriction on the coding unit 620b including the sample 640, in a decoding process. However, the location of the sample from which the certain information may be obtained is not limited to the above-described location, and may include arbitrary locations of samples included in the coding unit 620b to be determined for a restriction.

According to an embodiment, the location of the sample from which the certain information may be obtained may be determined based on the shape of the current coding unit 600. According to an embodiment, the block shape information may indicate whether the current coding unit has a square or non-square shape, and the location of the sample from which the certain information may be obtained may be determined based on the shape. For example, the image decoding apparatus 100 may determine a sample located at a boundary for splitting at least one of a width and height of the current coding unit in half, as the sample from which the certain information may be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the certain information may be obtained.

According to an embodiment, when the current coding unit is split into a plurality of coding units, the image decoding apparatus 100 may use the split shape mode information to determine a coding unit at a certain location from among the plurality of coding units. According to an embodiment, the image decoding apparatus 100 may obtain the split shape mode information from a sample at a certain location in a coding unit, and may split the plurality of coding units, which are generated by splitting the current coding unit, by using the split shape mode information, which is obtained from the sample of the certain location in each of the plurality of coding units. That is, a coding unit may be recursively split based on the split shape mode information, which is obtained from the sample at the certain location in each coding unit. A process of recursively splitting a coding unit has been described above with reference to FIG. 5, and thus detailed descriptions thereof will be omitted.

According to an embodiment, the image decoding apparatus 100 may determine one or more coding units by splitting the current coding unit, and may determine an order of decoding the one or more coding units, based on a certain block (e.g., the current coding unit).

Figure 7:
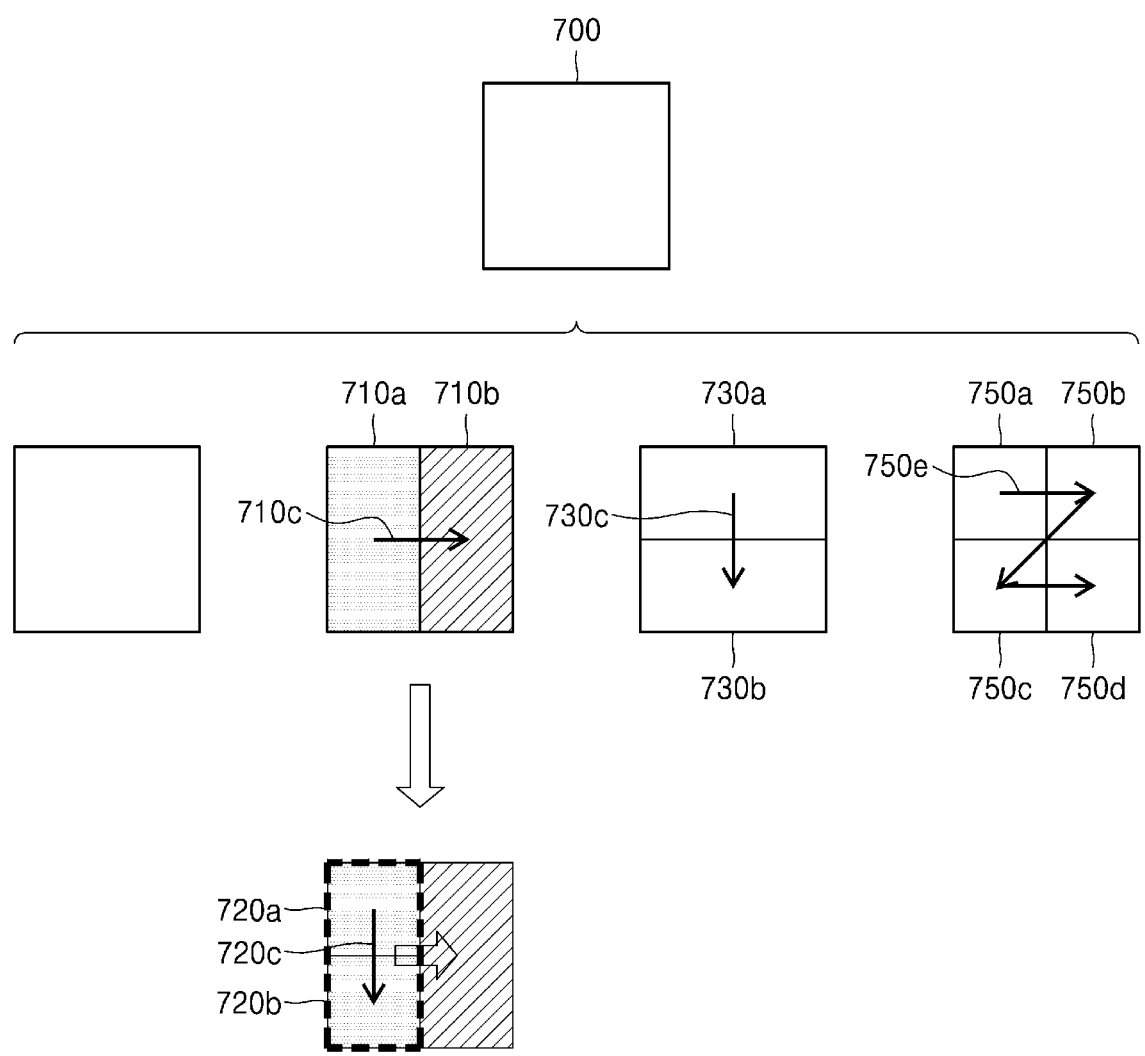
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, may determine second coding units 730a and 730b by splitting the first coding unit 700 in a horizontal direction, or may determine second coding units 750a, 750b, 750c, and 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine the second coding units 750a, 750b, 750c, and 750d, which are determined by splitting the first coding unit 700 in vertical and horizontal directions, according to a certain order (e.g., a raster scan order or Z-scan order 750e) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710a and 710b, 730a and 730b, or 750a, 750b, 750c, and 750d by splitting the first coding unit 700, and may recursively split each of the determined plurality of coding units 710a, 710b, 730a, 730b, 750a, 750b, 750c, and 750d. A splitting method of the plurality of coding units 710a and 710b, 730a and 730b, or 750a, 750b, 750c, and 750d may correspond to a splitting method of the first coding unit 700. Accordingly, each of the plurality of coding units 710a and 710b, 730a and 730b, or 750a, 750b, 750c, and 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on a process of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. A process of determining a processing order of coding units based on a coding unit before being split is not limited to the above-described example, and various methods may be used to independently process coding units, which are split and determined to various shapes, in a certain order.

Figure 8:
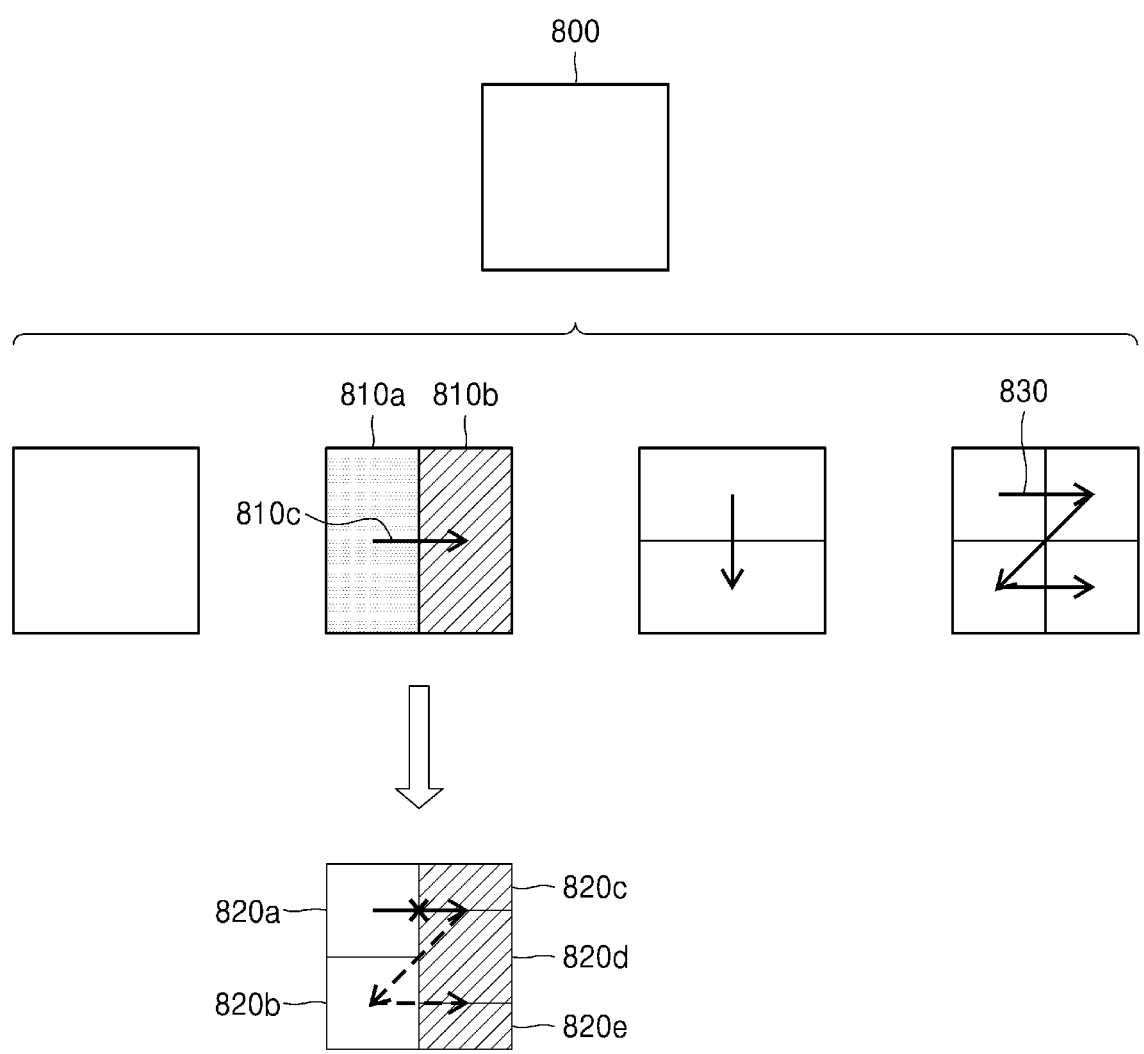
FIG. 8 illustrates a process of determining that a current coding unit is to be split into an odd number of coding units, when the coding units are not processable in a certain order, according to an embodiment.

FIG. 8 illustrates a process in which the image decoding apparatus 100 determines that a current coding unit is to be split into an odd number of coding units, when the coding units are not processable in a certain order, according to an embodiment.

According to an embodiment, the image decoding apparatus 100 may determine that the current coding unit is to be split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c, 820d, and 820e. According to an embodiment, the image decoding apparatus 100 may determine the plurality of third coding units 820a and 820b by splitting the left second coding unit 810a in a horizontal direction 810c, and may split the right second coding unit 810b into the odd number of third coding units 820c, 820d, and 820e.

According to an embodiment, the image decoding apparatus 100 may determine whether any coding unit is split into an odd number of coding units, by determining whether the third coding units 820a and 820b, and 820c, 820d, and 820e are processable in a certain order. Referring to FIG. 8, the image decoding apparatus 100 may determine the third coding units 820a and 820b, and 820c, 820d, and 820e by recursively splitting the first coding unit 800. The image decoding apparatus 100 may determine whether any of the first coding unit 800, the second coding units 810a and 810b, or the third coding units 820a and 820b, and 820c, 820d, and 820e are split into an odd number of coding units, based on at least one of the block shape information and the split shape mode information. For example, a right coding unit from among the second coding units 810a and 810b may be split into an odd number of third coding units 820c, 820d, and 820e. A processing order of a plurality of coding units included in the first coding unit 800 may be a certain order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the certain order.

According to an embodiment, the image decoding apparatus 100 may determine whether the third coding units 820a and 820b, and 820c, 820d, and 820e included in the first coding unit 800 satisfy the condition for processing in the certain order, and the condition relates to whether at least one of a width and height of the second coding units 810a and 810b is to be split in half along a boundary of the third coding units 820a and 820b, and 820c, 820d, and 820e. For example, the third coding units 820a and 820b determined when the height of the left second coding unit 810a of the non-square shape is split in half may satisfy the condition.

It may be determined that the third coding units 820c, 820d, and 820e do not satisfy the condition because the boundaries of the third coding units 820c, 820d, and 820e determined when the right second coding unit 810b is split into three coding units are unable to split the width or height of the right second coding unit 810b in half. When the condition is not satisfied as described above, the image decoding apparatus 100 may decide disconnection of a scan order, and may determine that the right second coding unit 810b is to be split into an odd number of coding units, based on a result of the decision. According to an embodiment, when a coding unit is split into an odd number of coding units, the image decoding apparatus 100 may put a certain restriction on a coding unit at a certain location from among the split coding units. The restriction or the certain location has been described above through various embodiments, and thus detailed descriptions thereof will be omitted.

Figure 9:
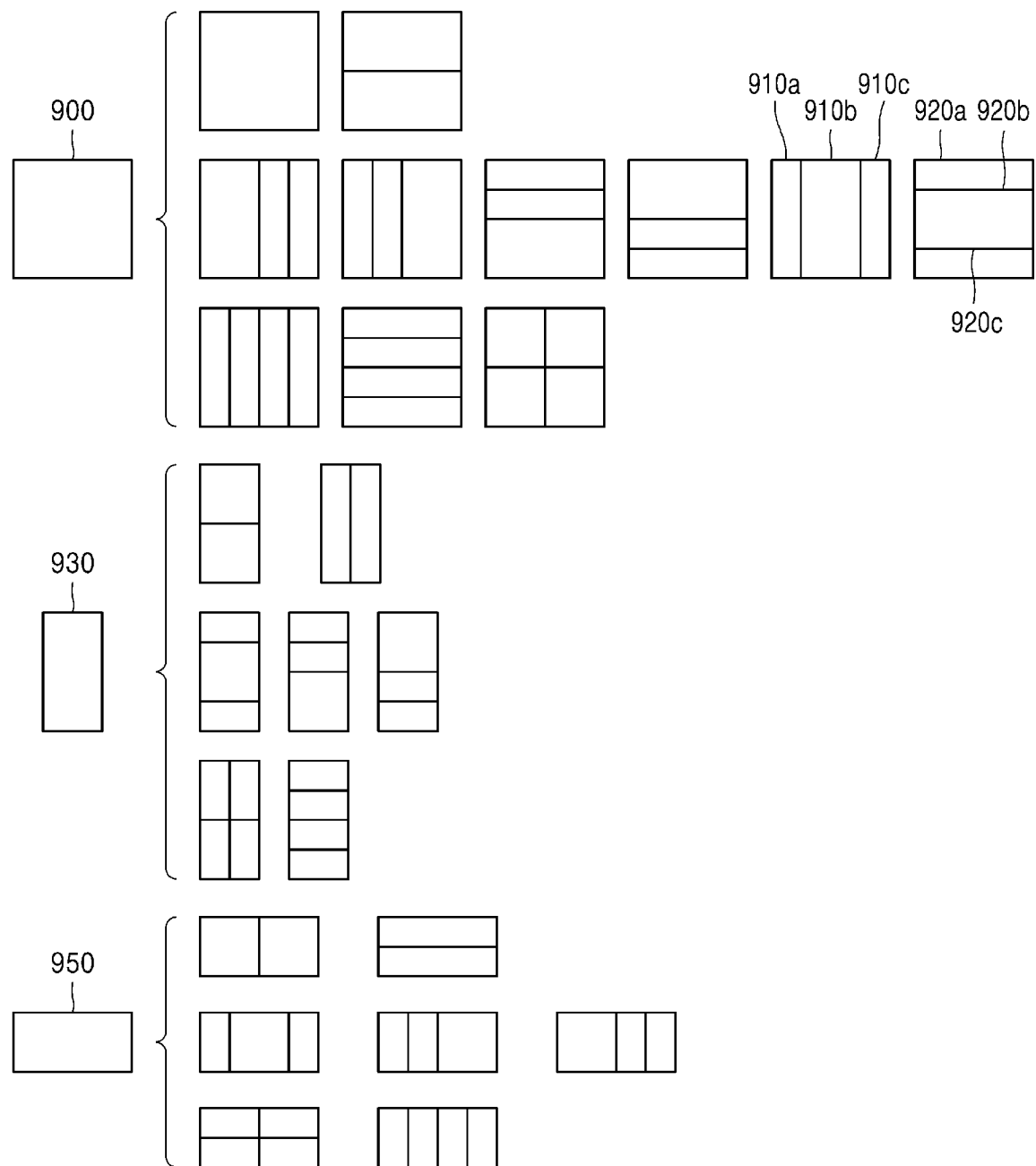
FIG. 9 illustrates a process of determining at least one coding unit by splitting a first coding unit, according to an embodiment.

FIG. 9 illustrates a process in which the image decoding apparatus 100 determines at least one coding unit by splitting a first coding unit 900, according to an embodiment.

According to an embodiment, the image decoding apparatus 100 may split the first coding unit 900, based on split shape mode information, which is obtained by the bitstream obtainer 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a certain order, and the condition relates to whether at least one of a width and height of the first coding unit 900 is to be split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the certain order. Also, because boundaries of the second coding units 920a, 920b, and 920c determined by splitting the square first coding unit 900 in a horizontal direction do not split the height of the first coding unit 900 in half, it may be determined that the first coding unit 900 does not satisfy the condition for processing in the certain order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a certain restriction on a coding unit at a certain location from among the split coding units. The restriction or the certain location has been described above through various embodiments, and thus detailed descriptions thereof will be omitted.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
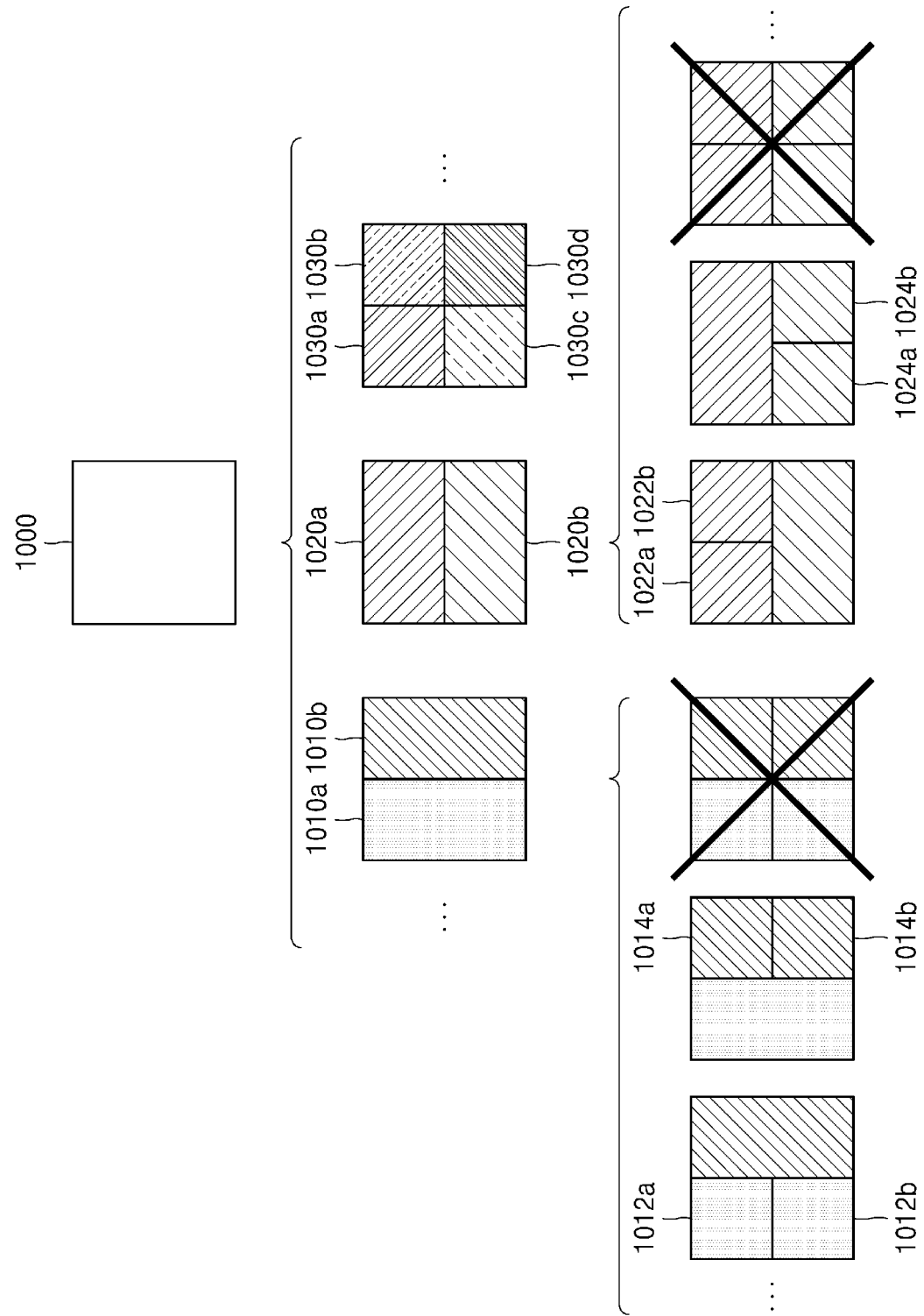
FIG. 10 illustrates that a shape into which a second coding unit is splittable is restricted when a second coding unit having a non-square shape, which is determined when a first coding unit is split, satisfies a certain condition, according to an embodiment.

FIG. 10 illustrates that a shape into which a second coding unit is splittable is restricted when the second coding unit having a non-square shape, which is determined when the image decoding apparatus 100 splits a first coding unit 1000, satisfies a certain condition, according to an embodiment.

According to an embodiment, the image decoding apparatus 100 may determine to split the square first coding unit 1000 into non-square second coding units 1010a, and 1010b or 1020a and 1020b, based on split shape mode information, which is obtained by the bitstream obtainer 110. The second coding units 1010a and 1010b, or 1020a and 1020b may be independently split. Accordingly, the image decoding apparatus 100 may determine to split or not to split each of the second coding units 1010a and 1010b, or 1020a and 1020b into a plurality of coding units, based on the split shape mode information of each of the second coding units 1010a and 1010b, or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b not to be split in a horizontal direction in which the left second coding unit 1010a is split. When third coding units 1014a and 1014b are determined by splitting the right second coding unit 1010b in the same direction, because the left and right second coding units 1010a and 1010b are independently split in a horizontal direction, the third coding units 1012a, 1012b, 1014a, and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b, or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) not to be split in a vertical direction in which the upper second coding unit 1020a is split.

Figure 11:
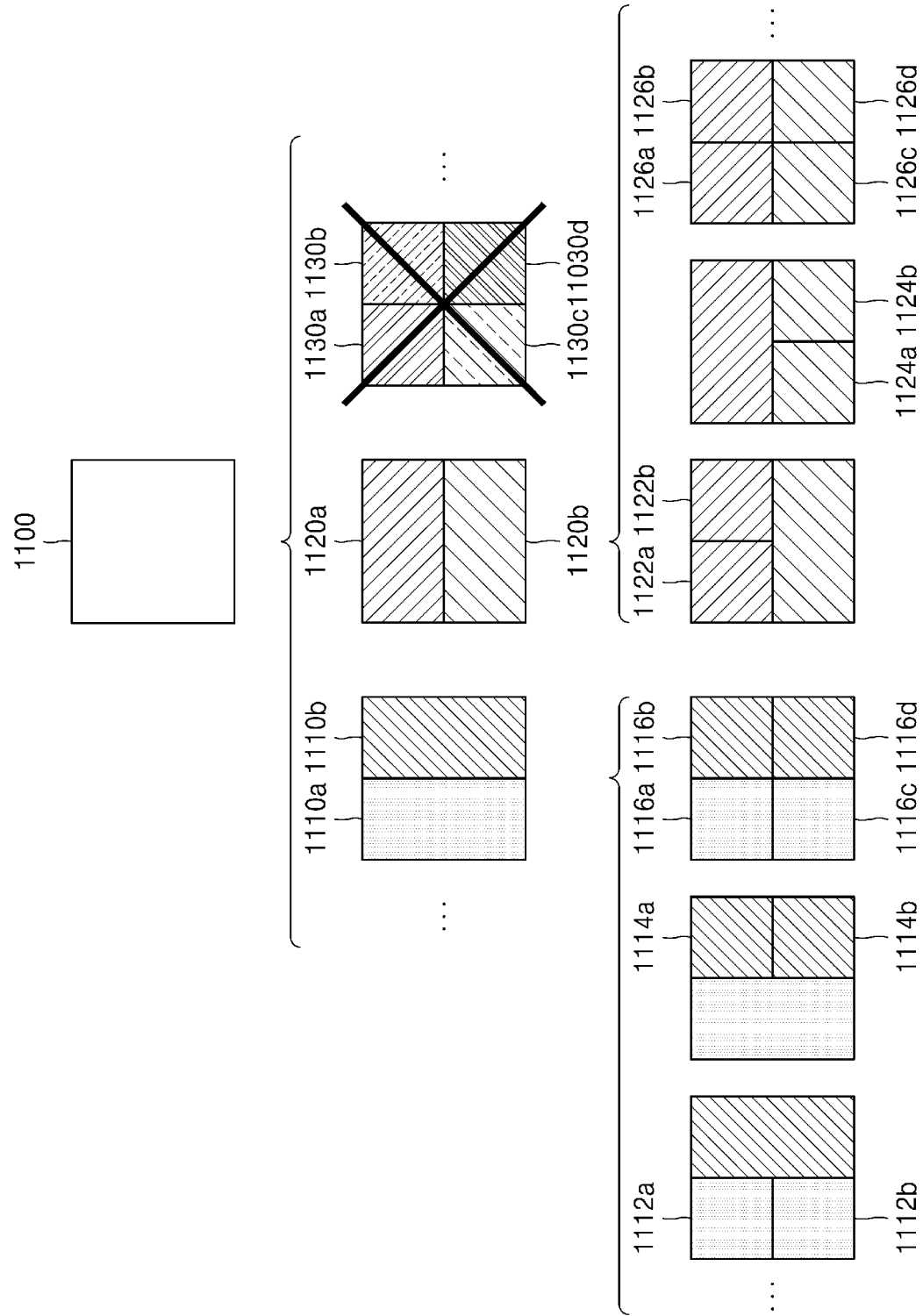
FIG. 11 illustrates a process of splitting a square coding unit when split shape mode information indicates that the square coding unit is not to be split into four square coding units, according to an embodiment.

FIG. 11 illustrates a process in which the image decoding apparatus 100 splits a square coding unit when split shape mode information indicates that the square coding unit is not to be split into four square coding units, according to an embodiment.

According to an embodiment, the image decoding apparatus 100 may determine second coding units 1110a and 1110b, or 1120a and 1120b, etc. by splitting a first coding unit 1100, based on split shape mode information. The split shape mode information may include information about various methods of splitting a coding unit but, the information about various splitting methods may not include information for splitting a coding unit into foursquare coding units. According to such split shape mode information, the image decoding apparatus 100 may not split the square first coding unit 1100 into four square second coding units 1130*a*, 1130*b*, 1130*c*, and 1130*d*. The image decoding apparatus 100 may determine the non-square second coding units 1110*a* and 1110*b*, or 1120*a* and 1120*b*, etc., based on the split shape mode information.

According to an embodiment, the image decoding apparatus 100 may independently split the non-square second coding units 1110*a* and 1110*b*, or 1120*a* and 1120*b*, etc. Each of the second coding units 1110*a* and 1110*b*, or 1120*a* and 1120*b*, etc. may be recursively split in a certain order, and this splitting method may correspond to a method of splitting the first coding unit 1100, based on the split shape mode information.

For example, the image decoding apparatus 100 may determine square third coding units 1112*a* and 1112*b* by splitting the left second coding unit 1110*a* in a horizontal direction, and may determine square third coding units 1114*a* and 1114*b* by splitting the right second coding unit 1110*b* in a horizontal direction. Furthermore, the image decoding apparatus 100 may determine square third coding units 1116*a*, 1116*b*, 1116*c*, and 1116*d* by splitting both of the left and right second coding units 1110*a* and 1110*b* in a horizontal direction. In this case, coding units having the same shape as the four square second coding units 1130*a*, 1130*b*, 1130*c*, and 1130*d* split from the first coding unit 1100 may be determined.

As another example, the image decoding apparatus 100 may determine square third coding units 1122*a* and 1122*b* by splitting the upper second coding unit 1120*a* in a vertical direction, and may determine square third coding units 1124*a* and 1124*b* by splitting the lower second coding unit 1120*b* in a vertical direction. Furthermore, the image decoding apparatus 100 may determine square third coding units 1126*a*, 1126*b*, 1126*c*, and 1126*d* by splitting both the upper and lower second coding units 1120*a* and 1120*b* in a vertical direction. In this case, coding units having the same shape as the four square second coding units 1130*a*, 1130*b*, 1130*c*, and 1130*d* split from the first coding unit 1100 may be determined.

Figure 12:
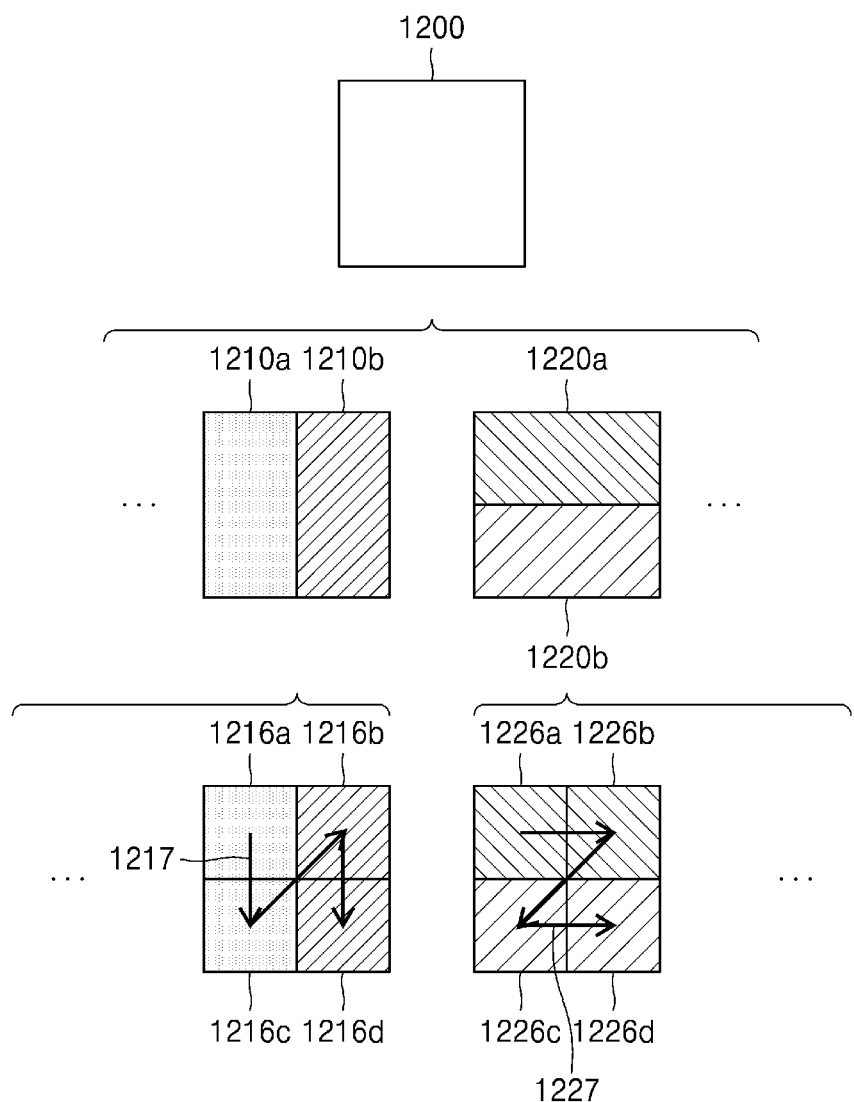
FIG. 12 illustrates that a processing order between a plurality of coding units may vary according to a process of splitting a coding unit, according to an embodiment.

FIG. 12 illustrates that a processing order between a plurality of coding units may vary according to a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units (e.g., 1210*a* and 1210*b*, or 1220*a* and 1220*b*, etc.) by splitting the first coding unit 1200. Referring to FIG. 12, the non-square second coding units 1210*a* and 1210*b*, or 1220*a* and 1220*b* determined by splitting the first coding unit 1200 in only a horizontal direction or vertical direction may be independently split based on the split shape mode information of each coding unit. For example, the image decoding apparatus 100 may determine third coding units 1216*a*, 1216*b*, 1216*c*, and 1216*d* by splitting the second coding units 1210*a* and 1210*b*, which are generated by splitting the first coding unit 1200 in a vertical direction, in a horizontal direction, and may determine third coding units 1226*a*, 1226*b*, 1226*c*, and 1226*d* by splitting the second coding units 1220*a* and 1220*b*, which are generated by splitting the first coding unit 1200 in a horizontal direction, in a vertical direction. A process of splitting the second coding units 1210*a* and 1210*b*, or 1220*a* and 1220*b* has been described above with reference to FIG. 11, and thus detailed descriptions thereof will be omitted.

According to an embodiment, the image decoding apparatus 100 may process coding units in a certain order. An operation of processing coding units in a certain order has been described above with reference to FIG. 7, and thus detailed descriptions thereof will be omitted. Referring to FIG. 12, the image decoding apparatus 100 may determine four square third coding units 1216*a*, 1216*b*, 1216*c*, and 1216*d*, and 1226*a*, 1226*b*, 1226*c*, and 1226*d* by splitting the square first coding unit 1200. According to an embodiment, the image decoding apparatus 100 may determine processing orders of the third coding units 1216*a*, 1216*b*, 1216*c*, and 1216*d*, and 1226*a*, 1226*b*, 1226*c*, and 1226*d* based on a split shape into which the first coding unit 1200 is split.

According to an embodiment, the image decoding apparatus 100 may determine the third coding units 1216*a*, 1216*b*, 1216*c*, and 1216*d* by splitting the second coding units 1210*a* and 1210*b* generated by splitting the first coding unit 1200 in a vertical direction, in a horizontal direction, and may process the third coding units 1216*a*, 1216*b*, 1216*c*, and 1216*d* in a processing order 1217 for initially processing the third coding units 1216*a* and 1216*c*, which are included in the left second coding unit 1210*a*, in a vertical direction and then processing the third coding unit 1216*b* and 1216*d*, which are included in the right second coding unit 1210*b*, in a vertical direction.

According to an embodiment, the image decoding apparatus 100 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 12, the square third coding units 1216*a*, 1216*b*, 1216*c*, and 1216*d*, and 1226*a*, 1226*b*, 1226*c*, and 1226*d* may be determined by splitting the second coding units 1210*a* and 1210*b*, and 1220*a* and 1220*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to have the same shape.

FIG. 13 illustrates a process of determining a depth of a coding unit as a shape and a size of the coding unit change, when the coding unit is recursively split to determine a plurality of coding units, according to an embodiment.

According to an embodiment, the image decoding apparatus 100 may determine a depth of a coding unit, based on a certain criterion. For example, the certain criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is represented as a coding unit of a lower depth.

Referring to FIG. 13, according to an embodiment, the image decoding apparatus 100 may determine a second coding unit 1302 and a third coding unit 1304 of lower depths by splitting a square first coding unit 1300 based on block shape information indicating a square shape (e.g., the block shape information may be represented as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of lower depths by splitting a non-square first coding unit 1310 or 1320 based on block shape information indicating a non-square shape (e.g., the block shape information may be represented as '1: NS_VER' indicating a non-square shape, a height of which is longer than a width, or as '2: NS_HOR' indicating a non-square shape, a width of which is longer than a height).

The image decoding apparatus 100 may determine the second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine a second coding unit (e.g., 1302, 1312, or 1322) by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit (e.g., 1304, 1314, or 1324) by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine a third coding unit (e.g., 1304, 1314, or 1324) by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine a third coding unit (e.g., 1304, 1314, or 1324) by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split a square coding unit (e.g., 1300, 1302, or 1304) in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of a longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
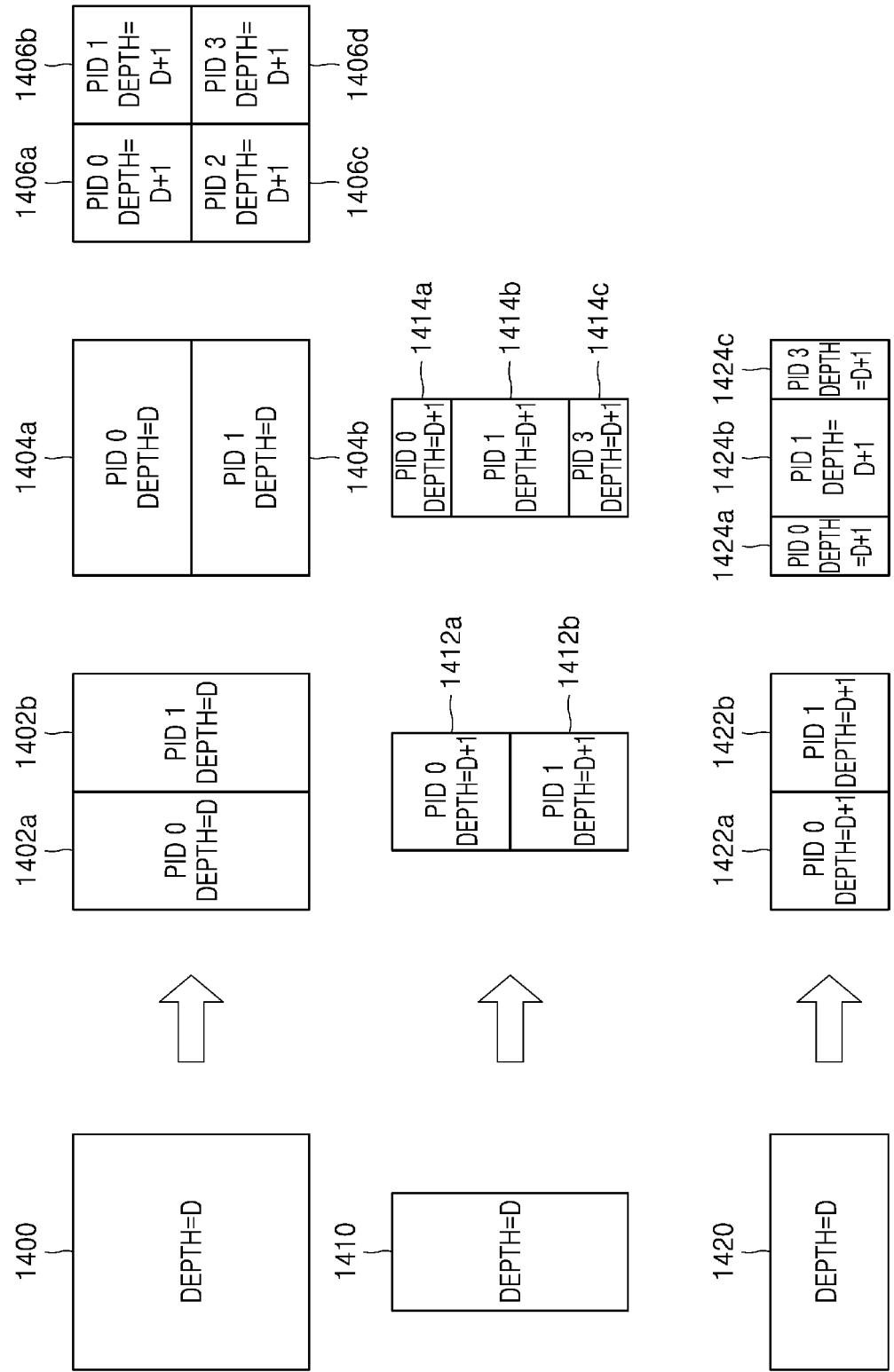
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, depths of the second coding units 1402a and 1402b, 1404a and 1404b, and 1406a, 1406b, 1406c, and 1406d that are determined based on the split shape mode information of the square first coding unit 1400 may be determined based on the length of a long side thereof. For example, because the length of a side of the square first coding unit 1400 equals the length of a long side of the non-square second coding units 1402*a* and 1402*b*, and 1404*a* and 1404*b*, the first coding unit 1400 and the non-square second coding units 1402*a* and 1402*b*, and 1404*a* and 1404*b* may have the same depth, e.g., D. However, when the image decoding apparatus 100 splits the first coding unit 1400 into the four square second coding units 1406*a*, 1406*b*, 1406*c*, and 1406*d* based on the split shape mode information, because the length of a side of the square second coding units 1406*a*, 1406*b*, 1406*c*, and 1406*d* is ½ times the length of a side of the first coding unit 1400, a depth of the second coding units 1406*a*, 1406*b*, 1406*c*, and 1406*d* may be D+1 which is deeper than the depth D of the first coding unit 1400 by 1.

According to an embodiment, the image decoding apparatus 100 may determine a plurality of second coding units 1412*a* and 1412*b*, and 1414*a*, 1414*b*, and 1414*c* by splitting a first coding unit 1410, a height of which is longer than a width, in a horizontal direction based on the split shape mode information. According to an embodiment, the image decoding apparatus 100 may determine a plurality of second coding units 1422*a* and 1422*b*, and 1424*a*, 1424*b*, and 1424*c* by splitting a first coding unit 1420, a width of which is longer than a height, in a vertical direction based on the split shape mode information.

According to an embodiment, a depth of the second coding units 1412*a* and 1412*b*, and 1414*a*, 1414*b*, and 1414*c*, or 1422*a* and 1422*b*, and 1424*a*, 1424*b*, and 1424*c*, which are determined based on the split shape mode information of the non-square first coding unit 1410 or 1420, may be determined based on the length of a long side thereof. For example, because the length of a side of the square second coding units 1412*a* and 1412*b* is ½ times the length of a long side of the first coding unit 1410 having a non-square shape, a height of which is longer than a width, a depth of the square second coding units 1412*a* and 1412*b* is D+1 which is deeper than the depth D of the non-square first coding unit 1410 by 1.

Furthermore, the image decoding apparatus 100 may split the non-square first coding unit 1410 into an odd number of second coding units 1414*a*, 1414*b*, and 1414*c* based on the split shape mode information. The odd number of second coding units 1414*a*, 1414*b*, and 1414*c* may include the non-square second coding units 1414*a* and 1414*c* and the square second coding unit 1414*b*. In this case, because the length of a long side of the non-square second coding units 1414*a* and 1414*c* and the length of a side of the square second coding unit 1414*b* are ½ times the length of a long side of the first coding unit 1410, a depth of the second coding units 1414*a*, 1414*b*, and 1414*c* may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have the same size. Referring to FIG. 14, the coding unit 1414*b* of a center location among an odd number of split coding units 1414*a*, 1414*b*, and 1414*c* may have a width equal to that of the other coding units 1414*a* and 1414*c* and a height which is two times that of the other coding units 1414*a* and 1414*c*. That is, in this case, the coding unit 1414*b* at the center location may include two of the other coding unit 1414*a* or 1414*c*. Accordingly, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment, the image decoding apparatus 100 may determine whether an odd number of split coding units do not have the same size, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412*a* and 1412*b* or an odd number of coding units 1414*a*, 1414*b*, and 1414*c* by splitting the first coding unit 1410 having a rectangular shape, a height of which is longer than a width. The image decoding apparatus 100 may use PIDs indicating respective coding units so as to identify the respective coding units. According to an embodiment, the PID may be obtained from a sample at a certain location of each coding unit (e.g., an upper left sample).

According to an embodiment, the image decoding apparatus 100 may determine a coding unit at a certain location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units to determine a coding unit at a center location from among the coding units. The image decoding apparatus 100 may determine the coding unit 1414*b* having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have the same size. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a certain location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the certain location to be determined are not limited to the above-described examples, and various PIDs and various locations and sizes of coding units may be used.

According to an embodiment, the image decoding apparatus 100 may use a certain data unit where a coding unit starts to be recursively split.

Figure 15:
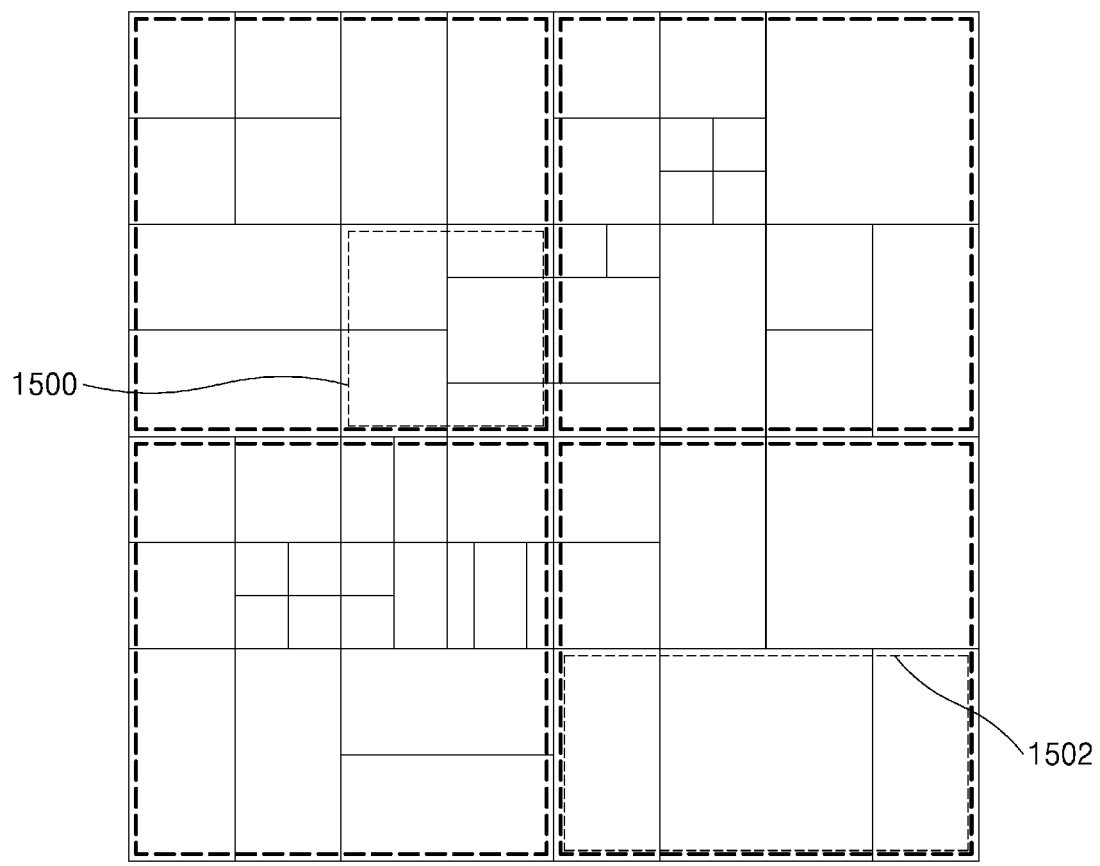
FIG. 15 illustrates that a plurality of coding units are determined based on a plurality of preset data units included in a picture, according to an embodiment.

FIG. 15 illustrates that a plurality of coding units are determined based on a plurality of certain data units included in a picture, according to an embodiment.

According to an embodiment, a certain data unit may be defined as a data unit where a coding unit starts to be recursively split by using split shape mode information. That is, the certain data unit may correspond to a coding unit of an uppermost depth, which is used to determine a plurality of coding units split from a current picture. In the following descriptions, for convenience of explanation, the certain data unit is referred to as a reference data unit.

According to an embodiment, the reference data unit may have a certain size and a certain shape. According to an embodiment, a reference coding unit may include M×N samples. Herein, M and N may be equal to each other, and may be integers represented as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The process of splitting the reference data unit may correspond to a splitting process using a quadtree structure.

According to an embodiment, the image decoding apparatus 100 may pre-determine a minimum size allowed for the reference data units included in the current picture. Accordingly, the image decoding apparatus 100 may determine reference data units having various sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the bitstream obtainer 110 of the image decoding apparatus 100 may obtain, from a bitstream, at least one of reference coding unit shape information and reference coding unit size information for each of the various data units. A process of splitting the square reference coding unit 1500 into one or more coding units has been described above in relation to the process of splitting the current coding unit 300 of FIG. 3, and a process of splitting the non-square reference coding unit 1502 into one or more coding units has been described above in relation to the process of splitting the current coding unit 400 or 450 of FIG. 4, and thus detailed descriptions thereof will be omitted.

According to an embodiment, the image decoding apparatus 100 may use a PID for identifying the size and shape of reference coding units, to determine the size and shape of reference coding units according to some data units pre-determined based on a certain condition. That is, the bitstream obtainer 110 may obtain, from the bitstream, only the PID for identifying the size and shape of reference coding units with respect to each slice, slice segment, tile, tile group, or largest coding unit which is a data unit satisfying a certain condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units for each data unit, which satisfies the certain condition, by using the PID. When the reference coding unit shape information and the reference coding unit size information are obtained and used from the bitstream according to each data unit having a relatively small size, the efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be pre-determined. That is, the image decoding apparatus 100 may determine at least one of the size and shape of reference coding units included in a data unit serving as a unit for obtaining the PID, by selecting the pre-determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit or each reference coding unit, and may use the obtained syntax element.

Hereinafter, a method of determining a split rule according to an embodiment of the disclosure will be described in detail.

The image decoding apparatus 100 may determine a split rule of an image. The split rule may be pre-determined between the image decoding apparatus 100 and the image encoding apparatus 200. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, and a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, a shape, a ratio of width and height, and a direction of the coding unit. The image encoding apparatus 200 and the image decoding apparatus 100 may pre-determine or determine the split rule based on the block shape of the coding unit. However, an embodiment is not limited thereto. The image decoding apparatus 100 may determine the split rule based on the information obtained from the bitstream received from the image encoding apparatus 200.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, . . . and 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, the direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule pre-determined between the image encoding apparatus 200 and the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule so that coding units generated via different splitting paths do not have the same block shape. However, an embodiment is not limited thereto, and the coding units generated via different splitting paths have the same block shape. The coding units generated via the different splitting paths may have different decoding processing orders. Because the decoding processing orders have been described above with reference to FIG. 12, detailed descriptions thereof will be omitted.

Figure 16:
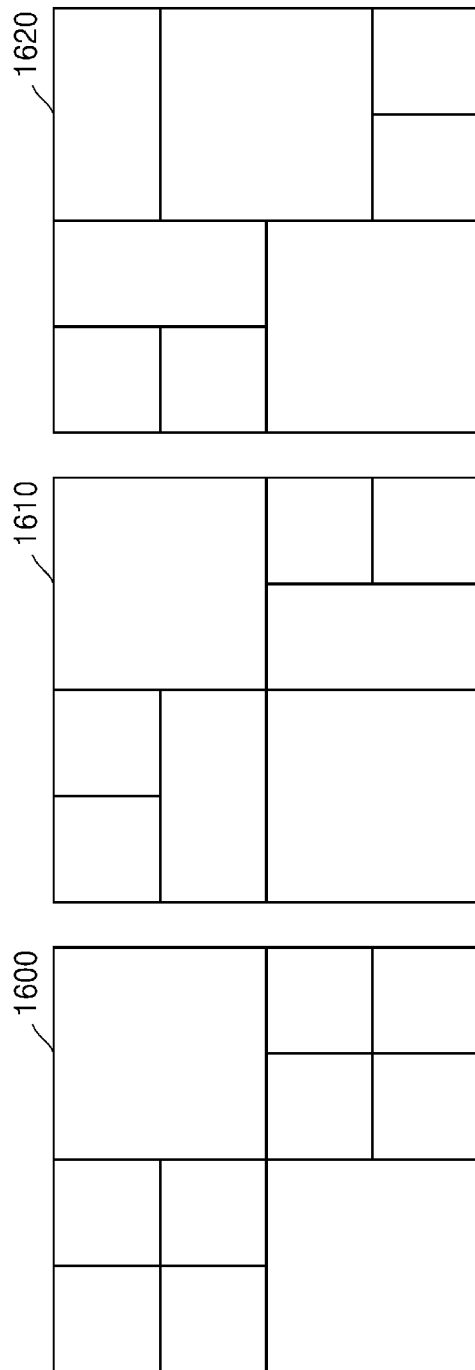
FIG. 16 illustrates coding units which may be determined for each picture, when a combination of shapes into which a coding unit may be split is different for each picture, according to an embodiment.

FIG. 16 illustrates coding units which may be determined for each picture, when a combination of shapes into which a coding unit may be split is different for each picture, according to an embodiment.

Referring to FIG. 16, the image decoding apparatus 100 may, for each picture, differently determine a combination of split shapes into which a coding unit may be split. For example, the image decoding apparatus 100 may decode an image by using a picture 1600 which may be split into four coding units, a picture 1610 which may be split into two or four coding units, and a picture 1620 which may be split into two, three, or four coding units, from among one or more pictures included in the image. In order to split the picture 1600 into a plurality of coding units, the image decoding apparatus 100 may use only split shape information indicating to split into four square coding units. In order to split the picture 1610, the image decoding apparatus 100 may use only split shape information indicating to split into two or four coding units. In order to split the picture 1620, the image decoding apparatus 100 may use only split shape information indicating to split into two, three, or four coding units. The combinations of the split shapes described above are only an embodiment for describing an operation of the image decoding apparatus 100. Thus, the combinations of the split shapes described above should not be interpreted to be limited to the embodiment described above, and should be interpreted so that various types of combinations of the split shapes may be used for a certain data unit.

According to an embodiment, the bitstream obtainer 110 of the image decoding apparatus 100 may obtain a bitstream including an index indicating a combination of split shape information for each certain data unit (e.g., a sequence, a picture, a slice, a slice segment, a tile, or a tile group). For example, the bitstream obtainer 110 may obtain the index indicating the combination of the split shape information from a sequence parameter set, a picture parameter set, a slice header, a tile header, or a tile group header. The bitstream obtainer 110 of the image decoding apparatus 100 may determine, for each certain data unit, a combination of split shapes into which a coding unit may be split by using the obtained index, and thus, for each certain data unit, a different combination of the split shapes may be used.

FIG. 17 illustrates various shapes of a coding unit, which may be determined based on split shape mode information that may be represented as a binary code, according to an embodiment.

According to an embodiment, the image decoding apparatus 100 may split a coding unit into various shapes by using block shape information and split shape mode information obtained by the bitstream obtainer 110. Shapes into which coding units may be split may be various shapes including shapes described above through the embodiments.

Referring to FIG. 17, the image decoding apparatus 100 may split a coding unit having a square shape in at least one of a horizontal direction and a vertical direction, and a coding unit having a non-square shape in the horizontal direction or the vertical direction, based on split shape mode information.

According to an embodiment, when the image decoding apparatus 100 may split a coding unit having a square shape in the horizontal direction and the vertical direction to determine four square coding units, split shape mode information for a square coding unit may represent four split shapes. According to an embodiment, the split shape mode information may be represented as a two-digit binary code, and a binary code may be allocated to each split shape. For example, when a coding unit is not split, split shape mode information may be represented as (00)b, when a coding unit is split in the horizontal direction and the vertical direction, split shape mode information may be represented as (01)b, when a coding unit is split in the horizontal direction, split shape mode information may be represented as (10)b, and when a coding unit is split in the vertical direction, split shape mode information may be represented as (11)b.

According to an embodiment, when the image decoding apparatus 100 splits a coding unit having a non-square shape in the horizontal direction or the vertical direction, types of split shapes that may be represented by split shape mode information may depend on the number of coding units into which the coding unit is to be split. Referring to FIG. 17, the image decoding apparatus 100 may split a coding unit having a non-square shape into up to three coding units, according to an embodiment. Also, the image decoding apparatus 100 may split a coding unit into two coding units. In this case, split shape mode information may be represented as (10)b. The image decoding apparatus 100 may split a coding unit into three coding units. In this case, split shape mode information may be represented as (11)b. The image decoding apparatus 100 may determine not to split a coding unit. In this case, split shape mode information may be represented as (0)b. That is, the image decoding apparatus 100 may use variable length coding (VLC), instead of fixed length coding (FLC), in order to use a binary code representing split shape mode information.

According to an embodiment, referring to FIG. 17, a binary code of split shape mode information representing that a coding unit is not split may be represented as (0)b. When a binary code of split shape mode information representing that a coding unit is not split is set to (00)b, a binary code of split shape mode information of 2 bits should be all used although there is no split shape mode information set to (01)b. However, as shown in FIG. 17, when three split shapes are used for a coding unit having a non-square shape, the image decoding apparatus 100 may determine that a coding unit is not split by using a binary code (0)b of 1 bit as split shape mode information, thereby efficiently using a bitstream. However, split shapes of a coding unit having a non-square shape, which are represented by split shape mode information, should not be interpreted to be limited to three shapes shown in FIG. 17, and should be interpreted to be various shapes including the above-described embodiments.

Figure 18:
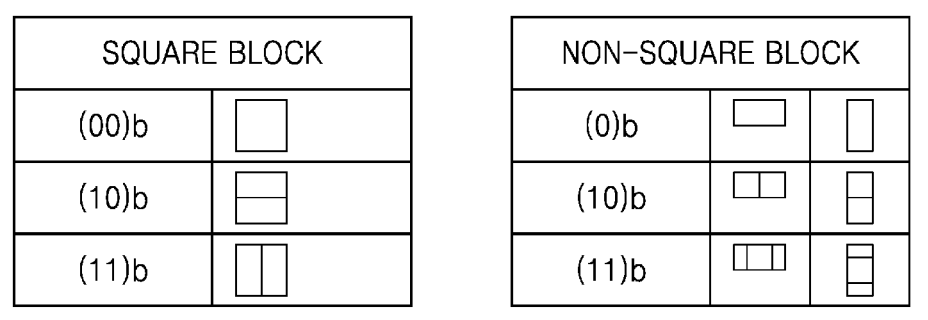

FIG. 18 illustrates other shapes of coding units, which may be determined based on split shape mode information that may be represented as a binary code, according to an embodiment.

Referring to FIG. 18, the image decoding apparatus 100 may split a square coding unit in a horizontal direction or a vertical direction and may split a non-square coding unit in the horizontal direction or the vertical direction, based on the split shape mode information. That is, the split shape mode information may indicate to split the square coding unit in one direction. In this case, a binary code of the split shape mode information indicating not to split the square coding unit may be represented as (0)b. When the binary code of the split shape mode information indicating not to split the coding unit is configured as (00)b, all of 2-bit binary codes of the split shape mode information may have to be used, even though there is no split shape mode information configured as (01)b. However, when, as illustrated in FIG. 18, three split shape shapes with respect to the square coding unit are used, the image decoding apparatus 100 may determine not to split the coding unit, even by using a 1-bit binary code (0)b as the split shape mode information. Thus, a bitstream may be efficiently used. However, the split shapes of the square coding unit indicated by the split shape mode information should not be interpreted as being limited to the three split shapes illustrated in FIG. 18 and should be interpreted to include various shapes including the embodiments described above.

According to an embodiment, the block shape information or the split shape mode information may be represented by using a binary code, and the block shape information or the split shape mode information may be directly generated as a bitstream. Also, the block shape information or the split shape mode information which may be represented as a binary code may not be directly generated as a bitstream and may be used as a binary code which is input in context adaptive binary arithmetic coding (CABAC).

According to an embodiment, a process in which the image decoding apparatus 100 obtains syntax for the block shape information or the split shape mode information through the CABAC is described. A bitstream including a binary code with respect to the syntax may be obtained by the bitstream obtainer 110. The image decoding apparatus 100 may detect a syntax element indicating the block shape information or the split shape mode information by inverse binarizing a bin string included in the obtained bitstream. According to an embodiment, the image decoding apparatus 100 may obtain a set of binary bin strings corresponding to a syntax element to be decoded and may decode each bin by using probability information. Also, the image decoding apparatus 100 may repeat this process until a bin string composed of these decoded bins becomes the same as one of previously obtained bin strings. The image decoding apparatus 100 may determine the syntax element by performing inverse binarization on the bin string.

According to an embodiment, the image decoding apparatus 100 may determine the syntax for the bin string by performing a decoding process of adaptive binary arithmetic coding, and the image decoding apparatus 100 may update a probability model with respect to the bins obtained by the bitstream obtainer 110. Referring to FIG. 17, the bitstream obtainer 110 of the image decoding apparatus 100 may obtain a bitstream indicating a binary code representing split shape mode information, according to an embodiment. The image decoding apparatus 100 may determine the syntax for the split shape mode information by using the obtained 1-bit or 2-bit-sized binary code. In order to determine the syntax for the split shape mode information, the image decoding apparatus 100 may update a probability with respect to each bit of the 2-bit binary code. That is, according to whether a value of a first bin of the 2-bit binary code is 0 or 1, the image decoding apparatus 100 may update a probability that a next bin is to have the value of 0 or 1 when the next bin is decoded.

According to an embodiment, in the process of determining the syntax, the image decoding apparatus 100 may update the probability with respect to the bins, in a process of decoding the bins of the bin string with respect to the syntax, and with respect to a specific bit from among the bin string, the image decoding apparatus 100 may not update the probability and may determine that the probability is the same.

Referring to FIG. 17, in a process of determining the syntax by using the bin string representing the split shape mode information about the non-square coding unit, the image decoding apparatus 100 may determine the syntax for the split shape mode information by using one bin having a value of 0, when the non-square coding unit is not split. That is, when the block shape information indicates that a current coding unit has a non-square shape, a first bin of the bin string with respect to the split shape mode information may be 0, when the non-square coding unit is not split, and may be 1, when the non-square coding unit is split into two or three coding units. Accordingly, the probability that the first bin of the bin string of the split shape mode information about the non-square coding unit is 0 may be ⅓, and the probability that the first bin of the bin string of the split shape mode information about the non-square coding unit is 1 may be ⅔. As described above, because the split shape mode information indicating that the non-square coding unit is not split may be represented by using only a 1-bit bin string having the value of 0, the image decoding apparatus 100 may determine the syntax for the split shape mode information by determining whether a second bin is 0 or 1, only when the first bin of the split shape mode information is 1. According to an embodiment, when the first bin with respect to the split shape mode information is 1, the image decoding apparatus 100 may regard that the probability that the second bin is 0 and the probability that the second bin is 1 are the same as each other and may decode the bin.

According to an embodiment, in the process of determining the bins of the bin string with respect to the split shape mode information, the image decoding apparatus 100 may use various probabilities with respect to each bin. According to an embodiment, the image decoding apparatus 100 may differently determine the probabilities of the bins with respect to the split shape mode information, according to a direction of a non-square block. According to an embodiment, the image decoding apparatus 100 may differently determine the probabilities of the bins with respect to the split shape mode information, according to an area or a length of a long side of a current coding unit. According to an embodiment, the image decoding apparatus 100 may differently determine the probabilities of the bins with respect to the split shape mode information, according to at least one of a shape and a length of a long side of a current coding unit.

According to an embodiment, the image decoding apparatus 100 may determine that the probabilities of the bins with respect to the split shape mode information are the same for coding units having a size that is equal to or greater than a certain size. For example, the image decoding apparatus 100 may determine that the probabilities of the bins with respect to the split shape mode information are the same as each other with respect to the coding units having a size that is equal to or greater than 64 samples based on a length of a long side of the coding unit.

According to an embodiment, the image decoding apparatus 100 may determine initial probabilities of the bins composed in the bin string of the split shape mode information based on a slice type (for example, an I-slice, a P-slice, or a B-slice).

Figure 19:
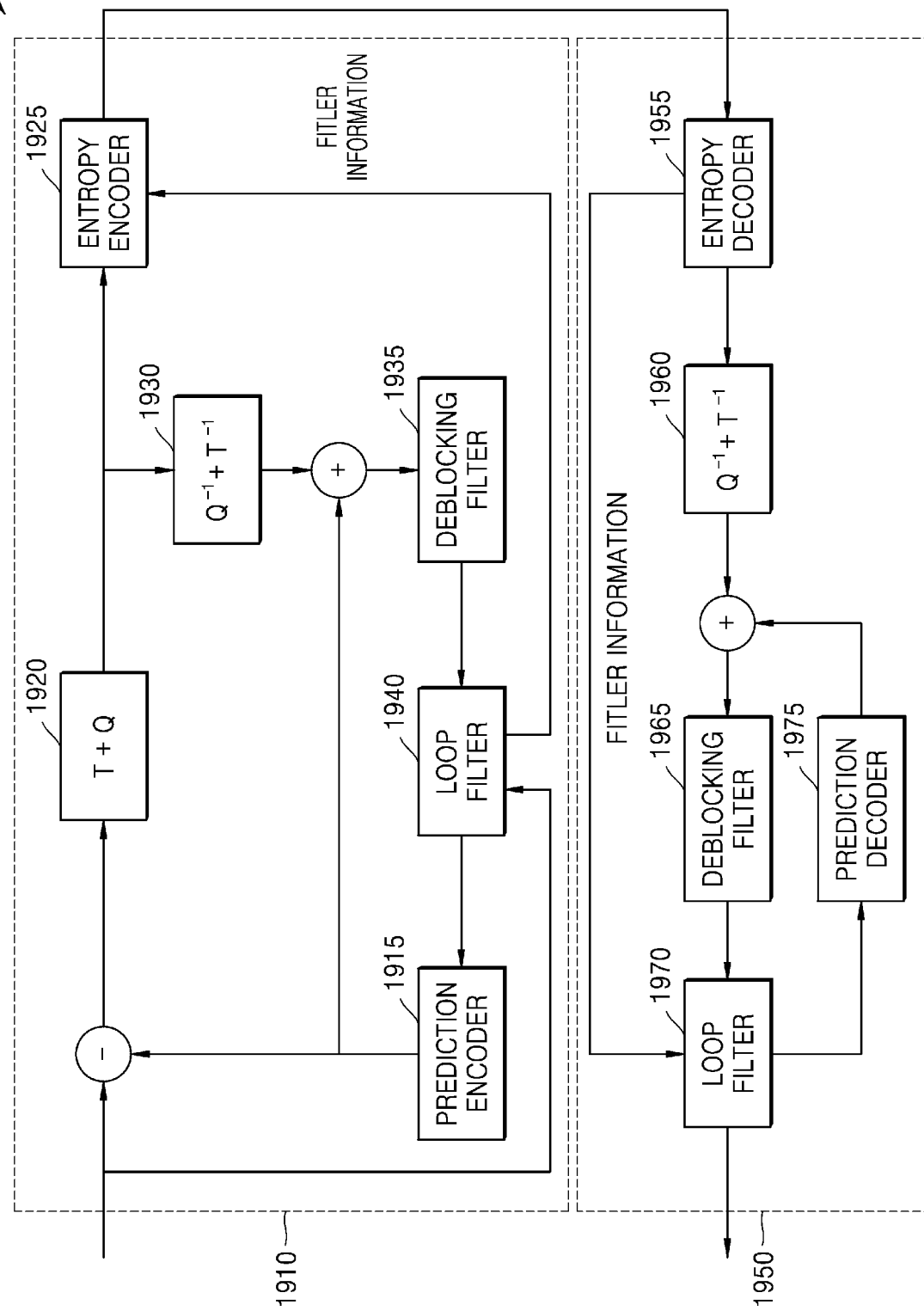
FIG. 19 is a block diagram of an image encoding and decoding system that performs loop filtering.

FIG. 19 is a block diagram of an image encoding and decoding system that performs loop filtering.

An encoding end 1910 of an image encoding and decoding system 1900 transmits an encoded bitstream of an image and a decoding end 1950 outputs a reconstructed image by receiving and decoding the bitstream. Here, the encoding end 1910 may have a similar configuration as the image encoding apparatus 200 to be described below, and the decoding end 1950 may have a similar configuration as the image decoding apparatus 100.

In the encoding end 1910, a prediction encoder 1915 outputs prediction data via inter prediction and intra prediction, and a transformer and quantizer 1920 outputs a quantized transform coefficient of residual data between the prediction data and a current input image. An entropy encoder 1925 encodes and transforms the quantized transform coefficient and outputs the quantized transform coefficient as a bitstream. The quantized transform coefficient is reconstructed as data of a spatial domain via an inverse quantizer and inverse transformer 1930, and the reconstructed data of the spatial domain is output as a reconstructed image via a deblocking filter 1935 and a loop filter 1940. The reconstructed image may be used as a reference image of a next input image via the prediction encoder 1915.

Encoded image data among the bitstream received by the decoding end 1950 is reconstructed as residual data of the spatial domain via an entropy decoder 1955 and an inverse quantizer and inverse transformer 1960. Prediction data and residual data that are output from a prediction decoder 1975 may be combined to construct image data of the spatial domain, and a deblocking filter 1965 and a loop filter 1970 may perform filtering on the image data of the spatial domain to output a reconstructed image for a current original image. The reconstructed image may be used as a reference image for a next original image via the prediction decoder 1975.

The loop filter 1940 of the encoding end 1910 performs loop filtering by using filter information input according to a user input or system setting. The filter information used by the loop filter 1940 is output to the entropy encoder 1925 and transmitted to the decoding end 1950 together with the encoded image data. The loop filter 1970 of the decoding end 1950 may perform loop filtering based on the filter information input from the decoding end 1950.

Various embodiments described above describe an operation related to an image decoding method performed by the image decoding apparatus 100. Hereinafter, an operation of the image encoding apparatus 200 for performing an image encoding method, which corresponds to an inverse process of the image decoding method, will be described through various embodiments.

Figure 2:
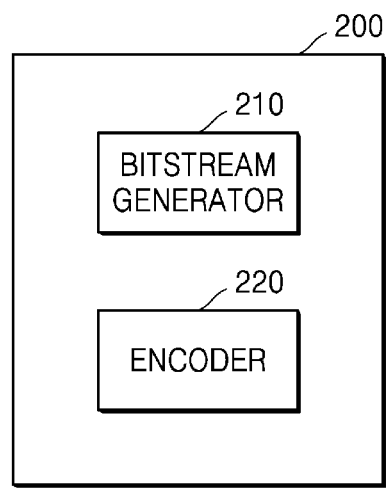
FIG. 2 is a block diagram of an image encoding apparatus, according to an embodiment.

FIG. 2 is a block diagram of the image encoding apparatus 200 capable of encoding an image based on at least one of block shape information and split shape mode information, according to an embodiment.

The image encoding apparatus 200 may include an encoder 220 and a bitstream generator 210. The encoder 220 may receive an input image and encode the input image. The encoder 220 may obtain at least one syntax element by encoding the input image. The syntax element may include at least one of a skip flag, a prediction mode, a motion vector difference, a motion vector prediction method (or index), a transform quantized coefficient, a coded block pattern, a coded block flag, an intra prediction mode, a direct flag, a merge flag, a delta QP, a reference index, a prediction direction, and a transform index. The encoder 220 may determine a context model based on the block shape information including at least one of a shape, a direction, a ratio between a width and a height, and a size of a coding unit.

The bitstream generator 210 may generate a bitstream based on the encoded input image. For example, the bitstream generator 210 may generate the bitstream by entropy encoding the syntax element based on the context model. Also, the image encoding apparatus 200 may transmit the bitstream to the image decoding apparatus 100.

According to an embodiment, the encoder 220 of the image encoding apparatus 200 may determine a shape of the coding unit. For example, the coding unit may have a square shape or a non-square shape, and information indicating the square shape or the non-square shape may be included in the block shape information.

According to an embodiment, the encoder 220 may determine a shape into which the coding unit is to be split. The encoder 220 may determine a shape of at least one coding unit included in the coding unit, and the bitstream generator 210 may generate the bitstream including the split shape mode information including information about the shape of the coding unit.

According to an embodiment, the encoder 220 may determine whether to or not to split the coding unit. When the encoder 220 determines that only one coding unit is included in the coding unit or the coding unit is not split, the bitstream generator 210 may generate the bitstream including the split shape mode information indicating that the coding unit is not split. Also, the encoder 220 may split the coding unit into a plurality of coding units, and the bitstream generator 210 may generate the bitstream including the split shape mode information indicating that the coding unit is split into the plurality of coding units.

According to an embodiment, information indicating the number of coding units into which the coding unit is to be split or a direction in which the coding unit is to be split may be included in the split shape mode information. For example, the split shape mode information may indicate to split the coding unit in at least one of a vertical direction and a horizontal direction or may indicate to or not to split the coding unit.

The image encoding apparatus 200 may determine information about a split shape mode, based on the split shape mode of the coding unit. The image encoding apparatus 200 may determine a context model based on at least one of a shape, a direction, a ratio between a width and a height, and a size of the coding unit. Also, the image encoding apparatus 200 may generate the information about the split shape mode for splitting the coding unit as a bitstream based on the context model.

In order to determine the context model, the image encoding apparatus 200 may obtain an arrangement for making a correspondence between at least one of the shape, the direction, the ratio between the width and the height, and the size of the coding unit, and an index for the context model. The image encoding apparatus 200 may obtain, from the arrangement, the index for the context model based on at least one of the shape, the direction, the ratio between the width and the height, and the size of the coding unit. The image encoding apparatus 200 may determine the context model based on the index for the context model.

In order to determine the context model, the image encoding apparatus 200 may determine the context model further based on block shape information including at least one of a shape, a direction, a ratio between a width and a height, and a size of a neighboring coding unit adjacent to the coding unit. Also, the neighboring coding unit may include at least one of coding units located at the lower left, left, upper left, top, upper right, right, and lower right of the coding unit.

Also, the image encoding apparatus 200 may compare a width of the upper neighboring coding unit with a width of the coding unit, in order to determine the context model. Also, the image encoding apparatus 200 may compare heights of the left and right neighboring coding units with a height of the coding unit. Also, the image encoding apparatus 200 may determine the context model based on results of the comparison.

The operation of the image encoding apparatus 200 include similar aspects as the operation of the image decoding apparatus 100 described with reference to FIGS. 3 through 19, and thus, detailed descriptions thereof will be omitted.

Figure 20:
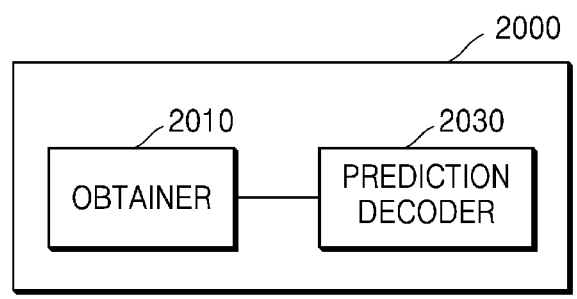
FIG. 20 is a block diagram illustrating a configuration of an image decoding apparatus, according to an embodiment.

FIG. 20 is a block diagram illustrating a configuration of an image decoding apparatus 2000, according to an embodiment.

Referring to FIG. 20, the image decoding apparatus 2000 may include an obtainer 2010 and a prediction decoder 2030. The obtainer 2010 illustrated in FIG. 20 may correspond to the bitstream obtainer 110 illustrated in FIG. 1, and the prediction decoder 2030 may correspond to the decoder 120 illustrated in FIG. 1.

Also, the obtainer 2010 and the prediction decoder 2030 according to an embodiment may be implemented as at least one processor. The image decoding apparatus 2000 may include one or more memories (not shown) that store input/output data of the obtainer 2010 and the prediction decoder 2030. Also, the image decoding apparatus 2000 may include a memory controller (not shown) that controls data input/output of the memory (not shown).

The obtainer 2010 receives a bitstream generated as a result of encoding an image. The obtainer 2010 obtains syntax elements for decoding the image from the bitstream. Binary values corresponding to the syntax elements may be included in the bitstream according to a hierarchical structure of the image. The obtainer 2010 may obtain the syntax elements by entropy coding the binary values included in the bitstream.

The bitstream may include size information of the image to be decoded, information indicating a prediction mode of blocks included in the image, information indicating a motion vector of an inter predicted block, and information indicating residual data between prediction samples and original samples.

In an embodiment, images to be decoded may have various sizes. The size may refer to an area of the image. Alternatively, the size may refer to a width and/or a height of the image. In another example, the size may refer to a ratio between any one of a width and a height of the image, and the other one of the width and the height of the image.

Images may need to have various sizes, for an adaptive streaming service. In real-time video communication, as images of various sizes are supported without inserting an I-picture, it is possible to adaptively respond to a channel state and reflect a user preference. Also, quality degradation of a reconstructed image due to the I-picture may be reduced. However, in the case of inter prediction using temporal redundancy between images, the amount of calculation in generating prediction samples may be increased due to the various sizes of the images and the reliability of the prediction samples may be reduced. Accordingly, an image decoding method considering sizes of images is required.

Figure 21:
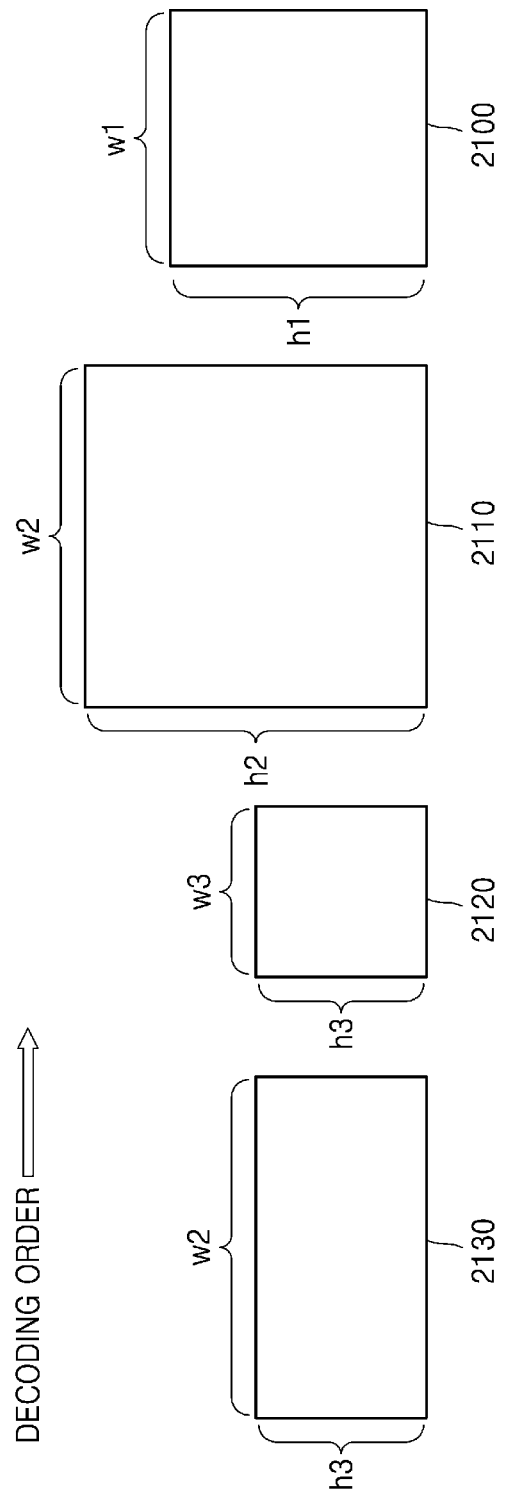
FIG. 21 is a diagram illustrating an image sequence having any of various shapes.

FIG. 21 is a diagram illustrating an image sequence having any of various sizes.

When a width of a current image 2100 is w1 and a height of the current image 2100 is h1, sizes of first through third images 2110, 2120, and 2130 that are decoded earlier than the current image 2100 may be the same as, greater than, or less than a size of the current image 2100.

As shown in FIG. 21, a width and a height of the first image 2110 are respectively w2 and h2. h2 and w2 may be greater than h1 and w1. That is, a size of the first image 2110 is greater than that of the current image 2100. Also, a width and a height of the second image 2120 are w3 and h3. h3 and w3 may be less than h1 and w1. That is, a size of the second image 2120 is less than that of the current image 2100.

In an embodiment, when an image is larger than the current image 2100, it may mean that an area of the image is greater than that of the current image 2100. In contrast, when an image is smaller than the current image 2100, it may mean that an area of the image is less than that of the current image 2100.

Although not shown in FIG. 21, a size of an image that is decoded earlier than the current image 2100 may be the same as that of the current image 2100.

In an embodiment, size comparison between images may be performed based on each of a width and a height. For example, a width and a height of the third image 2130 are respectively w2 and h3. w2 may be greater than w1, and h3 may be less than h1. A width of the third image 2130 is greater than that of the current image 2100, and a height of the third image 2130 is less than that of the current image 2100.

When sizes of the current image 2100 and images that are previously decoded are compared with one another for inter prediction, size comparison may be performed based on each of a width and a height. That is, a width and a height of the first image 2110 are greater than those of the current image 2100, and a width and a height of the second image 2120 are less than those of the current image 2100. A width of the third image 2130 is greater than that of the current image 2100, and a height of the third image 2130 is less than that of the current image 2100.

Because images in an image sequence according to an embodiment may have various sizes, in the case of inter prediction using temporal redundancy between the images, it is necessary to consider the sizes of the images.

The obtainer 2010 may obtain size information of an image to be decoded from at least one of a sequence parameter set, a picture parameter set, and a video parameter set. In an embodiment, a size of an image may be determined according to a temporal identifier (ID) (or a temporal layer identifier) used to support temporal scalability of the image. When a size of an image is pre-determined for each temporal ID, the prediction decoder 2030 may determine a size of an image by referring to a temporal ID obtained from a bitstream.

When a prediction mode of a current block included in the current image 2100 is an inter mode using temporal redundancy between a previously decoded image and the current image, the prediction decoder 2030 may generate prediction samples corresponding to current samples in the current block by considering a size of the current image 2100 and a size of the previously decoded image. A current block that is a block generated by being split according to a tree structure from an image may correspond to a block of, for example, a largest coding unit, a coding unit, a transform unit, or a sub-unit split from a coding unit.

In an embodiment, the prediction decoder 2030 may determine a size of a largest coding unit split from the current image 2100 according to a size of the current image 2100. For example, the prediction decoder 2030 may determine a size of a largest coding unit splittable from the current image 2100 by applying a size of the current image 2100 to a certain computational expression. Because a size of a largest coding unit is adaptively determined according to a size of an image, a load on a memory occurring when data of the largest coding unit having a large size is written/read to/from the memory may be reduced.

After the prediction samples are generated through inter prediction, when residual data is included in the bitstream, reconstructed samples of the current block may be obtained by combining the residual data with the prediction samples, and when the residual data is not included in the bitstream, the prediction samples may be determined as reconstructed samples.

In an embodiment, when the residual data obtained from the bitstream is inverse quantized, a transformer (not shown) may inverse transform the inverse quantized residual data from a frequency domain to a spatial domain. In this case, the transformer may inverse transform the residual data by using a transform method selected based on the size of the current image 2100 from among various transform methods.

The transform methods may include, but are not limited to, a multiple transform selection (MTS) method of adaptively selecting one transform kernel from among various transform kernels (e.g., DCT2 type, DST7 type, and DCT8 type), a non-separable secondary transform (NSST) method of performing transform and then selectively performing transform on a low frequency component, a rotational transform (ROT) method, a discrete sine transform (DST) method, and a discrete cosine transform (DCT) method.

According to an embodiment, the transformer (not shown) may inverse transform the residual data by using any one transform method according to information indicating the transform method obtained from the bitstream.

The prediction decoder 2030 may configure a reference image list by using images (hereinafter, previous images) that are decoded earlier than the current block to reconstruct the current block.

In an embodiment, the prediction decoder 2030 may configure a reference image list by using a previous image having a size greater than that of the current image 2100 and/or a previous image having the same size as that of the current image 2100 from among the previous images. When a certain image is larger than the current image 2100, it may mean that both a width and a height of the certain image are greater than those of the current image 2100. Alternatively, when a certain image is larger than the current image 2100, it may mean that any one of a width and a height is greater than that of the current image 2100 and the other is the same as that of the current image 2100.

When a size of a reference image selected in the reference image list is greater than that of the current image 2100, samples existing in the reference image may be used as prediction samples. However, when a size of a reference image is less than that of the current image 2100, the quality of reconstructed samples may be reduced because the size of the reference image should be increased and then prediction samples should be selected. In other words, when a size of the current block is 3×3 and a width and a height of a reference image are twice a width and a height of the current image 2100, prediction samples may be obtained by using some of samples included in a block having a size of 6×6 in the reference image. However, when a size of a current block is 6×6 and a width and a height of a reference image are ½ of a width and a height of the current image 2100, a block having a size of 3×3 in the reference image should be upsampled to a size of 6×6 and then prediction samples should be obtained. That is, because new samples not existing in the reference image should be generated by upsampling the block having the size of 3×3 in the reference image, the quality of reconstructed samples may be reduced. Accordingly, the prediction decoder 203 may configure a reference image list including only previous images whose size is the same as or greater than that of the current image 2100, to maintain the quality of reconstructed samples generated according to inter prediction.

In another embodiment, the prediction decoder 2030 may configure a reference image list by using a previous image having a size greater than that of the current image 2100, a previous image having a size less than that of the current image 2100, and/or a previous image having the same size as that of the current image 2100 from among the previous images.

The prediction decoder 2030 obtains a motion vector of the current block to obtain prediction samples from a reference image. To obtain the motion vector, the prediction decoder 2030 may configure a candidate list including motion vectors of neighboring blocks related to the current block as candidate motion vectors.

The neighboring blocks may include a spatial block adjacent to the current block in the current image 2100 and a temporal block located in a collocated image selected from images included in the reference image list.

Figure 22:
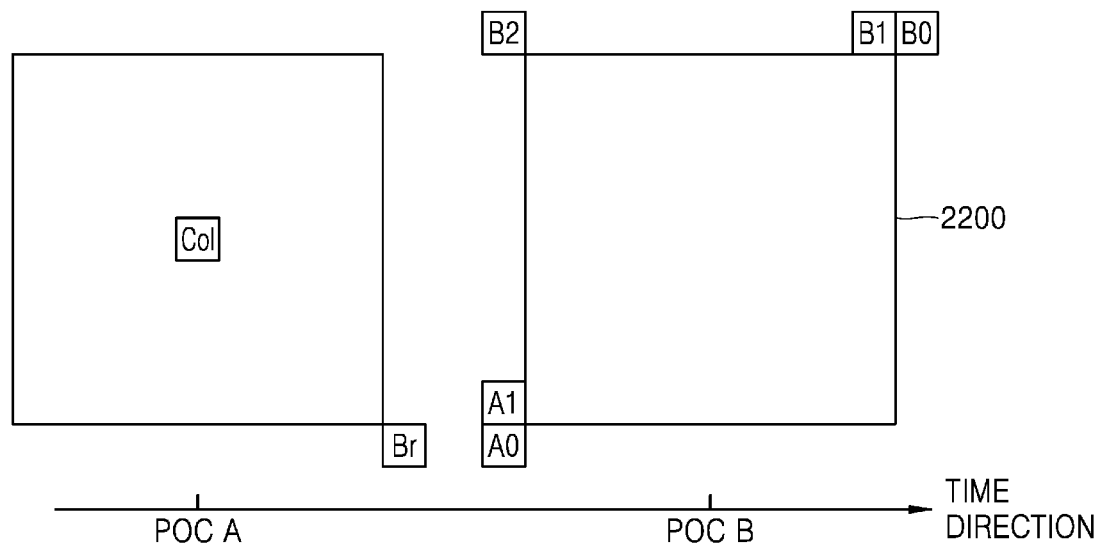
FIG. 22 is a diagram illustrating locations of neighboring blocks related to a current block.
Figure 23:
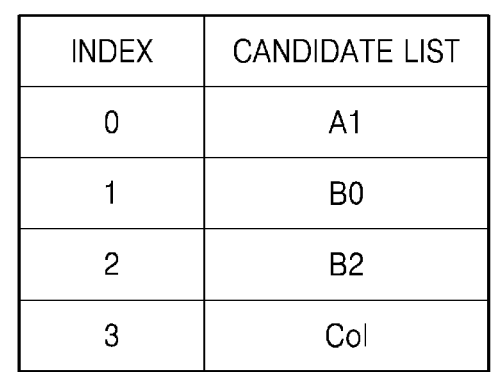

FIG. 22 is a diagram illustrating locations of neighboring blocks related to a current block 2200. FIG. 23 is a table illustrating a candidate list.

Referring to FIG. 22, neighboring blocks of the current block 2200 may include spatial blocks (e.g., A0, A1, B0, B1, and B2) spatially adjacent to the current block 2200 and temporal blocks (e.g., Col and Br) temporally adjacent to the current block 2200.

In detail, the spatial blocks may include at least one of a lower left corner block A0, a lower left block A1, an upper right corner block B0, an upper right block B1, and an upper left corner block B2.

The temporal blocks may include at least one of a block Col located at the same point as the current block in a collocated image, which has a picture order count (POC) different from that of the current image 2100 including the current block 2200, and a block Br spatially adjacent to the block Col located at the same point. The block Br may be located at the lower right of the block Col located at the same point as the current block. The block Col located at the same point as the current block may be a block including a pixel corresponding to a center pixel in the current block, from among pixels included in the collocated image.

Locations of the temporal blocks and the spatial blocks illustrated in FIG. 22 are merely examples, and locations and numbers of the temporal blocks and the spatial blocks may be modified in various ways according to embodiments.

The prediction decoder 2030 may determine availabilities of the neighboring blocks according to a certain order, and may sequentially include motion vectors of the neighboring blocks as candidate motion vectors in a candidate list according to a result of the determination.

When a neighboring block is intra predicted, the prediction decoder 2030 may determine that the neighboring block is not available.

In an embodiment, when an image having the same size as that of the current image 2100 does not exist in images included in a reference image list, the prediction decoder 2030 may determine that a temporal block is not available. In this case, a motion vector of a temporal block is not included in the candidate list. In contrast, when an image having the same size as that of the current image 2100 exists in the images included in the reference image list, a motion vector of a temporal block in the collocated image may be included as a candidate motion vector in the candidate list. In this case, the image having the same size as that of the current image from among the images included in the reference image list may be selected as the collocated image.

In another embodiment, when a previous image having the same size as that of the current image 2100 does not exist in previous images stored in a decoded picture buffer (DPB), the prediction decoder 2030 may determine that a temporal block is not available and may not include a motion vector of a temporal block in the candidate list. In contrast, when a previous image having the same size as that of the current image 2100 exists in the previous images stored in the DPB, the prediction decoder 2030 may include a motion vector of a temporal block in the collocated image as a candidate motion vector in the candidate list. In this case, the image having the same size as that of the current image from among the images included in the reference image list may be selected as the collocated image.

The reason why a motion vector of a temporal block is not included in the candidate list when an image having the same size as that of the current image 2100 is not included in the reference image list or the DPB is that calculation complexity is large. In detail, a motion vector of a temporal block in the collocated image corresponds to a difference between a location of the temporal block and a location of a block referenced by the temporal block. When the collocated image and a reference image of a temporal block are larger or smaller than the current image 2100 and a reference image of the current block, a motion vector of the temporal block should be reduced or increased according to a size of the current image 2100. That is, the motion vector of the temporal block should be changed by considering sizes of all of the collocated image, the reference image of the temporal block, the current image 2100, and the reference image of the current block.

In FIG. 23, a motion vector of the block A1, a motion vector of the block B0, a motion vector of the block B2, and a motion vector of the block Col are included as candidates in a candidate list.

When motion vectors of neighboring blocks are included in the candidate list, the prediction decoder 2030 may determine an order of including the motion vectors in the candidate list based on a size of a reference image indicated by the motion vectors of the neighboring blocks.

For example, a low index (i.e., a high priority) may be allocated to a neighboring block having a motion vector indicating a reference image having the same size as that of the current image 2100 and a high index (i.e., a low priority) may be allocated to a neighboring block having a motion vector indicating a reference image having a size less than that of the current image 2100.

In another example, a lowest index (i.e., a highest priority) may be allocated to a neighboring block having a motion vector indicating a reference image having the same size as that of the current image 2100, an intermediate index (i.e., a medium priority) may be allocated to a neighboring block having a motion vector indicating a reference image having a size greater than that of the current image 2100, and a highest index (i.e., a lowest priority) may be allocated to a neighboring block having a motion vector indicating a reference image having a size less than that of the current image 2100. When the number of neighboring blocks each having a motion vector indicating a reference image having a size greater (or less) than that of the current image 2100 is 2 or more, a lower index may be allocated to a motion vector indicating a reference image having a size closer to that of the current image 2100.

The prediction decoder 2030 may obtain a motion vector of a current block by using a candidate motion vector indicated by information obtained from a bitstream from among the candidate motion vectors included in the candidate list. For example, the prediction decoder 2030 may determine a candidate motion vector selected in the candidate list as the motion vector of the current block. In another example, the prediction decoder 2030 may obtain the motion vector of the current block by changing a candidate motion vector according to information indicating a differential motion vector obtained from the bitstream.

In an embodiment, the information indicating the differential motion vector obtained from the bitstream may include information indicating a variation distance and information indicating a variation direction. In this case, the prediction decoder 2030 may obtain the motion vector of the current block by changing the candidate motion vector selected in the candidate list according to the variation distance and the variation direction.

The information indicating the variation distance may include an index, and a variation distance corresponding to each index value may be pre-determined. For example, an index of 0 may indicate a variation distance of 1, an index of 1 may indicate a variation distance of 2, and an index of 2 may indicate a variation distance of 4.

The prediction decoder 2030 may scale a variation distance corresponding to an index value by considering a size of the current image 2100. For example, when the size of the current image 2100 is equal to or greater than a preset size, the prediction decoder 2030 may increase a variation distance corresponding to each index. In another example, when a height of the current image 2100 is equal to or greater than a preset value and a width of the current image 2100 is less than a preset value, the prediction decoder 2030 may increase a variation distance corresponding to each index when a variation direction is a height direction and may maintain a variation distance corresponding to each index when a variation direction is a width direction.

Because the prediction decoder 2030 according to an embodiment adaptively determines a variation distance by considering various sizes of the current image 2100, the prediction decoder 2030 may more accurately determine the motion vector of the current block.

The prediction decoder 2030 may select reference samples in the reference image by considering the motion vector of the current block, and may reconstruct the current block by using the reference samples. The reference samples may be integer pixels in the reference image.

A method of selecting reference samples in a reference image will now be described with reference to FIGS. 24 and 25.

Figure 24:
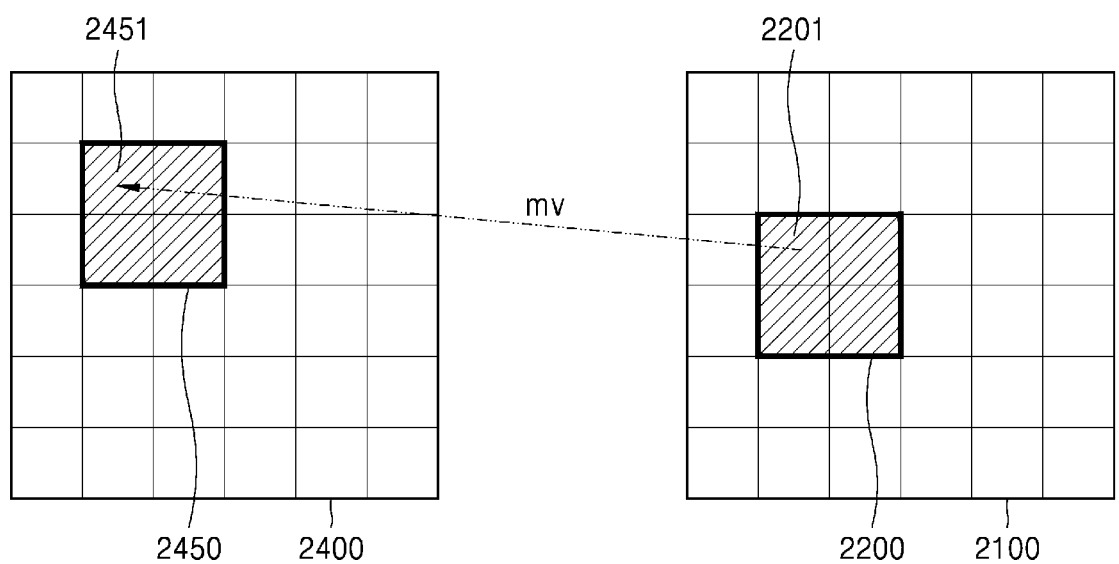
FIG. 24 illustrates a method of selecting reference samples, when a size of a reference image is the same as a size of a current image.

FIG. 24 illustrates a method of selecting reference samples 2450, when a size of a reference image 2400 is the same as a size of the current image 2100.

When a size of a current block 2200 is 2×2 and the current image 2100 and the reference image 2400 have the same size, a size of reference samples 2450 should also be 2×2. This is because four prediction samples are used to reconstruct a value of four current samples. When a size of the reference samples 2450 is 2×2, it means that a size of a block including the reference samples 2450 is 2×2. Also, when the current image 2100 and the reference image 2400 have the same size, it means that a width and a height of the current image 2100 are the same as those of the reference image 2400.

The prediction decoder 2030 selects an upper left reference sample 2451 in the reference image 2400 by applying a motion vector my of the current block 2200 to a location of an upper left current sample 2201 located at the upper left from among current samples included in the current block 2200. Next, the prediction decoder 2030 may obtain the reference samples 2450 having a size of 2×2 by selecting the remaining reference samples adjacent to the upper left reference sample 2451.

In FIG. 24, it is found that, because the reference image 2400 and the current image 2100 have the same size, the reference samples 2450 are adjacent to one another. That is, one reference sample from among the reference samples 2450 is spaced apart by a distance (or a coordinate value) of 1 from a reference sample closest to the one reference sample. For example, when a location of one reference sample is (a, b), a location of a reference sample located at the right of the one reference sample may be (a+1, b), and a location of a reference sample located below the one reference sample may be (a, b+1).

The prediction decoder 2030 may generate filtered samples by filtering the reference samples 2450 by using an n-tap filter (n is a natural number, for example, 8), and may determine prediction samples of the current block 2200 from the filtered samples. The filtered samples may be fractional pixels. Interpolation for generating fractional pixels by using integer pixels is used in codec such as HEVC, and thus detailed descriptions thereof will be omitted.

In an embodiment, when a size of the reference image 2400 is the same as that of the current image 2100, the prediction decoder 2030 may not filter the reference samples 2450 and may determine prediction samples from the reference samples 2450. For example, the prediction decoder 2030 may determine the reference samples 2450 as prediction samples, or may adjust sample values of the reference samples 2450 and then may generate prediction samples having the adjusted values.

Alternatively, in an embodiment, when a size of the reference image 2400 is the same as that of the current image 2100 and a value indicating a location of a fractional pixel is not 0, the prediction decoder 2030 may generate filtered samples by filtering the reference samples 2450 by using the n-tap filter (n is a natural number), and may generate prediction samples of the current block 2200 from the filtered samples. When a value indicating a location of a fractional pixel is 0, the prediction decoder 2030 may not filter the reference samples 2450, and may generate prediction samples from the reference samples 2450. A value indicating a location of a fractional pixel may be calculated according to a pre-determined arithmetic expression based on a motion vector of the current block 2100.

Figure 25:
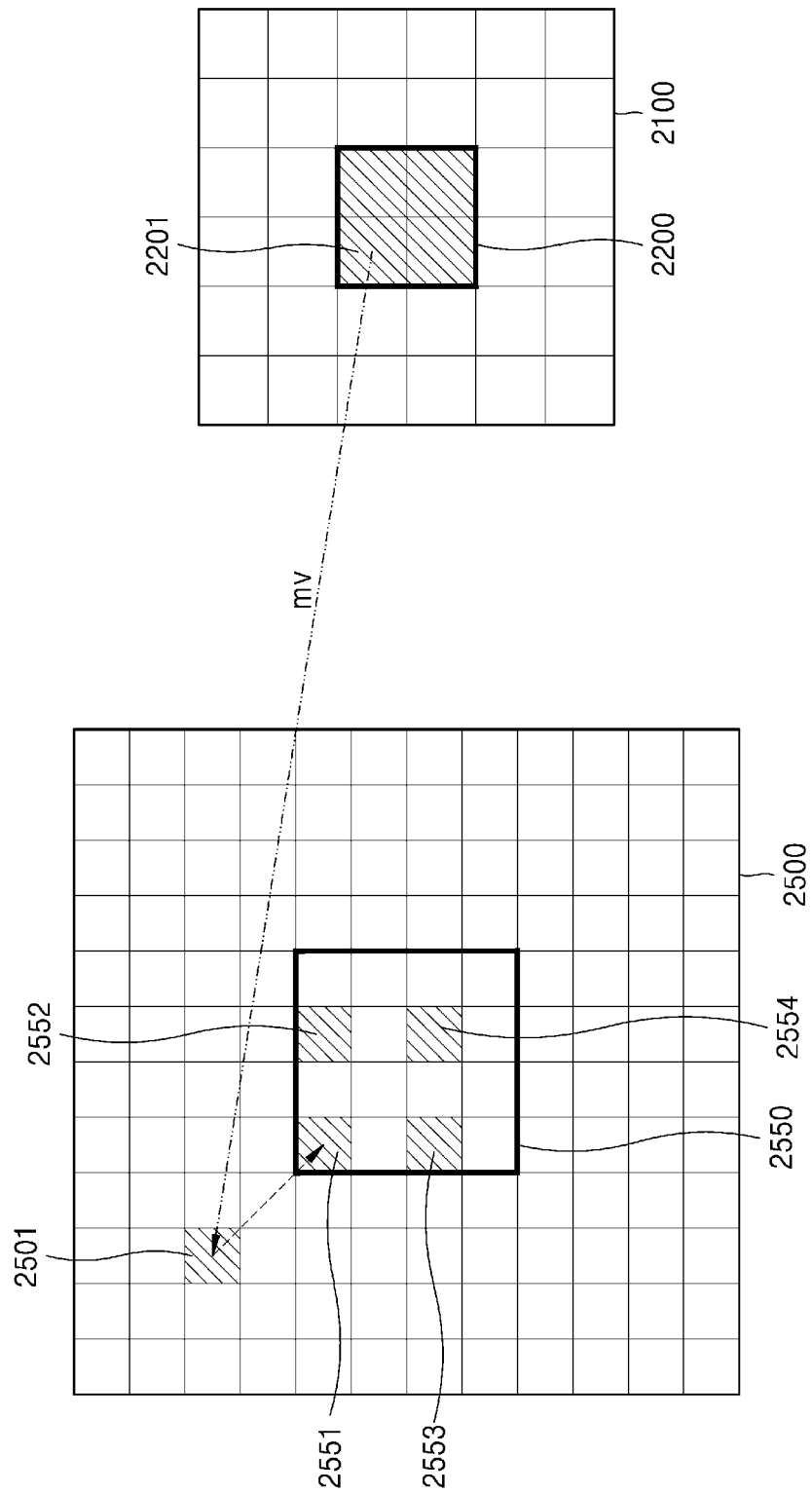
FIG. 25 illustrates a method of selecting reference samples, when a size of a reference image is different from a size of a current image.

FIG. 25 illustrates a method of selecting reference samples, when a size of a reference image 2500 is greater than a size of the current image 2100.

When a size of the current block 2200 is 2×2 and a width and a height of a reference image 2500 are twice a width and a height of the current image 2100, a size of a block 2550 corresponding to the current block 2200 in the reference image 2500 is 4×4. Because the number of prediction samples should be the same as the number of current samples, the block 2550 having a size of 4×4 should be downsampled to a size of 2×2.

In an embodiment, the prediction decoder 2030 determines a location 2501 by applying the motion vector my to a location of the upper left current sample 2201 in the current block 2200. Because a size of the reference image 2500 is twice a size of the current image 2100, the location 2501 indicated by the motion vector should be changed according to a result of size comparison between the reference image 2500 and the current image 2100. That is, the prediction decoder 2030 may change the location 2501 determined by applying the motion vector to the location of the upper left current sample 2201 according to the size comparison result, and may select a sample corresponding to the changed location as an upper left reference sample 2551. The size comparison result may be a ratio between a width of the reference image 2500 and a width of the current image 2100, and a ratio between a height of the reference image 2500 and a height of the current image 2100.

Referring to FIG. 25, when a motion vector is (0, 0), a location determined by applying the motion vector to a location (2, 2) of the upper left current sample 2201 is (2, 2). When (2, 2) is multiplied by 2 that is a ratio between the height of the reference image 2500 and the height of the current image 2100 and 2 that is a ratio between the width of the reference image 2500 and the width of the current image 2100, a location (4, 4) may be derived, and the upper left reference sample 2551 corresponding to the location (4, 4) may be identified. When a ratio between the height of the reference image 2500 and the height of the current image 2100 is 2 and a ratio between the width of the reference image 2500 and the width of the current image 2100 is 1, an upper left reference sample having a location (4, 2) derived by multiplying (2, 2) by 2 and 1 may be identified.

When the upper left reference sample 2551 is selected, the prediction decoder 2030 may select remaining reference samples 2552, 2553, and 2554 that are spaced apart by a certain interval from the upper left reference sample 2551. The certain interval may be determined according to a result of size comparison between the reference image 2500 and the current image 2100. The size comparison result may be a ratio between a width of the reference image 2500 and a width of the current image 2100 and a ratio between a height of the reference image 2500 and a height of the current image 2100. For example, when a ratio between the height of the reference image 2500 and the height of the current image 2100 is 2 and a ratio between the width of the reference image 2500 and the width of the current image 2100 is 2, the certain interval may be determined to be 2 in a height direction and 2 in a width direction.

The prediction decoder 2030 may select the reference samples 2552, 2553, and 2554 that are spaced apart by the certain interval from the upper left reference sample 2551 according to the number of current samples. Referring to FIG. 25, the prediction decoder 2030 may select the upper left reference sample 2551 having a location (4, 4), the reference sample 2552 having a location (6, 4) the reference sample 2553 having a location (4, 6), and the reference sample 2554 having a location (6, 6).

When the reference samples 2551, 2552, 2553, and 2554 are obtained from the reference image 2500 having a size different from that of the current image 2100, the prediction decoder 2030 may apply an n-tap filter (n is a natural number, for example, 6, 8, or 10) to the reference samples 2551, 2552, 2553, and 2554 by considering a result of size comparison between the current image 2100 and the reference image 2500. Filtered samples generated as a result of filtering the reference samples 2551, 2552, 2553, and 2554 may include at least one of integer pixels and fractional pixels.

In an embodiment, the prediction decoder 2030 may select coefficients of an n-tap filter to be used filtering each of the reference samples 2551, 2552, 2553, and 2554 according to a result of size comparison (e.g., a height ratio and a width ratio) between the current image 2100 and the reference image 2500.

For example, when a height (or width) ratio between the current image 2100 and the reference image 2500 is equal to or greater than a preset value, the prediction decoder 2030 may filter each of the reference samples 2551, 2552, 2553, and 2554 by using a filter 'a', and when a height (or width) ratio between the current image 2100 and the reference image 2500 is less than the preset value, the prediction decoder 2030 may filter each of the reference samples 2551, 2552, 2553, and 2554 by using a filter 'b'. Filter coefficients of the filter 'a' may be different from filter coefficients of the filter 'b'.

FIG. 26 is a table illustrating filter coefficients according to a result of size comparison between the current image 2100 and a reference image.

As shown in FIG. 26, when a height (or width) ratio between the current image 2100 and the reference image is equal to or greater than 1.75, filtered samples may be generated by applying an 8-tap filter having filter coefficients of 0, −5, 15, 41, 19, −5, −1, and 0 to reference samples. When a height (or width) ratio between the current image 2100 and the reference image is equal to or greater than 1.25 and less than 1.75, filtered samples may be generated by applying an 8-tap filter having filter coefficients of −4, 0, 19, 29, 21, 5, −4, and −2 to reference samples. Also, when a height (or width) ratio between the current image 2100 and the reference image is less than 1.25, filtered samples may be generated by applying an 8-tap filter having filter coefficients of 0, 1, −3, 63, 4, −2, 1, 0 to reference samples.

Although only one filter coefficient set corresponding to each of size ratios between the current image 2100 and the reference image is illustrated in FIG. 26, as described below with reference to FIG. 29, several filter coefficient sets corresponding to values indicating fractional pixels may be designated for each size ratio.

FIGS. 27A through 27D illustrate a method of generating filtered samples by applying an n-tap filter to the reference samples 2551, 2552, 2553, and 2554 of FIG. 25.

Although a filter in a width direction is applied to samples located at the left and right of the reference samples 2551, 2552, 2553, and 2554 in FIGS. 27A through 27D, filter coefficients of the filter in the width direction may be determined according to a ratio between a width of the current image 2100 and a width of the reference image.

When a filter in a height direction is applied to samples located above and below the reference samples 2551, 2552, 2553, and 2554, filter coefficients of the filter in the height direction may be determined according to a ratio between a height of the current image 2100 and a height of the reference image.

Figure 27A:
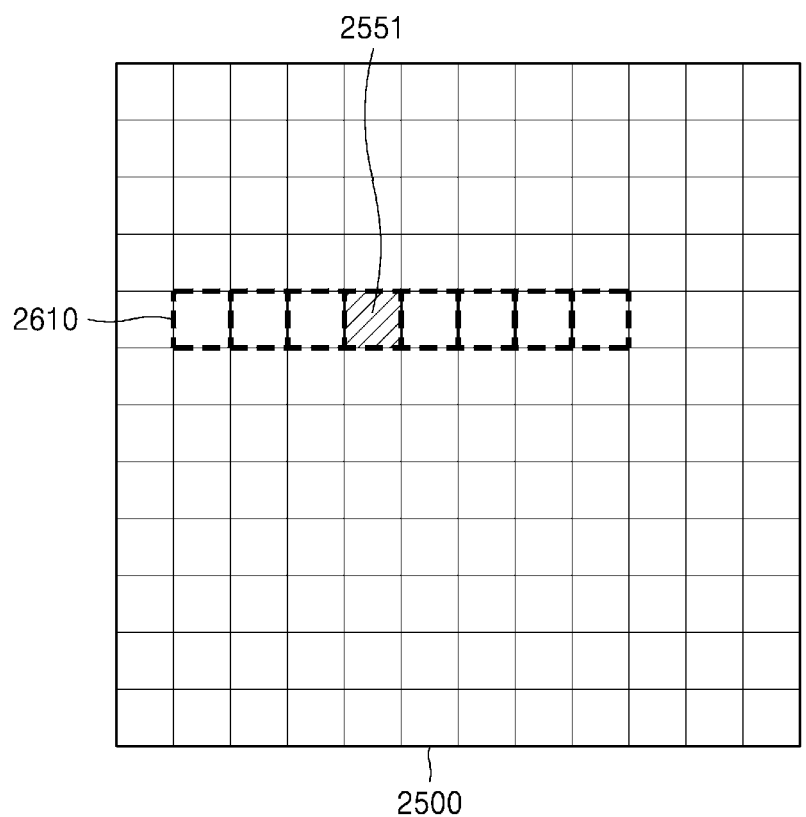
FIG. 27A is a diagram for describing a method of generating filtered samples by filtering reference samples.
Figure 27B:
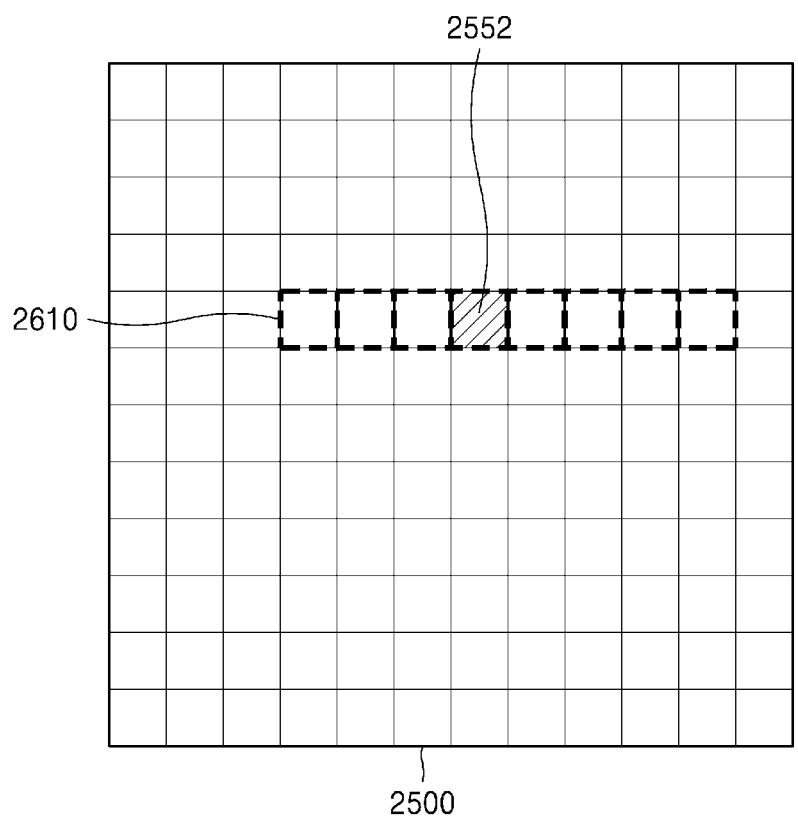
FIG. 27B is a diagram for describing a method of generating filtered samples by filtering reference samples.
Figure 27C:
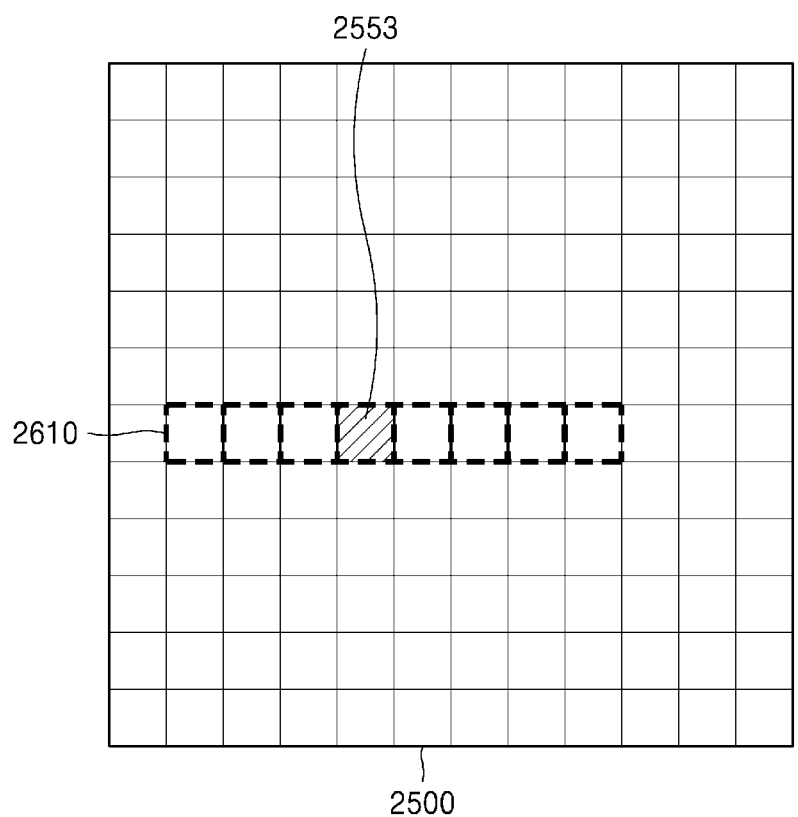
FIG. 27C is a diagram for describing a method of generating filtered samples by filtering reference samples.
Figure 27D:
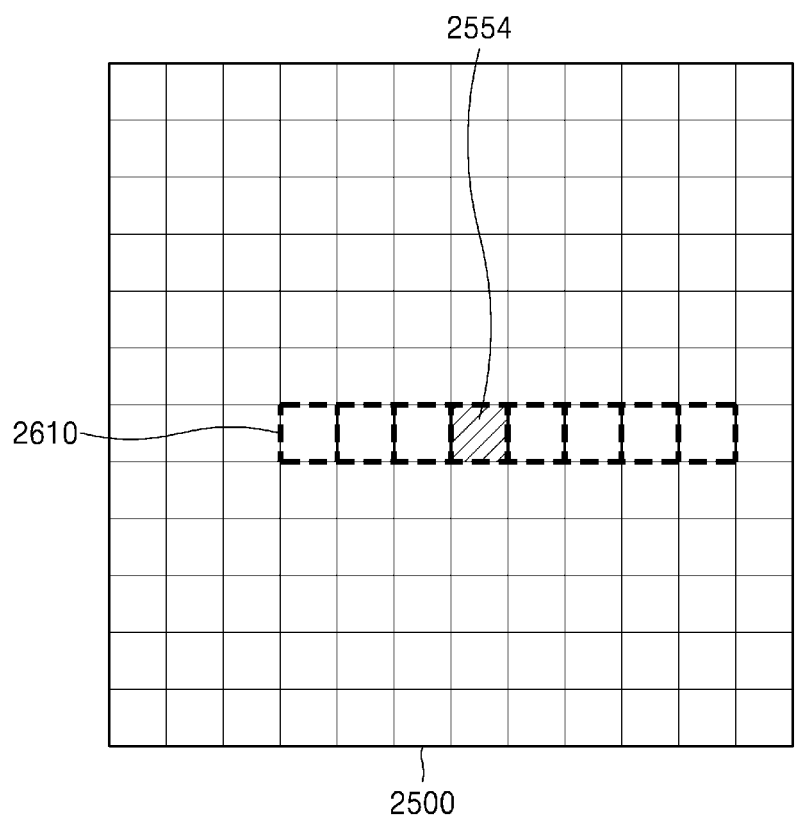
FIG. 27D is a diagram for describing a method of generating filtered samples by filtering reference samples.

As shown in FIG. 27A, a filtered sample corresponding to the first reference sample 2551 is generated by applying a filter 2610 to the first reference sample 2551 and neighboring samples. As shown in FIG. 27B, a filtered sample corresponding to the second reference sample 2552 is generated by applying the filter 2610 to the second reference sample 2552 and neighboring blocks. Likewise, as shown in FIGS. 27C and 27D, filtered samples corresponding to the third reference sample 2553 and the fourth reference sample 2554 are generated by applying the filter 2610 to the third reference sample 2553 and neighboring samples, and the fourth reference sample 2554 and neighboring samples.

According to an embodiment, downsampling and interpolation of a block corresponding to the current block 2200 may be simply performed by applying an n-tap filter at certain intervals.

Although the block 2550 in the reference image 2500 corresponding to the current block 2200 is downsampled in units of blocks in FIG. 25, according to an embodiment, when a size of the reference image 2500 is different from a size of the current image 2100, downsampling or upsampling may be performed so that the size of the reference image 2500 is the same as that of the current image 2100, and then reference samples may be selected as shown in the method of FIG. 24.

Figure 28:
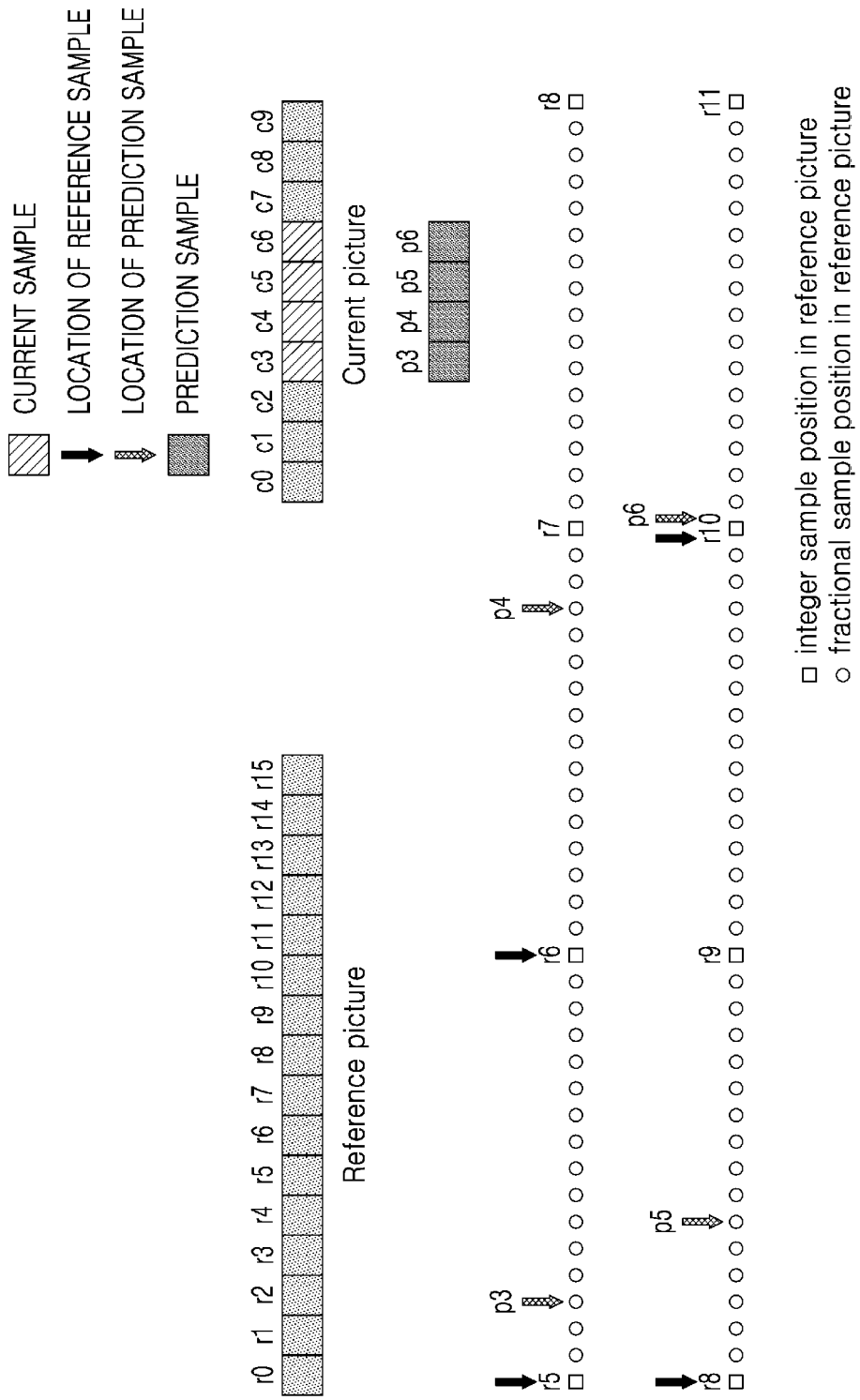
FIG. 28 is a diagram for describing a method of generating prediction samples, when a size of a reference image is different from a size of a current image.

FIG. 28 is a diagram for describing a method of generating prediction samples, when a size of a reference image and a size of a current image are different from each other. FIG. 29 is a table illustrating filter coefficients of an n-tap filter used to filter reference samples of FIG. 28.

In FIG. 28, r0 through r15 may indicate integer pixels in a reference image, and c0 through c9 may indicate integer pixels in a current image.

When it is assumed that the current image and the reference image include one-dimensional samples, reference samples r5, r6, r8, and r10 corresponding to current samples c3, c4, c5, and c6 may be selected according to a motion vector, and a result of size comparison between the current image and the reference image.

As described above, when a size of the reference image is greater than a size of the current image, the reference samples r5, r6, r8, and r10 may be spaced apart by an interval corresponding to a result of size comparison, for example, a size ratio, between the reference image and the current image. Because it is assumed that a size ratio between the reference image and the current image is 1.6 and is a non-natural number, such as a decimal, in FIG. 28, r5 and r6 may be adjacent to each other, and r6 and r8, and r8 and r10 may be spaced apart from each other by a distance of 2.

When the reference image is interpolated in units of 1/16 pixels, locations of fractional pixels respectively corresponding to r5, r6, r8, and r10 may be 3, 13, 6, and 0. A value indicating a location of a fractional pixel may be calculated according to an arithmetic expression that is pre-determined based on a motion vector of a current block including the current samples c3, c4, c5, and c6.

In FIG. 29, by applying filter coefficients corresponding to locations of fractional pixels to integer pixels in the reference image, the prediction decoder 2030 may obtain filtered samples, that is, prediction samples p3, p4, p5, and p6, corresponding to the locations of the fractional pixels.

The prediction decoder 2030 may obtain the prediction samples p3, p4, p5, and p6 according to Equation 1.

[Equation 1]

$$p3=(r2*f_L[3][0]+r3*f_L[3][1]+r4*f_L[3][2]+r5*f_L[3][3]+r6*f_L[3][4]+r7*f_L[3][5]+r8*f_L[3][6]+r9*f_L[3][7]+\text{offset})\!>\!>)\!>\!>\text{shift}$$

$$p4=(r3*f_L[13][0]+r4*f_L[13][1]+r5*f_L[13][2]+r6*f_L[13][3]+r7*f_L[13][4]+r8*f_L[13][5]+r9*f_L[13][6]+r10*f_L[13][7]+\text{offset})\!>\!>\text{shift}$$

$$p5=(r5*f_L[6][0]+r6*f_L[6][1]+r7*f_L[6][2]+r8*f_L[6][3]+r9*f_L[6][4]+r10*f_L[6][5]+r11*f_L[6][6]+r12*f_L[6][7]+\text{offset})\!>\!>\text{shift}$$

$$p6=(r7*f_L[0][0]+r8*f_L[0][1]+r9*f_L[0][2]+r10*f_L[0][3]+r11*f_L[0][4]+r12*f_L[0][5]+r13*f_L[0][6]+r14*f_L[0][7]+\text{offset})\!>\!>\text{shift}$$

In Equation 1, shift is a pre-determined value. Referring to Equation 1, it is found that, even when a location of a fractional pixel corresponding to r10 is 0, that is, when an integer pixel is indicated, an 8-tap filter is applied to neighboring integer pixels. Although it has been described that, when sizes of the current image and the reference image are the same and a value indicating a location of a fractional pixel is 0, an n-tap filter is not applied to reference samples, because sizes of the current image and the reference image are different from each other in FIG. 28, neighboring samples are filtered to improve prediction accuracy even when a value indicating a location of a fractional pixel is 0.

When a prediction mode of the current block is a combined inter-intra prediction (CIIP) mode, the prediction decoder 2030 may reconstruct the current block by weighted summing prediction samples obtained through inter prediction (referred to as inter prediction samples) and prediction samples obtained through intra prediction (referred to as intra prediction samples). In this case, weights to be respectively applied to the inter prediction samples and the intra prediction samples may be pre-determined, and a sum of the weight to be applied to the inter prediction samples and the weight to be applied to the intra prediction samples may be constant.

The prediction decoder 2030 may change the weights to be applied to the inter prediction samples and the intra prediction samples according to a result of size comparison between the current image 2100 and the reference image.

For example, when a size of the reference image is less than a size of the current image 2100, that is, when a block in the reference image should be upsampled for inter prediction, the prediction decoder 2030 may reduce the weight to be applied to the inter prediction samples and may increase the weight to be applied to the intra prediction samples. This is because, when the block is upsampled, the reliability of the inter prediction samples is reduced.

In another embodiment, when a size of the reference image is the same as or greater than a size of the current image 2100, the prediction decoder 2030 may increase the weight to be applied to the inter prediction samples and may reduce the weight to be applied to the intra prediction samples. This is because prediction samples obtained from the reference image having a size that is greater than or the same as that of the current image 2100 have high reliability.

In another embodiment, when a size of the reference image is the same as or greater than a size of the current image 2100, the prediction decoder 2030 increases the weight to be applied to the inter prediction samples. In this case, a weight increment when a size of the reference image is the same as that of the current image 2100 may be greater than a weight increment when a size of the reference image is greater than that of the current image 2100.

In another embodiment, when a size of the reference image is the same as a size of the current image 2100, the prediction decoder 2030 may increase the weight to be applied to the inter prediction samples and may reduce the weight to be applied to the intra prediction samples. In contrast, when a size of the reference image is different from a size of the current image 2100, the prediction decoder 2030 may reduce the weight to be applied to the inter prediction samples and may increase the weight to be applied to the intra prediction samples.

In another embodiment, the prediction decoder 2030 may determine a weight to be applied to the inter prediction samples according to a size ratio between the reference image and the current image 2100, and may determine a weight to be applied to the intra prediction samples based on the determined weight. That is, the prediction decoder 2030 may adaptively determine weights according to a size ratio between the reference image and the current image 2100.

In an embodiment, when a prediction mode of the current block is a bidirectional prediction mode using a first reference image included in a reference image list 0 and a second reference image included in a reference image list 1, the prediction decoder 2030 may reconstruct the current block by weighted summing first prediction samples obtained from the first reference image and second prediction samples obtained from the second reference image. In this case, weights to be respectively applied to the first prediction samples and the second prediction samples may be predetermined, and a sum of the weight to be applied to the first prediction samples and the weight to be applied to the second prediction samples may be constant.

The prediction decoder 2030 may change the weights to be applied to the first prediction samples and the second prediction samples according to a result of size comparison between the first reference image and the second reference image.

For example, when a size of the first reference image is the same as or greater than a size of the current image 2100 and a size of the second reference image is less than the size of the current image 2100, the prediction decoder 2030 may increase the weight to be applied to the first prediction samples and may reduce the weight to be applied to the second prediction samples.

In another embodiment, when a size of the first reference image is the same as a size of the current image 2100 and a size of the second reference image is different from the size of the current image 2100, the prediction decoder 2030 may increase the weight to be applied to the first prediction samples and may reduce the weight to be applied to the second prediction samples.

In an embodiment, when a prediction mode of the current block is an affine skip mode or an affine merge mode, the prediction decoder 2030 may unidirectionally predict the current block by using the first reference image included in the reference image list 0 or the second reference image included in the reference image list 1. When information indicating a prediction direction of a current block obtained from a bitstream indicates bidirectional, the prediction decoder 2030 may select any one of the first reference image included in the reference image list 0 and the second reference image included in the reference image list 1, and may unidirectionally predict the current block by using the selected reference image.

In detail, when a prediction direction of a current block is bidirectional, the prediction decoder 2030 may unidirectionally predict the current block by using a reference image having the same size as that of the current image 2100 from among the first reference image and the second reference image. When both the first reference image and the second reference image have sizes different from that of the current image 2100, the prediction decoder 2030 may unidirectionally predict the current block by using a reference image having a size greater than that of the current image 2100 from among the two reference images; or when both the first reference image and the second reference image have sizes greater than that of the current image 2100, the prediction decoder 2030 may unidirectionally predict the current block by using a reference image having a size closer to that of the current image 2100.

When a prediction direction of the current block is unidirectional and a size of a reference image identified from a bitstream is less than a size of the current image 2100, the prediction decoder 2030 may unidirectionally predict the current block by using, as a reference image, an image having a size that is the same as or greater than that of the current image 2100 from among images included in a reference image list, instead of the reference image identified from the bitstream.

The obtainer 2010 may consider a size of the current image 2100 and/or the reference image when obtaining information indicating a prediction mode of the current block.

For example, when a size of the current image 2100 and/or the reference image is equal to or less than a preset size, the obtainer 2010 may not obtain information (e.g., a flag) indicating whether to apply a certain prediction mode from a bitstream. The certain prediction mode that is a mode using temporal redundancy between images, that is, a mode using a motion vector, may be, for example, but not limited to, a merge mode, a skip mode, a CIIP mode, an affine mode, a decoder-side motion vector refinement (DMVR) mode, or a bidirectional prediction mode. The DMVR mode is a mode in which a decoder directly corrects a motion vector obtained from information signaled from an encoder through block matching or the like.

In another embodiment, when a size of the current image 2100 and/or the reference image is equal to or less than a preset size, if it is identified from information indicating whether to apply other prediction modes that other prediction modes are not applied to the current block, the obtainer 2010 may obtain information indicating whether to apply a certain prediction mode from a bitstream. That is, the obtainer 2010 may delay an order of obtaining the information indicating whether to apply the certain prediction mode.

In another embodiment, when a size of the reference image and a size of the current image 2100 are different from each other, the obtainer 2010 may not obtain information (e.g., a flag) indicating whether to apply a certain prediction from a bitstream. The certain prediction mode may be, for example, but is not limited to, a merge mode, a skip mode, a CIIP mode, an affine mode, a DMVR mode, or a bidirectional prediction mode.

In another example, when a size of the reference image and a size of the current image 2100 are different from each other, if it is identified from information indicating whether to apply other prediction modes that other prediction modes are not applied to the current block, the obtainer 2010 may obtain information indicating whether to apply a certain prediction mode from a bitstream.

Figure 30:
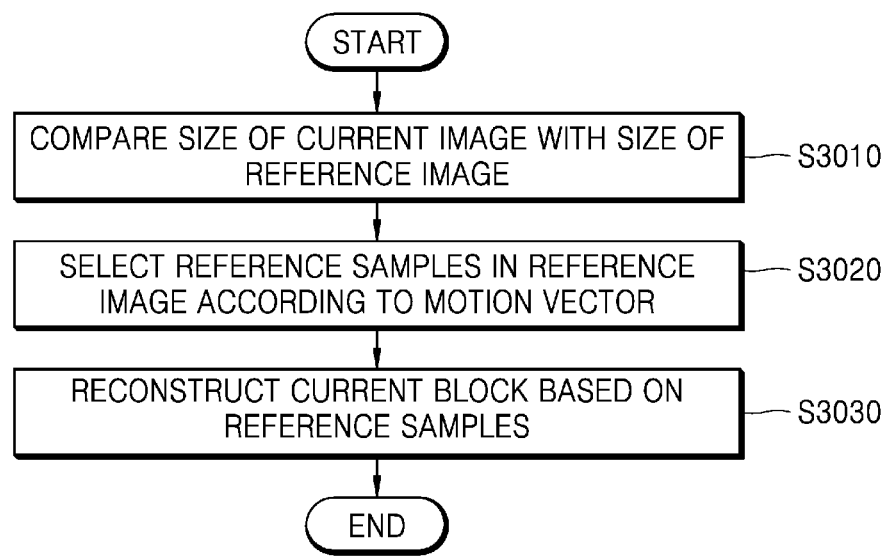
FIG. 30 is a flowchart for describing an image decoding method, according to an embodiment.

FIG. 30 is a diagram for describing an image decoding method, according to an embodiment.

In operation S3010, the image decoding apparatus 2000 compares a size of the current image 2100 including a current block with a size of a reference image. The image decoding apparatus 2000 may derive a size ratio between the current image and the reference image, as a result of size comparison.

In an embodiment, the image decoding apparatus 2000 may identify the size of the current image 2100 and the size of the reference image according to size information included in a bitstream. Size information may be a temporal ID of an image. In this case, the image decoding apparatus 2000 may identify the size of the current image 2100 and the size of the reference image according to a temporal ID of the current image 2100 and a temporal ID of the reference image.

The image decoding apparatus 2000 may configure a reference image list including images that are decoded before the current image 2100, and may select an image identified from information included in the bitstream from among the images included in the reference image list as a reference image of the current block.

In operation S3020, the image decoding apparatus 2000 selects, in the reference image, reference samples corresponding to current samples in the current block according to a motion vector of the current block. When the size of the reference is greater than that of the current image 2100, the reference samples may be spaced apart in the reference image by an interval corresponding to a result of size comparison between the current image 2100 and the reference image.

A method of selecting the reference samples by considering a size ratio between the current image 2100 and the reference image has been described with reference to FIGS. 24 and 25, and thus detailed descriptions thereof will be omitted.

In order to determine the motion vector of the current block, the image decoding apparatus 2000 may configure a candidate list including motion vectors of neighboring blocks related to the current block as candidate motion vectors. The neighboring blocks may include a spatial block adjacent to the current block in the current image 2100 and a temporal block located in a collocated image selected from among the images included in the reference image list.

In an embodiment, when an image having the same size as that of the current image 2100 does not exist in the images included in the reference image list, the image decoding apparatus 2000 may determine that the temporal block is not available. In this case, a motion vector of the temporal block is not included in the candidate list. In contrast, when an image having the same size as that of the current image 2100 exists in the images included in the reference image list, a motion vector of a block in the collocated image may be included as a candidate motion vector in the candidate list. In this case, the image having the same size as that of the current image from among the images included in the reference image list may be selected as the collocated image.

In another embodiment, when a previous image having the same size as that of the current image 2100 does not exist in previous images stored in a decoded picture buffer (DPB), the image decoding apparatus 2000 may determine that the temporal block is not available and may not include a motion vector of the temporal block in the candidate list. In contrast, when a previous image having the same size as that of the current image 2100 exists in the previous images stored in the DPB, the image decoding apparatus 2000 may include a motion vector of a block in the collocated image as a candidate motion vector in the candidate list. In this case, the image having the same size as that of the current image from among the images included in the reference image list may be selected as the collocated image.

In operation S3030, the image decoding apparatus 2000 reconstructs the current block based on the reference samples.

The image decoding apparatus 2000 may generate filtered samples by interpolating the reference samples, and may generate prediction samples of the current block from the filtered samples. Filter coefficients used to interpolate the reference samples may be selected according to a result of size comparison between the current image 2100 and the reference image.

When residual data is included in the bitstream, the image decoding apparatus 2000 may generate reconstructed samples of the current block by combining the residual data with the prediction samples, and when the residual data is not included in the bitstream, the image decoding apparatus 2000 may determine the prediction samples as reconstructed samples.

Figure 31:
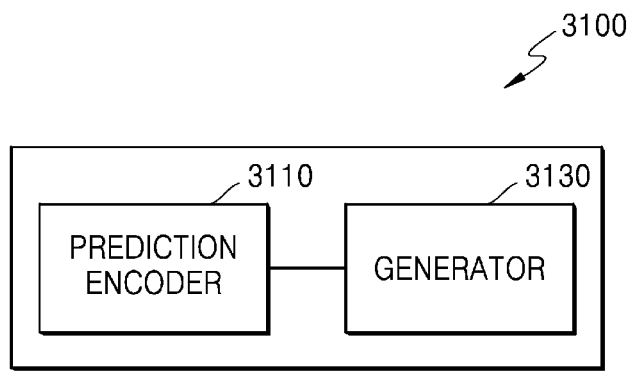
FIG. 31 is a block diagram illustrating a configuration of an image encoding apparatus, according to an embodiment.

FIG. 31 is a block diagram illustrating a configuration of an image encoding apparatus 3100, according to an embodiment.

Referring to FIG. 31, the image encoding apparatus 3100 may include a prediction encoder 3110 and a generator 3130. The prediction encoder 3110 of FIG. 31 may correspond to the encoder 220 of FIG. 2, and the generator 3130 may correspond to the bitstream generator 210 of FIG. 2.

The prediction encoder 3110 and the generator 3130 according to an embodiment may be implemented as at least one processor. The image encoding apparatus 3100 may include one or more memories (not shown) that store input/output data of the prediction encoder 3110 and the generator 3130. Also, the image encoding apparatus 3100 may include a memory controller (not shown) that controls data input/output of the memory (not shown).

The prediction encoder 3110 encodes an image according to a prediction mode, and the generator 3130 generates a bitstream including information generated as a result of encoding the image.

The prediction encoder 3110 may determine a prediction mode of a current block determined in the current image 2100. The prediction mode of the current block may include an intra mode, a merge mode, an advanced motion vector prediction (AMVP) mode, a skip mode, a CIIP mode, an affine mode, a decoder-side motion vector refinement (DMVR) mode, or a bidirectional prediction mode.

In an embodiment, the prediction encoder 3110 may determine the prediction mode of the current block by considering a size of the current image 2100 and/or a reference image.

For example, when the size of the current image 2100 and/or the reference image is equal to or less than a preset size, the prediction encoder 3110 may determine that a certain prediction mode is not applied to the current block, and the generator 3130 may not include information (e.g., a flag) indicating whether to apply the certain prediction mode in the bitstream. The certain prediction mode that is a mode using temporal redundancy between images, that is, a mode using a motion vector, may be, for example, but is not limited to, a merge mode, a skip mode, a CIIP mode, an affine mode, a decoder-side motion vector refinement (DMVR) mode, or a bidirectional prediction mode.

In another example, when the size of the current image 2100 and/or the reference image is equal to or less than the preset size and it is determined that other prediction modes are not applied to the current block, the prediction encoder 3110 may determine whether to apply the certain prediction mode to the current block, and the generator 3130 may include information (e.g., a flag) indicating whether to apply the certain prediction mode in the bitstream. That is, an order of determining whether to apply the certain prediction mode may be delayed.

In another example, when the size of the reference image and the size of the current image 2100 are different from each other, the prediction encoder 3110 may determine that the certain prediction mode is not applied to the current block, and the generator 3130 may not include information indicating whether to apply the certain prediction mode in the bitstream.

In another example, when the size of the reference image and the size of the current image 2100 are different from each other and it is determined that other prediction modes are not applied to the current block, the prediction encoder 3110 may determine whether to apply the certain prediction mode to the current block, and the generator 3130 may include information indicating whether to apply the certain prediction mode in the bitstream.

When the prediction ode of the current block included in the current image 2100 is a mode using temporal redundancy between the current image 2100 and a previously decoded image, the prediction encoder 3110 may generate prediction samples corresponding to current samples in the current block by considering the size of the current image 2100 and a size of the previously decoded image. The current block that is a block generated by being split according to a tree structure from an image may correspond to a block of, for example, a largest coding unit, a coding unit, a transform unit, or a sub-unit split from a coding unit.

In an embodiment, the prediction encoder 3110 may determine a size of a largest coding unit split from the current image 2100 according to the size of the current image 2100. For example, the prediction encoder 3110 may determine a size of a largest coding unit splittable from the current image 2100 by applying the size of the current image to a certain arithmetic expression.

The prediction encoder 3110 may configure a reference image list by using images (hereinafter, previous images) that are encoded earlier than the current block to encode the current block.

In an embodiment, the prediction encoder 3110 may configure the reference image list by using a previous image having a size that is greater than and/or the same as that of the current image 2100 from among the previous images.

In another embodiment, the prediction encoder 3110 may configure the reference image list by using a previous image having a size greater than that of the current image, a previous image having a size less than that of the current image 2100, and/or a previous image having the same size as that of the current image 2100 from among the previous images.

The prediction encoder 3110 may select reference samples similar to the current block by searching the reference image, and may encode a motion vector indicating the selected reference samples.

As shown in FIG. 24, when the size of the current image 2100 and the size of the reference image are the same, the prediction encoder 3110 selects, in the reference image, the reference samples corresponding to the current samples included in the current block.

The prediction encoder 3110 may generate filtered samples by filtering the reference samples, and may obtain the prediction samples of the current block based on the filtered samples.

As shown in FIG. 25, when the size of the reference image is greater than the size of the current image 2100, the prediction encoder 3110 may select reference samples that are spaced apart by a certain interval in the reference image. The certain interval may be determined according to a result of size comparison between the reference image and the current image 2100, and the size comparison result may be a ratio between a width of the reference image and a width of the current image 2100 and a ratio between a height of the reference image and a height of the current image 2100. For example, when a ratio between the height of the reference image and the height of the current image 2100 is 2 and a ratio between the width of the reference image and the width of the current image 2100 is 2, the certain interval may be determined to be 2 in a height direction and 2 in a width direction.

When reference samples are obtained from the reference image having the size different from that of the current image 2100, the prediction encoder 3110 may filter the reference samples by using an n-tap filter by considering a result of size comparison between the current image 2100 and the reference image. The n-tap filter may be, for example, a 6-tap filter, an 8-tap filter, or a 10-tap filter.

In an embodiment, the prediction encoder 3110 may select coefficients of a filter to be used for filtering the reference samples according to a result of size comparison (e.g., a height ratio and a width ratio) between the current image 2100 and the reference image.

For example, when a height (or width) ratio between the current image 2100 and the reference image is equal to or greater than a preset value, the prediction encoder 3110 may filter the reference samples by using a filter 'a', and when a height (or width) ratio between the current image 2100 and the reference image is less than the preset value, the prediction encoder 3110 may filter the reference samples by using a filter 'b'. Filter coefficients of the filter 'a' may be different from filter coefficients of the filter 'b'.

When the prediction mode of the current block is a combined inter-intra prediction (CIIP) mode, the prediction encoder 3110 may encode the current block by weighted summing prediction samples obtained through inter prediction (referred to as inter prediction samples) and prediction samples obtained through intra prediction (referred to as intra prediction samples). In this case, weights to be applied to the inter prediction samples and the intra prediction samples may be pre-determined, and a sum of the weight to be applied to the inter prediction samples and the weight to be applied to the intra prediction samples may be constant.

The prediction encoder 3110 may change the weights to be applied to the inter prediction samples and the intra prediction samples according to a result of size comparison between the current image 2100 and the reference image.

For example, when the size of the reference image is less than the size of the current image 2100, the prediction encoder 3110 may reduce the weight to be applied to the inter prediction samples and may increase the weight to be applied to the intra prediction samples.

In another example, when the size of the current image is the same as or greater than the size of the current image 2100, the prediction encoder 3110 may increase the weight to be applied to the inter prediction samples and may reduce the weight to be applied to the intra prediction samples.

In another example, when the size of the reference image is the same as or greater than the size of the current image 2100, the prediction encoder 3110 increases the weight to be applied to the inter prediction samples. In this case, a weight increment when the size of the reference image is the same as the size of the current image 2100 may be greater than a weight increment when the size of the reference image is greater than the size of the current image 2100.

In another example, when the size of the reference image is the same as the size of the current image 2100, the prediction encoder 3110 may increase the weight to be applied to the inter prediction samples and may reduce the weight to be applied to the intra prediction samples. In contrast, when the size of the reference image is different from the size of the current image 2100, the prediction encoder 3110 may reduce the weight to be applied to the inter prediction samples and may increase the weight to be applied to the intra prediction samples.

In another example, the prediction encoder 3110 may determine the weight to be applied to the inter prediction samples according to a size ratio between the reference image and the current image 2100, and may determine the weight to be applied to the intra prediction samples based on the determined weight.

In an embodiment, when the prediction mode of the current block is a bidirectional prediction mode using a first reference image included in a reference image list 0 and a second reference image included in a reference image list 1, the prediction encoder 3110 may reconstruct the current block by weighted summing first prediction samples obtained from the first reference image and second prediction samples obtained from the second reference image. In this case, weights to be applied to the first prediction samples and the second prediction samples may be predetermined, and a sum of the weight to be applied to the first prediction samples and the weight to be applied to the second prediction samples may be constant.

The prediction encoder 3110 may change the weights to be applied to the first prediction samples and the second prediction samples according to a result of size comparison between the first reference image and the second reference image.

For example, when a size of the first reference image is the same as or greater than that of the current image 2100 and a size of the second reference image is less than that of the current image 2100, the prediction encoder 3110 may increase the weight to be applied to the first prediction samples and may reduce the weight to be applied to the second prediction samples.

In another example, when the size of the first reference image is less than the size of the current image 2100 and the size of the second reference image is greater than or the same as the size of the current image 2100, the prediction encoder 3110 may reduce the weight to be applied to the first prediction samples and may increase the weight to be applied to the second prediction samples.

In another example, when the size of the first reference image is the same as the size of the current image 2100 and the size of the second reference image is different from the size of the current image 2100, the prediction encoder 3110 may increase the weight to be applied to the first prediction samples and may reduce the weight to be applied to the second prediction samples.

In another embodiment, when the prediction mode of the current block is an affine skip mode or an affine merge mode, the prediction encoder 3110 may unidirectionally predict the current block by using the first reference image included in the reference image list 0 or the second reference image included in the reference image list 1. When it is determined that the prediction direction of the current block is bidirectional, the prediction encoder 3110 may select any one of the first reference image included in the reference image list 0 and the second reference image included in the reference image list 1, and may unidirectionally predict the current block by using the selected one reference image.

In detail, when the prediction direction of the current block is bidirectional, the prediction encoder 3110 may unidirectionally predict the current block by using a reference image having the same size as that of the current image 2100 from among the first reference image and the second reference image. When both the first reference image and the second reference image have sizes different from the size of the current image 2100, the prediction encoder 3110 may unidirectionally predict the current block by using a reference image having a size greater than that of the current image 2100 from among the two reference images; or when both the two reference images have sizes greater than the size of the current image 2100, the prediction encoder 3110 may unidirectionally predict the current block by using a reference image having a size closer to that of the current image 2100 from among the two reference images.

When the prediction direction of the current block is unidirectional and the size of the reference image of the current block is less than the size of the current image 2100, the prediction encoder 3110 may unidirectionally predict the current block by using, as a reference image, an image having a size that is the same as or greater than that of the current image 2100 from among images included in the reference image list, instead of the reference image of the current block.

The prediction encoder 3110 obtains a motion vector of the current block for indicating the prediction samples obtained from the reference image. In order to obtain the motion vector, the prediction decoder 2030 may configure a candidate list including motion vectors of neighboring blocks related to the current block as candidate motion vectors.

The neighboring blocks may include a spatial block adjacent to the current block in the current image 2100 and a temporal block located in a collocated image selected from among the images included in the reference image list.

As shown in FIG. 22, the neighboring blocks of the current block may include the spatial blocks A0, A1, B0, B1, and B2 spatially adjacent to the current block and the temporal blocks Col and Br temporally adjacent to the current block.

The prediction encoder 3110 may determine availabilities of the neighboring blocks according to a certain order, and may sequentially include motion vectors of the neighboring blocks as candidate motion vectors in the candidate list.

When a neighboring block is intra predicted, the prediction encoder 3110 may determine that the neighboring block is not available.

In an embodiment, when an image having the same size as the size of the current image 2100 does not exist in the images included in the reference image list, the prediction encoder 3110 may determine that a temporal block is not available. In this case, a motion vector of a temporal block is not included in the candidate list. In contrast, when an image having the same size as that of the current image 2100 exists in the images included in the reference image list, a motion vector of a block in the collocated image may be included as a candidate motion vector in the candidate list.

In another embodiment, when a previous image having the same size as that of the current image 2100 exists in previous images stored in a decoded picture buffer (DPB), the prediction encoder 3110 may determine that a temporal block is not available and may not include a motion vector of the temporal block in the candidate list. In contrast, when a previous image having the same size as that of the current image 2100 exists in the previous images stored in the DPB, the prediction encoder 3110 may include a motion vector of a block in the collocated image as a candidate motion vector in the candidate list.

When motion vectors of the neighboring blocks are included in the candidate list, the prediction encoder 3110 may determine an order of including the motion vectors in the candidate list based on a size of a reference image indicated by the motion vectors of the neighboring blocks.

For example, a low index (i.e., a high priority) may be allocated to a neighboring block having a motion vector indicating a reference image having the same size as that of the current image 2100, and a high index (i.e., a low priority) may be allocated to a neighboring block having a motion vector indicating a reference image having a size less than that of the current image 2100. In another example, a lowest index (i.e., a highest priority) may be allocated to a neighboring block having a motion vector indicating a reference image having the same size as that of the current image 2100, an intermediate index (i.e., a medium priority) may be allocated to a neighboring block having a motion vector indicating a reference image having a size greater than that of the current image 2100, and a highest index (i.e., a lowest priority) may be allocated to a neighboring block having a motion vector indicating a reference image having a size less than that of the current image 2100. When the number of neighboring blocks each having a motion vector indicating a reference image having a size greater (or less) than that of the current image 2100 is 2 or more, a lower index may be allocated to a motion vector indicating a reference image having a size closer to that of the current image 2100.

The prediction encoder 3110 may generate information indicating a candidate motion vector used as a motion vector of the current block from among candidate motion vectors included in the candidate list. In an embodiment, the prediction encoder 3110 may generate information indicating a differential motion vector. The differential motion vector corresponds to a difference between the motion vector of the current block and the candidate motion vector.

In an embodiment, the information indicating the differential motion vector may include information indicating a variation distance and information indicating a variation direction. In this case, the image decoding apparatus 2000 may obtain the motion vector of the current block by changing the candidate motion vector selected in the candidate list according to the variation distance and the variation direction.

The information indicating the variation distance may include an index, and a variation distance corresponding to each index value may be pre-determined. For example, an index of 0 may indicate a variation distance of 1, an index of 1 may indicate a variation distance of 2, and an index of 2 may indicate a variation distance of 4.

The prediction encoder 3110 may scale a variation distance corresponding to an index value by considering a size of the current image 2100. For example, when the size of the current image 2100 is equal to or greater than a preset size, the prediction encoder 3110 may increase a variation distance corresponding to each index. In another example, when a height of the current image 2100 is equal to or greater than a preset value and a width of the current image 2100 is less than a preset value, the prediction encoder 3110 may increase a variation distance corresponding to each index when a variation direction is a height direction and may maintain a variation distance corresponding to each index when a variation direction is a width direction.

When residual data between the current samples of the current block and the prediction samples is obtained, a transformer (not shown) may change the residual data from a spatial domain to a frequency domain. In this case, the transformer may inverse transform the residual data by using a transform method selected based on the size of the current image 2100 from among various transform methods. The transform methods may include, but are not limited to, a multiple transform selection (MTS) method of adaptively selecting one transform kernel from among various transform kernels (e.g., DCT2 type, DST7 type, and DCT8 type), a non-separable secondary transform (NSST) method of performing transform and then selectively performing transform on a low frequency component, a rotational transform (ROT) method, a discrete sine transform (DST) method, and a discrete cosine transform (DCT) method.

The generator 3130 generates a bitstream as a result of encoding an image. The bitstream may include syntax elements, and binary values corresponding to the syntax elements may be included in the bitstream according to a hierarchical structure of the image. The generator 3130 may generate the bitstream including the binary values by entropy coding the syntax elements.

The bitstream may include size information of an image to be decoded, information indicating a prediction mode of blocks included in the image, information indicating a motion vector of an inter predicted block, and information indicating residual data between prediction samples and original samples.

The size information of the image may be included in at least one of a sequence parameter set, a picture parameter set, and a video parameter set of the bitstream. In an embodiment, the size information of the image may include a temporal ID of the image.

Figure 32:
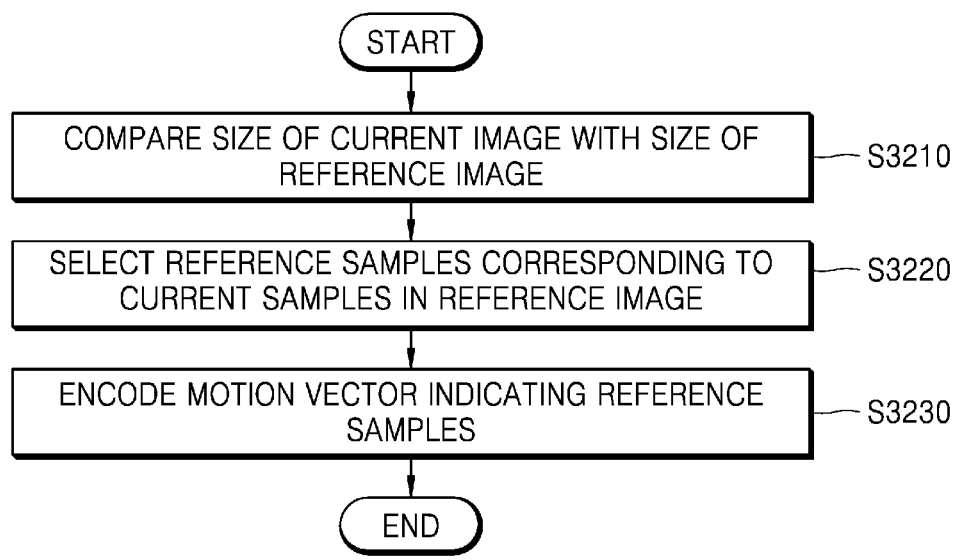
FIG. 32 is a flowchart for describing an image encoding method, according to an embodiment.

FIG. 32 is a flowchart for describing an image encoding method, according to an embodiment.

In operation S3210, an image encoding apparatus 3100 compares a size of the current image 2100 including a current block with a size of a reference image. The image encoding apparatus 3100 may derive a ratio between the size of the current image 2100 and the size of the reference image, as a result of size comparison.

The image encoding apparatus 3100 may configure a reference image list including images that are decoded before the current image 2100, and may select a reference image of a current block from among the images included in the reference image list.

In operation S3220, the image encoding apparatus 3100 selects, in the reference image, reference samples corresponding to the current block. When the size of the reference image is greater than the size of the current image 2100, the reference samples may be spaced apart in the reference image by an interval corresponding to a result of size comparison between the current image 2100 and the reference image.

A method of selecting the reference samples by considering a ratio between the size of the current image 2100 and the size of the reference image has been described with reference to FIGS. 24 and 25, and thus detailed descriptions thereof will be omitted.

The image encoding apparatus 3100 may generate filtered samples by interpolating the reference samples, and may generate prediction samples of the current block by using the filtered samples. Filter coefficients used to interpolate the reference samples may be selected according to a comparison result between the size of the current image 2100 and the size of the reference image.

In operation S3230, the image decoding apparatus 2000 encodes a motion vector of the current block indicating the reference samples.

In order to encode the motion vector, the image encoding apparatus 3100 may configure a candidate list including motion vectors of neighboring blocks related to the current block as candidate motion vectors. The neighboring blocks may include a spatial block adjacent to the current block in the current image 2100, and a temporal block located in a collocated image selected in the images included in the reference image list.

In an embodiment, when an image having the same size as that of the current image 2100 does not exist in the images included in the reference image list, the image encoding apparatus 3100 may determine that a temporal block is not available. In this case, a motion vector of a temporal block is not included in the candidate list. In contrast, when an image having the same size as that of the current image 2100 exists in the images included in the reference image list, a motion vector of a block in the collocated image may be included as a candidate motion vector in the candidate list.

In another embodiment, when a previous image having the same size as that of the current image does not exist in previous images stored in a decoded picture buffer (DPB), the image encoding apparatus 3100 may determine that a temporal block is not available and may not include a motion vector of a temporal block in the candidate list. In contrast, when a previous image having the same size as that of the current image 2100 exists in the previous images stored in the DPB, the image encoding apparatus 3100 may include a motion vector of a block in the collocated image as a candidate motion vector in the candidate list.

The image encoding apparatus 3100 generates a bitstream including size information of an image, information indicating a prediction mode of blocks included in the image, information indicating a motion vector of an inter predicted block, and information indicating residual data between prediction samples and original samples.

According to a prediction mode, information indicating a differential motion vector that is a difference between the motion vector of the current block and the candidate motion vector may be included in the bitstream.

Meanwhile, the embodiments of the disclosure may be written as programs that are executable on a computer, and the programs may be stored in a medium.

The medium may continuously store the computer-executable programs, or may temporarily store the computer-executable programs for execution or downloading. Also, the medium may be any one of various recording media or storage media in which a single piece or plurality of pieces of hardware are combined, and the medium is not limited to those directly connected to a certain computer system, but may be distributed on a network. Examples of the medium include magnetic media (e.g., a hard disk, a floppy disk, and a magnetic tape), optical recording media (e.g., compact disc-read only memory (CD-ROM) and a digital versatile disc (DVD)), magneto-optical media (e.g., a floptical disk), a read-only memory (ROM), a random-access memory (RAM), a flash memory, etc., which are configured to store program instructions. Also, other examples of the medium may include recording media and storage media managed by application stores distributing applications or by websites, servers, and the like supplying or distributing other various types of software.

So far, although the technical idea of the disclosure has been described based on the preferred embodiments, the technical idea of the disclosure is not limited to the above-described embodiments, and various modifications and changes may be made within the scope of the technical idea of the disclosure by one of ordinary skill in the art.

What is claimed is:

1. An image decoding method of decoding a video signal, the image decoding method comprising:
    obtaining a value for a current block based on a size of a current picture and a size of a reference picture of the current block;
    selecting a first filter coefficient set among a first plurality of filter coefficient sets when the value is less than a first predetermined value, wherein the first filter coefficient set includes a first plurality of filter coefficients for a fractional location of a pixel;
    selecting a second filter coefficient set among a second plurality of filter coefficient sets when the value is greater than the first predetermined value and less than a second predetermined value, wherein the selected second filter coefficient set includes a second plurality of filter coefficients for the fractional location of the pixel;
    generating a predicted value by using the selected first filter coefficient set and reference samples in the reference picture; and
    reconstructing the current block using the predicted value,
    wherein the first predetermined value indicates a ratio of the size of the reference picture and the size of the current picture is equal to 1.25, and the second predetermined value indicates the ratio of the size of the reference picture and the size of the current picture is equal to 1.75.

2. The image decoding method of claim 1, further comprising:
    determining a position of a first reference sample among the reference samples in the reference picture corresponding to a position of a current sample in the current block, wherein the position of the first reference sample is determined based on a motion vector of the current block.

3. The image decoding method of claim 2, wherein the current sample is a top-left sample of the current block,
    wherein the determining of the position of the first reference sample comprises:
    determining a position by applying the motion vector of the current block to a position of the top-left sample of the current block; and
    determining the position of the first reference sample by changing the determined position according to the obtained value.

4. An image decoding apparatus of decoding a video signal, the image decoding apparatus comprising:
    a prediction decoder configured to:
    obtain a value for a current block based on a size of a current picture and a size of a reference picture of the current block;
    select a first filter coefficient set among a first plurality of filter coefficient sets when the value is less than a first predetermined value, wherein the first filter coefficient set includes a first plurality of filter coefficients for a fractional location of a pixel;
    select a second filter coefficient set among a second plurality of filter coefficient sets when the value is greater than the first predetermined value and less than a second predetermined value, where the selected second filter coefficient set includes a second plurality of filter coefficients for the fractional location of the pixel;

generate a predicted value by using the selected first filter coefficient set and reference samples in the reference picture; and reconstruct the current block using the predicted value, wherein the first predetermined value indicates a ratio of the size of the reference picture and the size of the current picture is equal to 1.25, and the second predetermined value indicates the ratio of the size of the reference picture and the size of the current picture is equal to 1.75.

5. An image encoding method of encoding a video signal, the image encoding method comprising:

obtaining a value for a current block based on a size of a current picture and a size of a reference picture of the current block;

selecting a first filter coefficient set among a first plurality of filter coefficient sets when the value is less than a first predetermined value, wherein the first filter coefficient set includes a first plurality of filter coefficients for a fractional location of a pixel;

selecting a second filter coefficient set among a second plurality of filter coefficient sets when the value is greater than the first predetermined value and less than a second predetermined value, wherein the selected second filter coefficient set includes a second plurality of filter coefficients for the fractional location of the pixel;

generating a predicted value by using the selected first filter coefficient set and reference samples in the reference picture; and encoding a residual data of the current block using the predicted value, wherein the first predetermined value indicates a ratio of the size of the reference picture and the size of the current picture is equal to 1.25, and the second predetermined value indicates the ratio of the size of the reference picture and the size of the current picture is equal to 1.75.

6. A method of transmitting a bitstream, the method comprising:

obtaining a value for a current block based on a size of a current picture and a size of a reference picture of the current block;

selecting a first filter coefficient set among a first plurality of filter coefficient sets when the value is less than a first predetermined value, wherein the first filter coefficient set includes a first plurality of filter coefficients for a fractional location of a pixel;

selecting a second filter coefficient set among a second plurality of filter coefficient sets when the value is greater than the first predetermined value and less than a second predetermined value, wherein the second filter coefficient set includes a second plurality of filter coefficients for the fractional location of the pixel;

generating a predicted value by using the selected first filter coefficient set and reference samples in the reference picture;

encoding a residual data of the current block using the predicted value;

generating the bitstream including the encoded residual data; and transmitting the bitstream from an image encoding apparatus to an image decoding apparatus, wherein the first predetermined value indicates a ratio of the size of the reference picture and the size of the current picture is equal to 1.25, and the second predetermined value indicates the ratio of the size of the reference picture and the size of the current picture is equal to 1.75.

7. The image decoding method of claim 1, further comprising:

selecting a third filter coefficient set among the third plurality of filter coefficient sets when the value being is greater than the second predetermined value, wherein the second filter coefficient set includes the plurality of filter coefficients for the fractional location of the pixel.

* * * * *